US010553007B1

(12) United States Patent
Kreutzkamp et al.

(10) Patent No.: US 10,553,007 B1
(45) Date of Patent: *Feb. 4, 2020

(54) SYSTEMS, DEVICES, AND METHODS FOR DISPLAYING VISUAL SYMBOLS

(71) Applicant: North Inc., Kitchener (CA)

(72) Inventors: Rachel Kreutzkamp, Kitchener (CA); Ryan Alexander West, Kitchener (CA); Brent Bisaillion, Kitchener (CA); Steven M. Eggert, Austin, TX (US)

(73) Assignee: North inc., Kitchener, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,002

(22) Filed: Oct. 22, 2018

(51) Int. Cl.
*G06T 11/20* (2006.01)
*G06T 11/60* (2006.01)
*G06T 7/40* (2017.01)
*G02B 27/01* (2006.01)

(52) U.S. Cl.
CPC .......... *G06T 11/60* (2013.01); *G02B 27/0172* (2013.01); *G06T 7/40* (2013.01); *G06T 11/203* (2013.01); *G02B 2027/0112* (2013.01); *G02B 2027/0178* (2013.01)

(58) Field of Classification Search
CPC ... G06T 11/60; G06T 11/203; G02B 27/0172; G02B 2027/0112; G02B 2027/0178
See application file for complete search history.

(56) References Cited

U.S. PATENT DOCUMENTS

2016/0371886 A1* 12/2016 Thompson ......... G02B 27/0172
2017/0357332 A1* 12/2017 Balan ................ G02B 27/0093
2018/0082644 A1*  3/2018 Bohn .................... G02B 6/003

OTHER PUBLICATIONS

Adobe, "Adobe InDesign CC Help", Oct. 15, 2018. (Year: 2018).*

* cited by examiner

*Primary Examiner* — Nicholas R Wilson
(74) *Attorney, Agent, or Firm* — Thomas Mahon

(57) ABSTRACT

Systems, devices, and methods that display visual symbols are described. A visual symbol has a color and a linewidth. Multiple instances of the symbol are concurrently and progressively drawn, one on top of the other, in the display area of a display device. Each respective instance has a respective intermediate color. The respective intermediate colors combine to produce the color of the symbol where the respective instances overlap in the display area. Each respective instance also has a respective linewidth and the respective linewidths converge to the linewidth of the symbol as each instance is progressively drawn. A backwards progression through the same sequence is employed to regressively undraw a symbol from the display area of the display device. Computer program products comprising processor-executable instructions for performing the methods are also described.

28 Claims, 27 Drawing Sheets

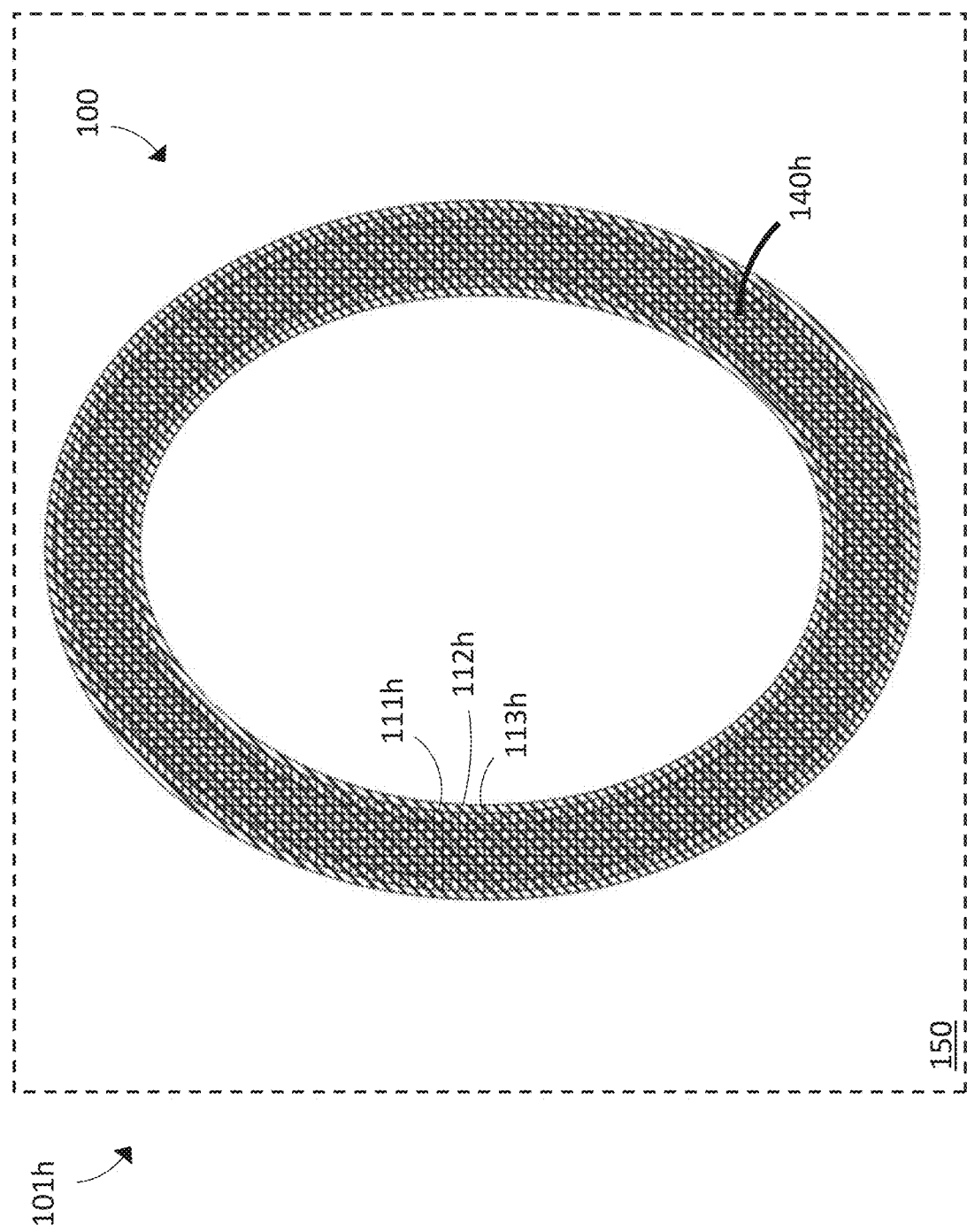

SYSTEMS, DEVICES, AND METHODS FOR DISPLAYING VISUAL SYMBOLS

BACKGROUND

Technical Field

The present systems, devices, and methods generally relate to displaying content to users, and particularly relate to drawing a user's focus to the content being displayed.

Description of the Related Art

Wearable Heads-Up Displays

A wearable heads-up display is a head-mounted display that enables the user to see displayed content but does not prevent the user from being able to see their external environment. A wearable heads-up display is an electronic device that is worn on a user's head and, when so worn, secures at least one electronic display within the accessible field of view of at least one of the user's eyes, regardless of the position or orientation of the user's head, but this at least one display is either transparent or at a periphery of the user's field of view so that the user is still able to see their external environment. Examples of wearable heads-up displays include: the Google Glass®, the Optinvent Ora®, the Epson Moverio®, the Sony Glasstron®, just to name a few.

BRIEF SUMMARY

A method of displaying a symbol on a display device, wherein the symbol includes a color, may be summarized as including: drawing a first instance of the symbol, the first instance having a first intermediate color; and drawing a second instance of the symbol, the second instance having a second intermediate color and the second instance at least partially overlapping the first instance, wherein the second instance is at least partially transparent and the first intermediate color and the second intermediate color combine to display the color of the symbol where the second instance overlaps the first instance. The color of the symbol may be white, in which case: drawing a second instance of the symbol, the second instance having a second intermediate color and the second instance at least partially overlapping the first instance, may include drawing the second instance of the symbol, the second intermediate color of the second instance combining with the first intermediate color of the first instance where the second instance overlaps the first instance to display the white symbol.

The method may further include drawing a third instance of the symbol, the third instance having a third intermediate color and the third instance at least partially overlapping both the second instance and the first instance, wherein the third instance is at least partially transparent and the third intermediate color combines with the first intermediate color and the second intermediate color to display the color of the symbol where the third instance overlaps both the second instance and the first instance. If the color of the symbol is white, then drawing a third instance of the symbol, the third instance having a third intermediate color and the third instance at least partially overlapping both the second instance and the first instance, may include drawing the third instance of the symbol, the third intermediate color of the third instance combining with both the second intermediate color of the second instance and the first intermediate color of the first instance where the third instance overlaps both the second instance and the first instance to display the white symbol.

The method may further include: undrawing the first instance of the symbol; and undrawing the second instance of the symbol, wherein undrawing the first instance and undrawing the second instance separates the color of the symbol into the first intermediate color and the second intermediate color and undraws the symbol.

The symbol may include a linewidth and at least one of the first instance and/or the second instance may have an intermediate linewidth that is different from the linewidth of the symbol. In this case, the method may further include: dynamically varying the intermediate linewidth to match the linewidth of the symbol. The first instance may have a first intermediate linewidth that is different from the linewidth of the symbol and the second instance may have a second intermediate linewidth that is different from both the first intermediate linewidth and the linewidth of the symbol. In this case, the method may further include: dynamically varying the first intermediate linewidth to match the linewidth of the symbol; and dynamically varying the second intermediate linewidth to match the linewidth of the symbol. The intermediate linewidth may be greater than the linewidth of the symbol, and dynamically varying the intermediate linewidth to match the linewidth of the symbol may include dynamically shrinking the intermediate linewidth to match the linewidth of the symbol. The method may further include: dynamically restoring the intermediate linewidth; undrawing the first instance of the symbol; and undrawing the second instance of the symbol, wherein dynamically restoring the intermediate linewidth, undrawing the first instance, and undrawing the second instance separates the color of the symbol into the first intermediate color and the second intermediate color, and wherein undrawing the first instance and undrawing the second instance undraws the symbol.

The symbol may include an alphanumeric character. Drawing a first instance of the symbol may include drawing a first instance of the alphanumeric character. Drawing a second instance of the symbol may include drawing a second instance of the alphanumeric character.

The symbol may include a graphic having a single continuous line. Drawing a first instance of the symbol may include drawing a first instance of the graphic having a single continuous line. Drawing a second instance of the symbol may include drawing a second instance of the graphic having a single continuous line.

Drawing a first instance of the symbol may include initiating the drawing the first instance of the symbol at a first point in a display area of the display device. Drawing a second instance of the symbol may include initiating the drawing the second instance of the symbol at a second point in the display area of the display device, the second point spatially-separated from the first point in the display area of the display device.

The method may further include applying a color gradient to the symbol.

The display device may include a wearable heads-up display and the method of displaying a symbol on a display device may include a method of displaying the symbol on the wearable heads-up display.

Drawing a first instance of the symbol may include drawing the first instance of the symbol at a first rate. Drawing a second instance of the symbol may include drawing the second instance of the symbol at a second rate, the second rate different from the first rate.

Drawing a first instance of the symbol may include drawing the first instance of the symbol in a first direction. Drawing a second instance of the symbol may include drawing the second instance of the symbol in a second direction, the second direction different from the first direction.

Drawing a first instance of the symbol, the first instance having a first intermediate color, may include drawing the first instance of the symbol, the first instance having a color gradient spanning at least two intermediate colors.

Drawing a first instance of the symbol may include persistently displaying a number of earlier portions of the first instance of the symbol while sequentially displaying a number of subsequent portions of the first instance of the symbol. Drawing a second instance of the symbol may include persistently displaying a number of earlier portions of the second instance of the symbol while sequentially displaying a number of subsequent portions of the second instance of the symbol.

Drawing a first instance of the symbol may include drawing the first instance of the symbol in a first layer, and drawing a second instance of the symbol may include drawing the second instance of the symbol in a second layer.

A display system may be summarized as including: a display; a processor communicatively coupled to the display; and a non-transitory, processor-readable memory communicatively coupled to the processor, the non-transitory processor-readable memory storing processor-executable data and/or instructions that, when executed by the processor, cause the display to: draw a first instance of a symbol, the first instance having a first intermediate color; and draw a second instance of the symbol, the second instance having a second intermediate color and the second instance at least partially overlapping the first instance, wherein the second instance is at least partially transparent and the first intermediate color and the second intermediate color combine to display a color of the symbol. The processor-executable data and/or instructions, when executed by the processor, may further cause the display to: draw a third instance of the symbol, the third instance having a third intermediate color and the third instance at least partially overlapping both the second instance and the first instance, wherein the third instance is at least partially transparent and the third intermediate color combines with the first intermediate color and the second intermediate color to display the color of the symbol where the third instance overlaps both the second instance and the first instance.

The processor-executable data and/or instructions, when executed by the processor, may further cause the display to: undraw the first instance of the symbol; and undraw the second instance of the symbol, wherein undrawing the first instance and undrawing the second instance separates the color of the symbol into the first intermediate color and the second intermediate color and undraws the symbol.

The symbol may have a linewidth, and the processor-executable data and/or instructions that, when executed by the processor, cause the display to draw a first instance of a symbol, may cause the display to draw the first instance of the symbol having an intermediate linewidth. The processor-executable data and/or instructions, when executed by the processor, may further cause the display to dynamically vary the intermediate linewidth to match the linewidth of the symbol.

The processor-executable data and/or instructions that, when executed by the processor, cause the display to draw a first instance of a symbol, may cause the display to initiate the drawing the first instance of the symbol at a first point in a display area of the display device. The processor-executable data and/or instructions that, when executed by the processor, cause the display to draw a second instance of the symbol, may cause the display to initiate the drawing the second instance of the symbol at a second point in the display area of the display device, the second point spatially-separated from the first point in the display area of the display device.

The processor-executable data and/or instructions, when executed by the processor, may further cause the display to apply a color gradient to the symbol.

The display system may further include a support structure that carries the display, the processor, and the non-transitory processor-readable memory, wherein the support structure positions at least a portion of the display in a field of view of an eye of a user of the display system when the support structure is worn on a head of the user. The support structure may be sized and dimensioned to at least approximate an appearance of eyeglasses. The display may include: a light engine carried by the support structure and communicatively coupled to the processor, the light engine to generate display light; and a transparent combiner carried by the support structure and positioned in the field of view of the user when the support structure is worn on the head of the user, the transparent combiner to receive display light generated by the light engine and direct the display light to the eye of the user. The light engine may include multiple light sources, each light source to generate a respective color of light. The processor-executable data and/or instructions that, when executed by the processor, cause the display to draw a first instance of a symbol, the first instance having a first intermediate color, may cause a first subset of the multiple light sources to draw the first instance of the symbol in the first intermediate color. The processor-executable data and/or instructions that, when executed by the processor, cause the display to draw a second instance of the symbol, the second instance having a second intermediate color, may cause a second subset of the multiple light sources to draw the second instance of the symbol in the second intermediate color, the second subset of the multiple light sources different from the first subset of the multiple light sources. The multiple light sources may include a red light source, a green light source, and a blue light source.

A computer program product may be summarized as including processor-executable instructions and/or data stored on one or more nontransitory computer- or processor-readable mediums (e.g., memory, registers, magnetic disks, optical disks, FLASH, HDDs, SSDs) that, when the computer program product is executed by a processor of a display device, cause the display device to: draw a first instance of a symbol, the first instance having a first intermediate color; and draw a second instance of the symbol, the second instance having a second intermediate color and the second instance at least partially overlapping the first instance, wherein the second instance is at least partially transparent and the first intermediate color and the second intermediate color combine to display the color of the symbol where the second instance overlaps the first instance. The computer program product may further include processor-executable instructions and/or data that, when the computer program product is executed by the processor of the display device, cause the display device to: draw a third instance of the symbol, the third instance having a third intermediate color and the third instance at least partially overlapping both the second instance and the first instance, wherein the third instance is at least partially transparent and the third intermediate color combines with the first intermediate color and the second intermediate color to display the color of the symbol where the third instance overlaps both the second instance and the first instance.

A method of removing a symbol from the display area of a display device may be summarized as including: display the symbol in a color; undrawing a first instance of the symbol, the first instance having a first intermediate color; and undrawing a second instance of the symbol, the second instance having a second intermediate color and the second instance at least partially overlapping the first instance, wherein undrawing the first instance and undrawing the second instance at least partially separates the color of the symbol into the first intermediate color and the second intermediate color and at least partially undraws the symbol. The method may further include: undrawing a third instance of the symbol, the third instance having a third intermediate color and the third instance at least partially overlapping the first instance and the second instance, wherein undrawing the first instance, undrawing the second instance, and undrawing the third instance separates the color of the symbol into the first intermediate color, the second intermediate color, and the third intermediate color and undraws the symbol.

A method of displaying a symbol on a display device, wherein the symbol includes a color, may be summarized as including: initiating a first line at a first point in a display area of the display device, the first line having a first intermediate color that is different from the color of the symbol; initiating a second line at a second point in the display area of the display device, the second line having a second intermediate color that is different from both the first intermediate color and the color of the symbol; dynamically extending the first line to draw the symbol; and dynamically extending the second line to draw the symbol, at least one of the first line or the second line at least partially overlapping the other one of the second line or the first line, wherein at least one of the first line and the second line is at least partially transparent, and wherein the first intermediate color and the second intermediate color combine where the first line and the second line overlap to display the color of the symbol. The color of the symbol may be white, in which case initiating a second line at a second point in the display area of the display device, the second line having a second intermediate color that is different from both the first intermediate color and the color of the symbol, may include initiating the second line at the second point in the display area of the display device, the second line having a second intermediate color that combines with the first intermediate color to display white where the first line and the second line overlap.

The method may further include: initiating a third line at a third point in the display area of the display device, the third line having a third intermediate color that is different from each of the first intermediate color, the second intermediate color, and the color of the symbol; and dynamically extending the third line to draw the symbol, the third line at least partially overlapping both the first line and the second line, wherein the first intermediate color and the second intermediate color combine with the third intermediate color where the third line overlaps both first line and the second line to display the color of the symbol. If the color of the symbol is white, then initiating a third line at a third point in the display area of the display device, the third line having a third intermediate color that is different from each of the first intermediate color, the second intermediate color, and the color of the symbol may include initiating the third line at the third point in the display area of the display device, the third line having a third intermediate color that combines with the first intermediate color and the second intermediate color to display white where the third line overlaps both the second line and the first line all overlap.

The method may further include: dynamically removing the first line; and dynamically removing the second line, wherein dynamically removing the first line and dynamically removing the second line separates the color of the symbol into the first intermediate color and the second intermediate color and dynamically removes the symbol.

The symbol may include a linewidth and at least one of the first line and/or the second line may have an intermediate linewidth that is different from the linewidth of the symbol. In this case, the method may further include dynamically varying the intermediate linewidth to match the linewidth of the symbol. The first line may have a first intermediate linewidth that is different from the linewidth of the symbol and the second line may have a second intermediate linewidth that is different from both the first intermediate linewidth and the linewidth of the symbol. In this case, the method may further include: dynamically varying the first intermediate linewidth to match the linewidth of the symbol; and dynamically varying the second intermediate linewidth to match the linewidth of the symbol. The first intermediate linewidth may be greater than the linewidth of the symbol, and dynamically varying the first intermediate linewidth to match the linewidth of the symbol may include dynamically shrinking the first intermediate linewidth to match the linewidth of the symbol. The method may further include: dynamically restoring the intermediate linewidth; dynamically removing the first line; and dynamically removing the second line, wherein dynamically restoring the intermediate linewidth, dynamically removing the first line, and dynamically removing the second line separates the color of the symbol into the first intermediate color and the second intermediate color, and wherein dynamically removing the first line and dynamically removing the second line dynamically removes the symbol.

The symbol may include an alphanumeric character. Dynamically extending the first line to draw the symbol may include dynamically extending the first line to draw the alphanumeric character. Dynamically extending the second line to draw the symbol may include dynamically extending the second line to draw the alphanumeric character.

The symbol may include a graphic having a single continuous line. Dynamically extending the first line to draw the symbol may include dynamically extending the first line to draw the graphic having the single continuous line. Dynamically extending the second line to draw the symbol may include dynamically extending the second line to draw the graphic having the single continuous line.

Initiating a second line at a second point in the display area of the display device, the second line having a second intermediate color that is different from both the first intermediate color and the color of the symbol may include initiating the second line at the second point in the display area of the display device, the second point spatially-separated from the first point in the display area of the display device.

The method may further include applying a color gradient to the symbol.

The display device may include a wearable heads-up display and the method of displaying a symbol on a display device may include a method of displaying the symbol on the wearable heads-up display.

Dynamically extending the first line to draw the symbol may include dynamically extending the first line at a first rate to draw the symbol. Dynamically extending the second line to draw the symbol may include dynamically extending the second line at a second rate to draw the symbol, the second rate different from the first rate.

Dynamically extending the first line to draw the symbol may include dynamically extending the first line in a first direction to draw the symbol. Dynamically extending the second line to draw the symbol may include dynamically extending the second line in a second direction to draw the symbol, the second direction different from the first direction.

Initiating a first line at a first point in a display area of the display device, the first line having a first intermediate color that is different from the color of the symbol, may include initiating the first line at the first point in the display area of the display device, the first line having a color gradient spanning at least two intermediate colors.

Dynamically extending the first line to draw the symbol may include persistently displaying a number of earlier portions of the first line while sequentially displaying a number of subsequent portions of the first line. Dynamically extending the second line to draw the symbol may include persistently displaying a number of earlier portions of the second line while sequentially displaying a number of subsequent portions of the second line.

A display system may be summarized as including: a display; a processor communicatively coupled to the display; and a non-transitory, processor-readable memory communicatively coupled to the processor, the non-transitory processor-readable memory storing processor-executable data and/or instructions that, when executed by the processor, cause the display to: initiate a first line at a first point in a display area of the display, the first line having a first intermediate color that is different from a color of a symbol; initiate a second line at a second point in the display area of the display, the second line having a second intermediate color that is different from both the first intermediate color and the color of the symbol; dynamically extend the first line to draw the symbol; and dynamically extend the second line to draw the symbol, at least one of the first line or the second line at least partially overlapping the other one of the second line or the first line, wherein at least one of the first line and the second line is at least partially transparent, and wherein the first intermediate color and the second intermediate color combine where the first line and the second line overlap to display the color of the symbol. The color of the symbol may be white.

The processor-executable data and/or instructions, when executed by the processor, may further cause the display to: initiate a third line at a third point in the display area of the display, the third line having a third intermediate color that is different from each of the first intermediate color, the second intermediate color, and the color of the symbol; and dynamically extend the third line to draw the symbol, the third line at least partially overlapping both the first line and the second line, wherein the first intermediate color and the second intermediate color combine with the third intermediate color where the third line overlaps both the second line and the first line to display the color of the symbol.

The processor-executable data and/or instructions, when executed by the processor, may further cause the display to: dynamically remove the first line; and dynamically remove the second line, wherein dynamically removing the first line and dynamically removing the second line separates the color of the symbol into the first intermediate color and the second intermediate color and dynamically removes the symbol.

The symbol may have a linewidth. The processor-executable data and/or instructions that, when executed by the processor, cause the display to initiate a first line at a first point in a display area of the display, may cause the display to initiate the first line having an intermediate linewidth at the first point in the display area of the display. The processor-executable data and/or instructions, when executed by the processor, may further cause the display to dynamically vary the intermediate linewidth to match the linewidth of the symbol.

The processor-executable data and/or instructions, when executed by the processor, may further cause the display to apply a color gradient to the symbol.

The display system may further include: a support structure that carries the display, the processor, and the non-transitory processor-readable memory, wherein the support structure positions at least a portion of the display in a field of view of an eye of a user of the display system when the support structure is worn on a head of the user. The support structure may be sized and dimensioned to at least approximate an appearance of eyeglasses. The display may include: a light engine carried by the support structure and communicatively coupled to the processor, the light engine to generate display light; and a transparent combiner carried the support structure and positioned in the field of view of the user when the support structure is worn on the head of the user, the transparent combiner to receive display light generated by the light engine and direct the display light to the eye of the user. The light engine may include multiple light sources, each light source to generate a respective color of light. The processor-executable data and/or instructions that, when executed by the processor, cause the display to initiate a first line at a first point in a display area of the display, the first line having a first intermediate color that is different from a color of a symbol, may cause a first subset of the multiple light sources to initiate the first line at the first point in the display area of the display, the first line having the first intermediate color that is different from the color of the symbol. The processor-executable data and/or instructions that, when executed by the processor, cause the display to initiate a second line at a second point in the display area of the display, the second line having a second intermediate color that is different from both the first intermediate color and the color of the symbol, may cause a second subset of the multiple light sources to initiate the second line at the second point in the display area of the display, the second line having the second intermediate color that is different from both the first intermediate color and the color of the symbol, and the second subset of the multiple light sources different from the first subset of the multiple light sources. The multiple light sources may include a red light source, a green light source, and a blue light source. The light engine may include a scanning laser projector.

A computer program product may be summarized as including processor-executable instructions and/or data stored on one or more nontransitory computer- or processor-readable mediums (e.g., memory, registers, magnetic disks, optical disks, FLASH, HDDs, SSDs) that, when the computer program product is executed by a processor of a display device, cause the display device to: initiate a first line at a first point in a display area of the display device, the first line having a first intermediate color that is different from the color of the symbol; initiate a second line at a second point in the display area of the display device, the second line having a second intermediate color that is different from both the first intermediate color and the color of the symbol; dynamically extend the first line to draw the symbol; and dynamically extend the second line to draw the symbol, at least one of the first line or the second line at least partially overlapping the other one of the second line or the first line, wherein at least one of the first line and the second line is at least partially transparent, and wherein the first intermediate color and the second intermediate color combine where the first line and the second line overlap to display the color of the symbol. The computer program product may further include processor-executable instructions and/or data that, when the computer program product is executed by the processor of the display device, cause the display device to: initiate a third line at a third point in the display area of the display, the third line having a third intermediate color that is different from each of the first intermediate color, the second intermediate color, and the color of the symbol; and dynamically extend the third line to draw the symbol, the third line at least partially overlapping both the first line and the second line, wherein the first intermediate color and the second intermediate color combine with the third intermediate color where the third line overlaps both the second line and the first line to display the color of the symbol.

A display system may be summarized as including: a display having a display area; a processor communicatively coupled to the display; and a non-transitory, processor-readable memory communicatively coupled to the processor, the non-transitory processor-readable memory storing processor-executable data and/or instructions that, when executed by the processor, cause the display to: display a symbol in a color; dynamically remove a first line from the display area, the first line having a first intermediate color that is different from the color of the symbol; and dynamically remove a second line from the display area, the second line having a second intermediate color that is different from both the first intermediate color and the color of the symbol, wherein dynamically removing the first line and dynamically removing the second line at least partially separates the color of the symbol into the first intermediate color and the second intermediate color and at least partially dynamically removes the symbol. The display system may further include processor-executable data and/or instructions stored in the non-transitory processor-readable memory that, when executed by the processor, cause the display to: dynamically remove a third line from the display area, the third line having a third intermediate color that is different from the first intermediate color, the second intermediate color, and the color of the symbol, wherein dynamically removing the first line, dynamically removing the second line, and dynamically removing the third line separates the color of the symbol into the first intermediate color, the second intermediate color, and the third intermediate color and dynamically removes the symbol.

A method of generating visual displays of symbols on a display device may be summarized as including: progressively displaying a first trace of a profile of a first symbol in a first color and with a first line weight and a first opacity sequentially from a first point along the profile of the first symbol in a first direction along the profile of the first symbol; and progressively displaying a second trace of the profile of the first symbol in a second color and with a second line weight and a second opacity sequentially from a second point along the profile of the first symbol in a second direction along the profile of the first symbol, concurrently with the progressively displaying the first trace of the profile of the first symbol in the first color and with the first line weight, wherein a resultant color is displayed as portions of the first and the second traces spatially at least partially overlap over time. Progressively displaying a first trace of a profile of a first symbol in a first color and with a first line weight and a first opacity sequentially from a first point along the profile of the first symbol in a first direction along the profile of the first symbol may include progressively displaying the first trace of the profile of the first symbol in the first color and with the first line weight and the first opacity sequentially from the first point along the profile of the first symbol to the second point along the profile of the first symbol in the first direction along the profile of the first symbol from the first point toward the second point. Progressively displaying a second trace of the profile of the first symbol in a second color and with a second line weight and a second opacity sequentially from a second point along the profile of the first symbol in a second direction along the profile of the first symbol may include progressively displaying the second trace of the profile of the first symbol in the second color and with the second line weight and the second opacity sequentially from the second point along the profile of the first symbol to the first point along the profile of the first symbol in the second direction along the profile of the first symbol from the second point toward the first point. The progressively displaying a second trace of the profile of the symbol in a second color and with a second line weight and a second opacity may reach the first point along the profile of the first symbol at a same time as the progressively displaying the first trace of the profile of the symbol in the first color and with the first line weight and the first opacity reaches the second point along the profile of the first symbol.

The method may further include: progressively displaying a third trace of the profile of the first symbol in a third color and with a third line weight and a third opacity sequentially from the first point along the profile of the first symbol in the first direction along the profile of the first symbol. Progressively displaying a third trace of the profile of the first symbol in a third color and with a third line weight and a third opacity sequentially from the first point along the profile of the first symbol in the first direction along the profile of the first symbol may include progressively displaying the third trace of the profile of the first symbol in the third color and with the third line weight and the third opacity sequentially from the first point along the profile of the first symbol to the second point along the profile of the first symbol in the first direction along the profile of the first symbol from the first point toward the second point. The progressively displaying a third trace of the profile of the first symbol in a third color and with a third line weight and a third opacity may start before the progressively displaying the first trace of the profile of the first symbol in the first color and with the first line weight and the first opacity. In this case, the progressively displaying the first trace of the profile of the first symbol may lag the progressively displaying the third trace of the profile of the first symbol. The progressively displaying a third trace of the profile of the first symbol in a third color and with a third line weight and a third opacity may reach the second point along the profile of the first symbol before the progressively displaying the first trace of the profile of the first symbol in the first color and with the first line weight and the first opacity reaches the second point along the profile of the first symbol. The progressively displaying a third trace of the profile of the first symbol in a third color and with a third line weight and a third opacity may include progressively displaying the third trace of the profile of the first symbol in the third color and with the third line weight which is smaller than the first line weight. The progressively displaying a third trace of the profile of the first symbol in a third color and with a third line weight and a third opacity may include progressively displaying the third trace of the profile of the first symbol in the third color and with the third line weight on a respective level which is different from a level on which the first trace is displayed.

The progressively displaying a second trace of the profile of the first symbol in a second color and with a second line weight and a second opacity may include progressively displaying the second trace of the profile of the first symbol in the second color and with the second line weight which is equal to the first line weight.

The progressively displaying a first trace of the profile of the first symbol in a first color and with a first line weight and a first opacity may include progressively displaying the first trace of the profile of the first symbol in the first color and with the first line weight and the first opacity on a first drawing level. The progressively displaying a second trace of the profile of the first symbol in a second color and with a second line weight and a second opacity may include progressively displaying the second trace of the profile of the first symbol in the second color and with the second line weight and the second opacity on a second drawing level, the second drawing level different from the first drawing level.

The progressively displaying a first trace of the profile of the first symbol in a first color and with a first line weight and a first opacity may include persistently displaying a number of earlier portions of the first trace of the profile of the first symbol in the first color and with the first line weight while sequentially displaying a number of subsequent portions of the first trace. The progressively displaying a second trace of the profile of the first symbol in a second color and with a second line weight and a second opacity may include persistently displaying a number of earlier portions of the second trace of the profile of the first symbol in the second color and with the second line weight while sequentially displaying a number of subsequent portions of the second trace.

The progressively displaying a first trace of the profile of the first symbol in a first color and with a first line weight and a first opacity may include operating at least two light sources with respective colors, the respective colors different from one another and different from the first color, to produce the first color.

The method may further include selecting at least one of the first or the second color to produce a target color (e.g., white) for portions of the profile when the first and the second traces overlap, and/or selecting at least one of the first or the second opacity to produce a target color (e.g., white) for portions of the profile when the first and the second traces overlap.

The progressively displaying a first trace of the profile of the first symbol in a first color and with a first line weight and a first opacity may include progressively displaying a first trace of the profile of an alphanumeric character.

The method may further include: progressively displaying a first trace of a profile of a second symbol in a first color and with a first line weight and a first opacity sequentially from a first point along the profile of the second symbol in a first direction along the profile of the second symbol; and progressively displaying a second trace of the profile of the second symbol in a second color and with a second line weight and a second opacity sequentially from a second point along the profile of the second symbol in a second direction along the profile of the second symbol, concurrently with the progressively displaying the first trace of the profile of the second symbol in the first color and with the first line weight, wherein a resultant color is displayed as portions of the first and the second traces spatially at least partially overlap over time, the display of the first trace and the second trace of the profile of the second symbol spaced in at least one of time or location from the display of the first trace and the second trace of the profile of the first symbol.

The method may further include: regressively displaying the first trace of the profile of the first symbol in the first color and with the first line weight and the first opacity sequentially to the first point along the profile of the first symbol in the second direction along the profile of the first symbol; and regressively displaying the second trace of the profile of the first symbol in the second color and with the second line weight and the second opacity sequentially to the second point along the profile of the first symbol in the first direction along the profile of the first symbol, concurrently with the regressively displaying the first trace of the profile of the first symbol, wherein the display of the resultant color ends as portions of the first and the second traces stop spatially overlapping over time. Regressively displaying the first trace of the profile of the first symbol in the first color and with the first line weight and the first opacity sequentially to the first point along the profile of the first symbol in the second direction along the profile of the first symbol may include regressively displaying the first trace of the profile of the first symbol in the first color and with the first line weight and the first opacity sequentially from the second point along the profile of the first symbol to the first point along the profile of the first symbol in the second direction along the profile of the first symbol from the second point toward the first point. Regressively displaying the second trace of the profile of the first symbol in the second color and with the second line weight and the second opacity sequentially to the second point along the profile of the first symbol in the first direction along the profile of the first symbol may include regressively displaying the second trace of the profile of the first symbol in the second color and with the second line weight and the second opacity sequentially from the first point along the profile of the first symbol to the second point along the profile of the first symbol in the first direction along the profile of the first symbol from the first point toward the second point.

A display system may be summarized as including: a display; a processor communicatively coupled to the display; and a non-transitory, processor-readable memory communicatively coupled to the processor, the non-transitory processor-readable memory storing processor-executable data and/or instructions that, when executed by the processor, cause the display to: progressively display a first trace of a profile of a first symbol in a first color and with a first line weight and a first opacity sequentially from a first point along the profile of the first symbol in a first direction along the profile of the first symbol; and progressively display a second trace of the profile of the first symbol in a second color and with a second line weight and a second opacity sequentially from a second point along the profile of the first symbol in a second direction along the profile of the first symbol, concurrently with the progressively displaying the first trace of the profile of the first symbol in the first color and with the first line weight, wherein a resultant color is displayed as portions of the first and the second traces spatially at least partially overlap over time. The processor-executable data and/or instructions, when executed by the processor, may further cause the display to: progressively display a third trace of the profile of the first symbol in a third color and with a third line weight and a third opacity sequentially from the first point along the profile of the first symbol in the first direction along the profile of the first symbol.

The processor-executable data and/or instructions that, when executed by the processor, cause the display to progressively display a first trace of the profile of the first symbol in a first color and with a first line weight and a first opacity may cause the display to persistently display a number of earlier portions of the first trace of the profile of the first symbol in the first color and with the first line weight while sequentially displaying a number of subsequent portions of the first trace. The processor-executable data and/or instructions that, when executed by the processor, cause the display to progressively display a second trace of the profile of the first symbol in a second color and with a second line weight and a second opacity may cause the display to persistently display a number of earlier portions of the second trace of the profile of the first symbol in the second color and with the second line weight while sequentially displaying a number of subsequent portions of the second trace.

The processor-executable data and/or instructions, when executed by the processor, may further cause the display to: progressively display a first trace of a profile of a second symbol in a first color and with a first line weight and a first opacity sequentially from a first point along the profile of the second symbol in a first direction along the profile of the second symbol; and progressively display a second trace of the profile of the second symbol in a second color and with a second line weight and a second opacity sequentially from a second point along the profile of the second symbol in a second direction along the profile of the second symbol, concurrently with the progressively displaying the first trace of the profile of the second symbol in the first color and with the first line weight, wherein a resultant color is displayed as portions of the first and the second traces spatially at least partially overlap over time, the display of the first trace and the second trace of the profile of the second symbol spaced in at least one of time or location from the display of the first trace and the second trace of the profile of the first symbol.

The processor-executable data and/or instructions, when executed by the processor, may further cause the display to: regressively display the first trace of the profile of the first symbol in the first color and with the first line weight and the first opacity sequentially to the first point along the profile of the first symbol in the second direction along the profile of the first symbol; and regressively display the second trace of the profile of the first symbol in the second color and with the second line weight and the second opacity sequentially to the second point along the profile of the first symbol in the first direction along the profile of the first symbol, concurrently with the regressively displaying the first trace of the profile of the first symbol, wherein the display of the resultant color ends as portions of the first and the second traces stop spatially overlapping over time.

The display system may further include a support structure that carries the display, the processor, and the nontransitory processor-readable memory, wherein the support structure positions at least a portion of the display in a field of view of an eye of a user of the display system when the support structure is worn on a head of the user. The support structure may be sized and dimensioned to at least approximate an appearance of eyeglasses. The display may include: a light engine carried by the support structure and communicatively coupled to the processor, the light engine to generate display light; and a transparent combiner carried the support structure and positioned in the field of view of the user when the support structure is worn on the head of the user, the transparent combiner to receive display light generated by the light engine and direct the display light to the eye of the user. The light engine may include multiple light sources, each light source to generate a respective color of light. The processor-executable data and/or instructions that, when executed by the processor, cause the display to progressively display a first trace of a profile of a first symbol in a first color and with a first line weight and a first opacity sequentially from a first point along the profile of the first symbol in a first direction along the profile of the first symbol, may cause a first subset of the multiple light sources to progressively display the first trace of the profile of the first symbol in the first color and with the first line weight and the first opacity sequentially from the first point along the profile of the first symbol in the first direction along the profile of the first symbol. The processor-executable data and/or instructions that, when executed by the processor, cause the display to progressively display a second trace of the profile of the first symbol in a second color and with a second line weight and a second opacity sequentially from a second point along the profile of the first symbol in a second direction along the profile of the first symbol, may cause a second subset of the multiple light sources to progressively display the second trace of the profile of the first symbol in the second color and with the second line weight and the second opacity sequentially from the second point along the profile of the first symbol in the second direction along the profile of the first symbol, the second subset of the multiple light sources different from the first subset of the multiple light sources. The multiple light sources may include a red light source, a green light source, and a blue light source.

A computer program product may be summarized as including processor-executable instructions and/or data stored on one or more nontransitory computer- or processor-readable mediums (e.g., memory, registers, magnetic disks, optical disks, FLASH, HDDs, SSDs) that, when the computer program product is executed by a processor of a display device, cause the display device to: progressively display a first trace of a profile of a first symbol in a first color and with a first line weight and a first opacity sequentially from a first point along the profile of the first symbol in a first direction along the profile of the first symbol; and progressively display a second trace of the profile of the first symbol in a second color and with a second line weight and a second opacity sequentially from a second point along the profile of the first symbol in a second direction along the profile of the first symbol, concurrently with the progressively displaying the first trace of the profile of the first symbol in the first color and with the first line weight, wherein a resultant color is displayed as portions of the first and the second traces spatially at least partially overlap over time. The computer program product may further include processor-executable instructions and/or data that, when the computer program product is executed by the processor of the display device, cause the display device to: progressively display a third trace of the profile of the first symbol in a third color and with a third line weight and a third opacity sequentially from the first point along the profile of the first symbol in the first direction along the profile of the first symbol.

A computer program product may be summarized as including processor-executable instructions and/or data stored on one or more nontransitory computer- or processor-readable mediums (e.g., memory, registers, magnetic disks, optical disks, FLASH, HDDs, SSDs) that, when the computer program product is executed by a processor of a display device, cause the display device to: display a first symbol in a symbol color; regressively display a first trace of a profile of the first symbol in a first color and with a first line weight and a first opacity sequentially from a first point along the profile of the first symbol in a first direction along the profile of the first symbol; and regressively display a second trace of the profile of the first symbol in a second color and with a second line weight and a second opacity sequentially from a second point along the profile of the first symbol in a second direction along the profile of the first symbol, concurrently with the regressively displaying the first trace of the profile of the first symbol, wherein the display of the symbol color ends as portions of the first and the second traces spatially separate over time. The computer program product may further include processor-executable instructions and/or data that, when the computer program product is executed by the processor of the display device, cause the display device to: regressively display a third trace of the profile of the first symbol in a third color and with a third line weight and a third opacity sequentially from a third point along the profile of the first symbol in a third direction along the profile of the first symbol, concurrently with the regressively displaying the first trace of the profile of the first symbol and the regressively displaying the second trace of the profile of the first symbol, wherein the display of the symbol color ends as portions of the first trace, the second trace, and the third trace spatially separate over time.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 1H is an illustrative diagram of an example of an eighth phase or stage in a display of a symbol (i.e., the number 0) in the display area of a display device in accordance with the present systems, devices, and methods.

FIG. 1I is an illustrative diagram of an example of a ninth phase or stage in a display of a symbol (i.e., the number 0) in the display area of a display device in accordance with the present systems, devices, and methods.

DETAILED DESCRIPTION

Figure 1A:
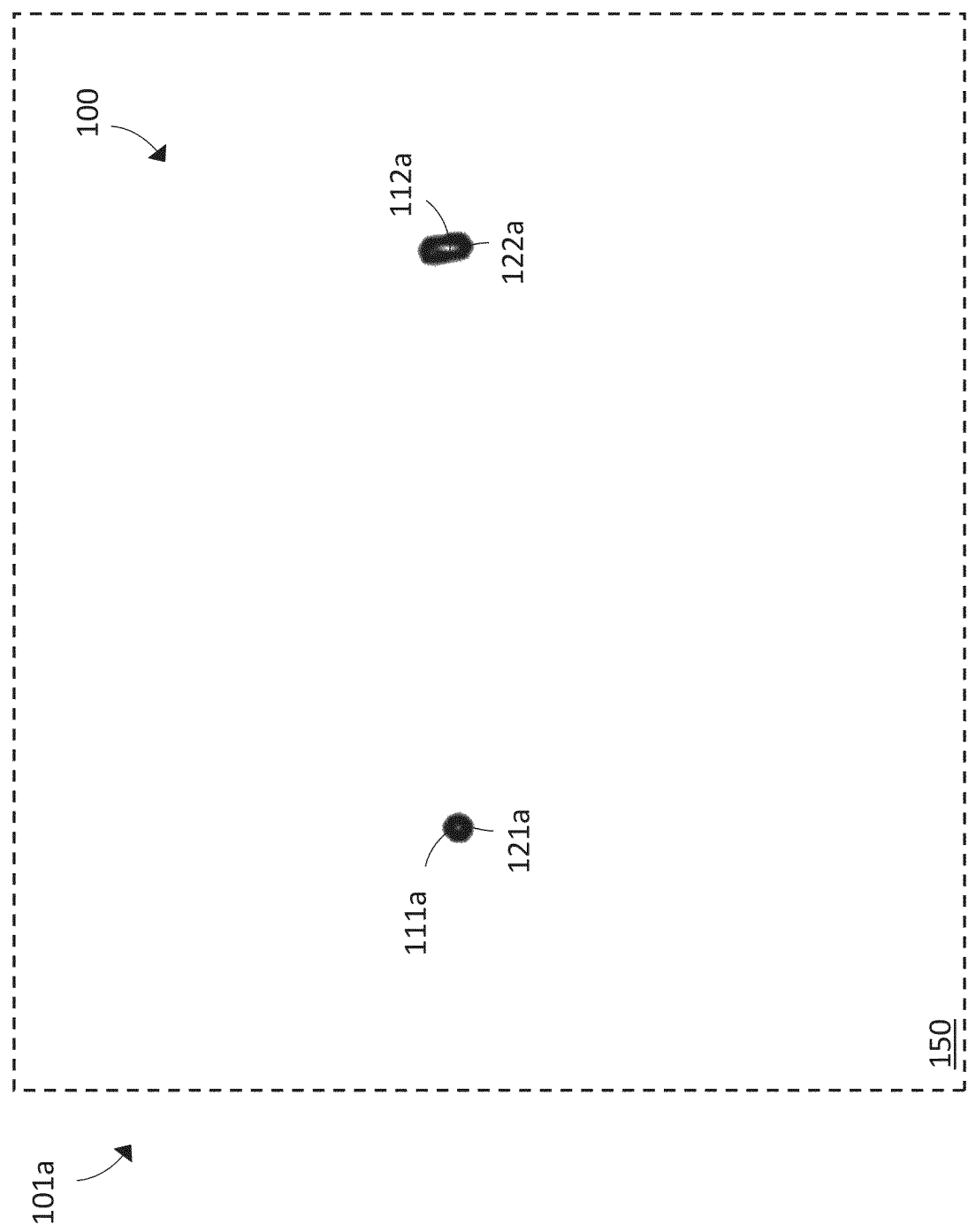
FIG. 1A is an illustrative diagram of an example of a first phase or stage in a display of a symbol (i.e., the number 0) in the display area of a display device in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices, head-worn devices, displays or screens, projectors, and computers, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Wearable heads-up displays overlay display content on the user's view of their external environment. The real and the virtual are visually combined, therefore the form in which the display content is presented can have a prominent influence on how the user engages with their world. For example, highly overt display content (such as content that is displayed too abruptly, too brightly, or garishly) can detract from the user's experience of their external environment and limit the user's enjoyment of and/or interest in using the wearable heads-up display. A more pleasant user experience may be achieved by presenting display content in a more aesthetically pleasing way; however, some applications (such as providing important visual notifications to the user) can still require the introduction of the display content to catch the user's attention. There is a tradeoff in the design of display content: on the one hand the display content should be subtle and aesthetically pleasing so as not to clash with or undesirably detract from the user's external environment, and on the other hand the display content should be presentable in a way that readily catches the user's visual attention when necessary. The various embodiments described herein accommodate this tradeoff to provide systems, devices, and methods for displaying visual symbols in ways that are simultaneously aesthetically pleasing and captivating of the user's attention.

Throughout this specification and the appended claims, reference is often made to a "symbol," such as a visual symbol displayed on or by a display device. Unless the specific context requires otherwise, the term "symbol" is generally used to refer to any graphical character, icon, pictograph, glyph, emoji, or emblem, that is visually interpretable by the user, including without limitation any alphanumeric character such as a letter of any alphabet or a number in any numbering system.

In at least one implementation, the present systems, devices, and methods display one or more visual symbols by gradually generating, combining, and aligning constituent components and/or properties of the symbol(s). That is, when a symbol X is to be displayed having properties Y, at first something is displayed that does not much resemble the symbol X or its properties Y, but this "something" is dynamically and/or progressively evolved to become the symbol X having properties Y. Throughout this specification and the appended claims, the term "dynamically" is used to refer to an evolution over time and the term "progressively" is used to refer to an additive evolution in which new components, portions, and/or properties are added or applied to existing components, portions, and/or properties.

An illustrative example of a visual symbol displayed in accordance with the present systems, devices, and methods is shown through FIGS. 1A, 1B, 1C, 1D, 1E, 1F, 1G, 1H, 1I, and 1J. FIGS. 1A, 1B, 1C, 1D, 1E, 1F, 1G, 1H, 1I, and 1J show exemplary successive discrete time captures of the display area of a display device (e.g., a wearable heads-up display device, though a person of skill in the art will appreciate that other display devices may be used, such as television screens, projection displays, computer monitors, laptop/tablet/smartphone displays, and the like) during a display of the number 0 (zero) in accordance with the present systems, devices, and methods, while a person of skill in the art should appreciate that the evolutions shown may continue in between such discrete time captures in order to provide a smooth and continuous effect.

FIG. 1A is an illustrative diagram of an example of a first phase or stage 101a in a display of a symbol (i.e., the number 0) 100 in the display area 150 of a display device (not shown) in accordance with the present systems, devices, and methods. First stage 101a represents a time capture of the initiation of the display of symbol 100 by the display device. At exemplary first stage 101a, at least two spatially-separated components or portions 111a and 112a of symbol 100 are displayed by the display device (i.e., spatially-separated over display area 150 of the display device). More specifically, a first component or portion 111a of symbol 100 is displayed by the display device at a first point 121a in display area 150 and a second component or portion 112a of symbol 100 is displayed by the display device at a second point 122a in display area 150. First point 121a and second point 122a are both respective points on symbol 100, though at stage 101a the portions of symbol 100 that connect between first point 121a and second point 122a are not yet displayed.

Generally, symbol 100 may have an intended or "target" or "final" color; that is, a color which symbol 100 has once symbol 100 is displayed in its entirety by the display device. For example, when a visual symbol is an alphanumeric character as in the case of symbol 100, the intended or target color may be the font color for the character. In accordance with the present systems, devices, and methods, a symbol may have a final or target color that is produced by (or resultant from) an additive combination of respective intermediate colors of multiple constituent components or portions of which the symbol is composed. To this end, at first stage 101a first component or portion 111a of symbol 100 may have a first intermediate color (not discernible in FIG. 1A) and second component or portion 112a of symbol 100 may have a second intermediate color (not discernible in FIG. 1A), where the first intermediate color and the second intermediate color are different from one another and both different from the final target color of symbol 100.

Throughout this specification and the appended claims, the term "intermediate color" is used to refer to at least one color that is displayed during the visual composition of a symbol but is different from the color of the visual symbol itself, and so different from the color with which the symbol is displayed once the symbol is fully visually composed.

Figure 1B:
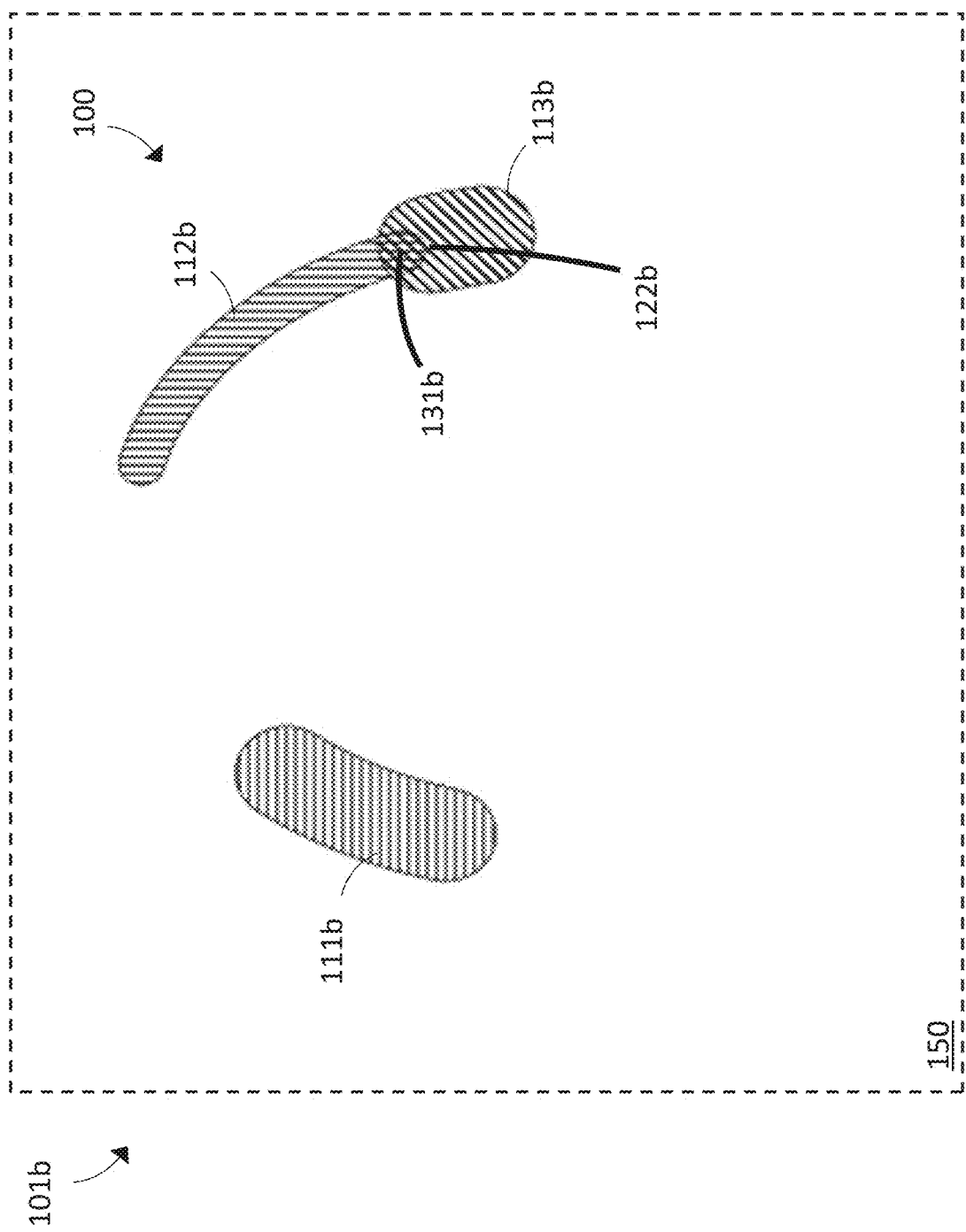
FIG. 1B is an illustrative diagram of an example of a second phase or stage in a display of a symbol (i.e., the number 0) in the display area of a display device in accordance with the present systems, devices, and methods.

FIG. 1B is an illustrative diagram of an example of a second phase or stage 101b in a display of a symbol 100 (i.e., the number 0) in the display area 150 of a display device (not shown) in accordance with the present systems, devices, and methods. Second stage 101b represents a subsequent time capture of the display of symbol 100 by the display device successively following the time capture represented by first stage 101a. The amount of time in between first stage 101a and second stage 101b may vary depending on the specific implementation, but generally FIGS. 1A, 1B, 1C, 1D, 1E, 1F, 1G, 1H, 1I, and 1J depict the display of symbol 100 in ten stages, so second stage 101b represents symbol 100 at roughly the second of ten display stages.

At exemplary second stage 101b, first and second portions 111a and 112a of symbol 100 from first stage 101a continue to persist at respective points 121a and 122a in display area 150, but first portion 111a has evolved (e.g., been further drawn, dynamically extended, and/or progressively displayed/traced) to become first line segment 111b and second portion 112a has evolved (e.g., dynamically extended and/or progressively displayed) to become second line segment 112b. That is, in between first stage 101a and second stage 101b, the display device has drawn, progressively traced, or otherwise dynamically extended line segments 111b and 112b each originating from a respective one of portions 111a and 112a. Each of line segments 111b and 112b dynamically and/or progressively follows, traces, or draws a respective instance or profile of symbol 100, and at second phase 101b such dynamic and/or progressive following, tracing, or drawing is not yet complete. As will become more apparent in later stages, each of line segments 111b and 112b may correspond to different respective overlapping "display layers" of display area 150 and each of line segments 111b and 112b may have a respective opacity (i.e., at least one of line segments 111b and 112b may be at least partially transparent).

In FIG. 1B (and continuing through FIGS. 1C, 1D, 1E, 1F, 1G, 1H, 1I, and 1J), the first intermediate color of first line segment 111b is represented by horizontal hatching and the second intermediate color of second line segment 112b is represented by vertical hatching. At exemplary second stage 101b, first line segment 111b has a first linewidth or line weight and second line segment 112b has a second linewidth or line weight that is different from the first linewidth or line weight of first line segment 111b. Generally, symbol 100 may have an intended or "target" of "final" linewidth or line weight; that is, a linewidth or line weight which symbol 100 has once symbol 100 is displayed in its entirety by the display device. For example, when a visual symbol is an alphanumeric character as in the case of symbol 100, the intended or target linewidth or line weight may be a property of the font for the character. In accordance with the present systems, devices, and methods, a symbol may have a final or target linewidth or line weight that is independent of the linewidths or line weights of components, segments, or portions of which the symbol is comprised, where the linewidths or line weights of the components, segments, or portions of which the symbol is comprised may evolve (e.g., shrink or grow), if necessary, to match the linewidth or line weight of the symbol.

Throughout this specification and the appended claims, the terms "intermediate linewidth" and "intermediate line weight" are used to a linewidth or line weight, respectively, that is displayed during the visual composition of a symbol but is independent of (e.g., the same as or different from) the linewidth or line weight of the visual symbol itself, and so independent of (e.g., the same as or different from) the linewidth or line weight with which the symbol is displayed once the symbol is fully visually composed.

In addition to first and second line segments 111b and 112b, a third line segment 113b is displayed at exemplary second stage 101b. Third line segment 113b originates at substantially the same point 122b as second line segment 112b and at least one of second line segment 112b or third line segment 113b at least partially overlaps the other of third line segment 113b or second line segment 112b. For example, second line segment 112b and third line segment 113b may be carried in different respective display layers of display area 150 such that either second line segment 112b at least partially overlaps third line segment 113b or third line segment 113b at least partially overlaps second line segment 112b. Third line segment 113b has a third intermediate color that is represented by diagonal hatching (in FIG. 1B and continuing through FIGS. 1C, 1D, 1E, 1F, 1G, 1H, 1I, and 1J), as well as a third opacity and a third linewidth or line weight. The third linewidth or line weight of third line segment 113b is noticeably different from the second linewidth or line weight of second line segment 112b. In the region 131b where there is overlap between second line segment 112b and third line segment 113b, the second intermediate color of second line segment 112b and the third intermediate color of third line segment 113b combine to produce a new color (represented by a combination of vertical hatching and diagonal hatching in FIG. 1B and continuing through FIGS. 1C, 1D, 1E, 1F, 1G, 1H, 1I, and 1J), which may be an additional intermediate color or may be the color of symbol 100 (i.e., the final target color of symbol 100) depending on the specific implementation (e.g., depending on whether or not the specific implementations employs additional instances or traces of symbol 100, such as first line segment 111b, that must be combined with second line segment 112b and third line segment 113b to produce/display the color of symbol 100). In order to achieve this color combination, at least one of second line segment 112b and/or third line segment 113b is at least partially transparent. More specifically, when second line segment 112b overlaps third line segment 113b (e.g., when second line segment 112b is carried in a display layer that overlaps the display layer that carries third line segment 113b), second line segment 112b is at least partially transparent and when third line segment 113b overlaps second line segment 112b (e.g., when third line segment 113b is carried in a display later that overlaps the display layer that carries second line segment 112b), third line segment 113b is at least partially transparent. In other words, in a vertical stack of display layers, color combination may be achieved when the top layer (and intervening layers) are at least partially transparent, while the opacity of the bottom layer may vary depending on the specific application.

Throughout this specification and the appended claims, reference is often made to at least two colors "combining" or "being combined" to produce another color. Color combination can be achieved in a wide variety of different ways, including without limitation: additive mixing or blending, subtractive mixing or blending, interpolative mixing or blending, multiplicative mixing or blending, and the like. Various implementations of the present systems, devices, and methods may employ any of these or still other techniques of color combination. Generally, the display devices described herein may employ software (i.e., processor-executable data and/or instructions) that, when executed by a processor, cause the display device to display a new color in regions of the display area where a first color and a second color overlap. Such new color may be consistent with actual physics as in the case of additive blending (e.g., in a region where red and green overlap, the display device may display yellow), or such new color may be completely artificial and inconsistent with actual physics (e.g., in a region where red and green overlap, the display device may display blue).

In accordance with present systems, devices, and methods, in some implementations the display device may specifically take advantage of the actual physics of additive color mixing to define intermediate colors for constituent components, segments, or portions of a visual symbol such that when the constituent components, segments, or portions combine (e.g., when the constituent components, segments, or portions overlap) their respective intermediate colors additively combine to produce (i.e., display) the color of the symbol. For example, in a display device that employs multiple light sources including a red light source, a green light source, and a blue light source (e.g., a display device employing a scanning laser projector having a red laser diode, a green laser diode, and a blue laser diode), if the intended final target color of the visual symbol to be displayed is white, then the display device may display (e.g., project): a first trace or instance of the profile of the visual symbol in red using only the red light source (e.g., the red laser diode); a second trace or instance of the profile of the visual symbol in green using only the green light source (e.g., the green laser diode); and a third trace or instance of the profile of the visual symbol in blue using only the blue light source (e.g., the blue laser diode). In this scenario, regions of the display area where the red and green traces or instances overlap will be displayed as yellow, regions of the display area where the red and blue traces or instances overlap will be displayed as purple (or magenta), regions of the display area where the blue and green traces or instances overlap will be displayed as cyan, and regions of the display area where the red, blue, and green traces or instances all overlap will be displayed as white (i.e., the intended final target color of the symbol). In some implementations, the number of traces or instances of the visual symbol may match the number of individual colors of multiple light sources in the display device (e.g., if there are three light sources each a respective one of three colors—one red, one green, and one blue—then the number of traces or instances of the visual symbol may be three) and the respective intermediate colors of the traces or instances of the symbol may be respectively matched to the individual colors of the multiple light sources in the display device (e.g., one red trace or instance, one green trace or instance, and one blue trace or instance). In some implementations, the respective intermediate colors of respective traces or instances of the symbol may comprise mixed or blended colors. For example, in the case where the display device comprises three light sources: a red light source, a green light source, and a blue light source, the respective traces or instances of the symbol may include a yellow trace or instance, a purple or magenta trace or instance, and a cyan trace or instance (which, similar to the example of red, green, and blue instances, will produce a white symbol where all three instances overlap). Intermediate colors may also include color gradients, such as spatial color gradients and/or temporal color gradients. For example, a first trace or instance of the symbol in a first intermediate color may include both a red portion and a spatially-separated green portion with a smooth color transition (i.e., gradient) from red to green over the portion of the trace or instance that connects between the red portion and the spatially-separated green portion. In this case, the intended final target of the symbol may still be realized as long as at least one of the other trace(s) or instance(s) of the symbol is colored to account or compensate for the gradient in the first trace or instance (e.g., if at least one other trace or instance also employs a color gradient). As another example, the intermediate color of a first trace or instance of the symbol may vary in time as the display device draws (e.g., dynamically extends and/or progressively traces) the first trace or instance (i.e., a temporal color gradient), and the intended final target color of the symbol may still be achieved as long as at least one of the other trace(s) or instance(s) of the symbol is colored to account or compensate for the temporal gradient in the first trace or instance (e.g., if at least one other trace or instance also employs a temporal color gradient).

Because the various instances of "color" described herein may employ one or more color gradients, throughout this specification and the appended claims, unless the specific context requires otherwise the term "color" should be interpreted loosely to refer to a "color scheme" they may employ a single color, multiple discrete colors, or at least two colors with a smooth color transition gradient connecting therebetween.

In some implementations, the number of traces or instances of the symbol may be more or less than the number of different colors of light sources in the display device, and in some implementations, the number of different intermediate colors employed in the traces or instances of the symbol may be more or less than the number of different colors of light sources in the display device.

Figure 1C:
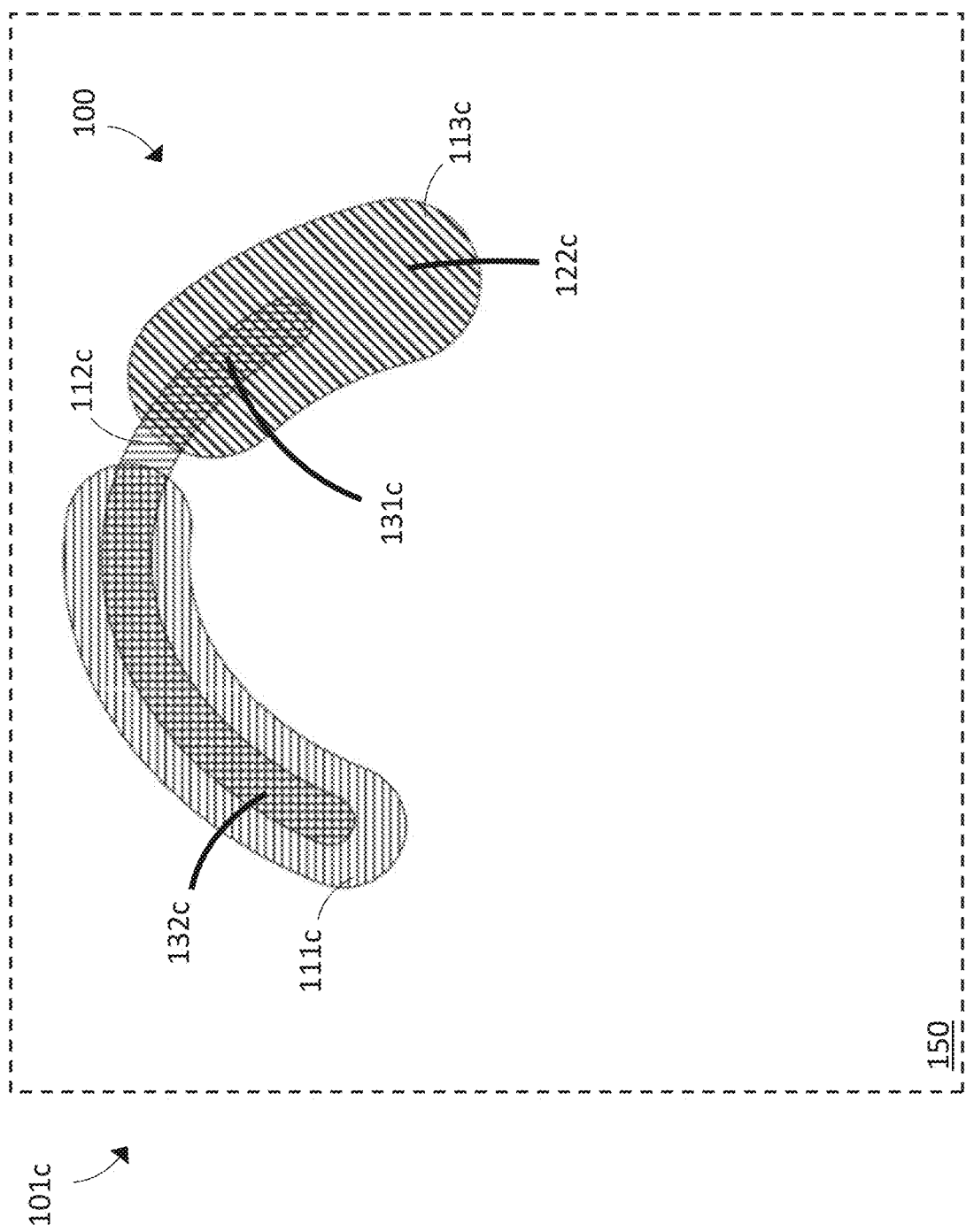
FIG. 1C is an illustrative diagram of an example of a third phase or stage in a display of a symbol (i.e., the number 0) in the display area of a display device in accordance with the present systems, devices, and methods.

FIG. 1C is an illustrative diagram of an example of a third phase or stage 101c in a display of a symbol 100 (i.e., the number 0) in the display area 150 of a display device (not shown) in accordance with the present systems, devices, and methods. Third stage 101c represents a subsequent time capture of the display of symbol 100 by the display device successively following the time capture represented by second stage 101b. The amount of time in between second stage 101b and third stage 101c may vary depending on the specific implementation, but generally FIGS. 1A, 1B, 1C, 1D, 1E, 1F, 1G, 1H, 1I, and 1J depict the display of symbol 100 in ten stages, so third stage 101c represents symbol 100 at roughly the third of ten display stages.

At exemplary third stage 101c, first, second, and third line segments 111b, 112b, and 113b of symbol 100 from second stage 101b continue to substantially persist and have evolved (e.g., been further drawn, dynamically extended, and/or progressively traced) to become first line segment 111c, second line segment 112c, and third line segment 113c, respectively. That is, in between second stage 101b and third stage 101c, the display device has drawn, progressively traced, or otherwise dynamically extended each of line segments 111b, 112b, and 113b to continue to follow, trace, or draw a respective instance or profile of symbol 100, and at third stage 101c such following, tracing, or drawing is not yet complete. In the illustrated implementation, at least a portion of second line segment 112b from second stage 101b has also been "undrawn," (e.g., dynamically removed, progressively erased, or regressively traced) in the evolution to second line segment 112c at third stage 101c. Particularly, third line segment 112c no longer connects or overlaps with point 122c in display area 150. This feature is optional and is implemented in the illustrative example of third stage 101c to enhance the fluidity or dynamic nature of the third trace or instance corresponding to third line segment 112c in order to enhance aesthetic appeal and simultaneously further captivate the user's attention. Generally, a "tail end" of a line segment corresponding to any trace or instance of a visual symbol may retract or regressively shrink while a "lead end" of the line segment continues to extend of progressively grow as long as the line segment (e.g., third line segment 112c) continues to extend or progressively grow at the lead end at a faster rate than it retracts or regressively shrinks at the tail end, such that the trace or instance (e.g., third trace or instance) that corresponds to the line segment (e.g., third line segment 112c) will still ultimately complete a full trace or instance of the profile of the symbol (e.g., symbol 100).

Throughout this specification and the appended claims, the term "regressively" is used to refer to a subtractive evolution in which existing components, portions, and/or properties are removed or reduced.

At exemplary third stage 101c, first line segment 111c has the first intermediate color, the first linewidth or line weight, and the first opacity; second line segment 112c has the second intermediate color, the second linewidth or line weight, and the second opacity; and third line segment 113c has the third intermediate color, the third linewidth or line weight, and the third opacity. The first intermediate color, the second intermediate color, and the third intermediate color are all different from one another, and all different from an intended final target color of symbol 100. The first linewidth or line weight, the second linewidth or line weight, and the third linewidth or line weight are all different from one another, and at least two of the first, second, and third linewidth or line weight are different from an intended final target linewidth or line weight of symbol 100. In some implementations, including the illustrated example shown in FIGS. 1A, 1B, 1C, 1D, 1E, 1F, 1G, 1H, 1I, and 1J, the first linewidth or line weight of the first line segment (111c) and/or the second linewidth or line weight of the second line segment (112c) and/or the third linewidth or line weight of the third line segment (113c) may first evolve in one direction (e.g., grow or shrink) and then evolve in another direction (e.g., shrink or grow) throughout the evolving display of the symbol (100).

The first opacity, the second opacity, and the third opacity may be set, applied, selected, or implemented to control the mixing or blending of the various combinations of the first intermediate color, the second intermediate color, and/or the third intermediate color in various regions of display area 150 where there is overlap between various combinations of first line segment 111c, second line segment 112c, and/or third line segment 113c. Specifically: in first region 131c of display area 150 second line segment 112c and third line segment 113c are overlaid one on top of the other and the second opacity and the third opacity are set, applied, selected, or implemented so that the second intermediate color of second line segment 112c and the third intermediate color of third line segment 113c additively blend or mix to produce (i.e., display) the new intermediate color; and in second region 132c of display area 150 first line segment 111c and second line segment 112c are overlaid one on top of the other and the first opacity and the second opacity are set, applied, selected, or implemented so that the first intermediate color of first line segment 111c and the second intermediate color of second line segment 112c additively blend or mix to produce (i.e., display) another new intermediate color (represented by a combination of horizontal hatching and vertical hatching in FIG. 1C and continuing through FIGS. 1D, 1E, 1F, 1G, 1H, 1I, and 1J). In some implementations, two traces or instances of a symbol (e.g., first line segment 111c and third line segment 113c) may alone combine to produce the color of the symbol rather than a new intermediate color, but in the illustrated example of FIGS. 1A, 1B, 1C, 1D, 1E, 1F, 1G, 1H, 1I, and 1J the color of symbol 100 is produced/displayed when two traces or instances (111c, 113c) of the profile of symbol 100 combine with one another and with a third instance or trace (112c) of the profile of symbol 100.

In the example above, reference is made to setting, applying, selecting, or implementing the respective opacities of various line segments so that at least two intermediate colors additively blend or mix to produce a new color (e.g., a new intermediate color or the intended final target color of the symbol). This may be achieved in a variety of different ways. In the illustrated example of symbol 100, each of the three instances or traces of the profile of symbol 100 (i.e., respectively corresponding to first line segment 111c, second line segment 112c, and third line segment 113c at third stage 101c) may be carried in a respective display layer and overlaid one on top of the other. This overlaying of display layers may produce a stack of display layers, and consequently a stack of traces or instances of the profile of symbol 100. Thus, in this exemplary implementation, additive blending or mixing of the respective intermediate colors of two or more traces or instances of symbol 100 may be achieved by setting, applying, selecting, or otherwise implementing an incomplete opacity (corresponding to at least partial transparency) for each layer or instance that is not the base layer or instance in the stack. More specifically, if first line segment 111c corresponds to the base or "bottommost" layer of a stack of display layers in display area 150 and second line segment 112c corresponds to a higher-level layer of the stack such that second line segment 112c is overlaid "on top of" first line segment 111c, then the second opacity of second line segment 112c may be set, applied, selected, or implemented to be at least partially transparent so that the first intermediate color of first line segment 111c and the second intermediate color of second line segment 112c additively blend or mix together to produce a new intermediate color. Likewise, if third line segment 113c corresponds to the top or "uppermost" layer of the stack of display layers in display area 150 and second line segment 112c corresponds to a lower-level layer of the stack such that third line segment 113c is overlaid "on top of" second line segment 112c (thus sandwiching second line segment 112c in between first line segment 111c and third line segment 113c), then the third opacity of third line segment 113c may be set, applied, selected, or implemented to be at least partially transparent so that the third intermediate color of third line segment 113c and the second intermediate color of second line segment 112c additively blend or mix together to produce another new intermediate color.

A person of skill in the art will appreciate that, throughout this specification and the appended claims, the concepts of "layers' (e.g., "display layers") and "stacks," including the descriptions of such as being vertically aligned (e.g., top, bottom, base, upper, etc.) are all used in a conceptual graphics sense in relational to a two-dimensional display area (e.g., display area 150) and are not meant to require that there exist a thickness to the display area or any measure of real physical vertical separation between the elements displayed.

Figure 1D:
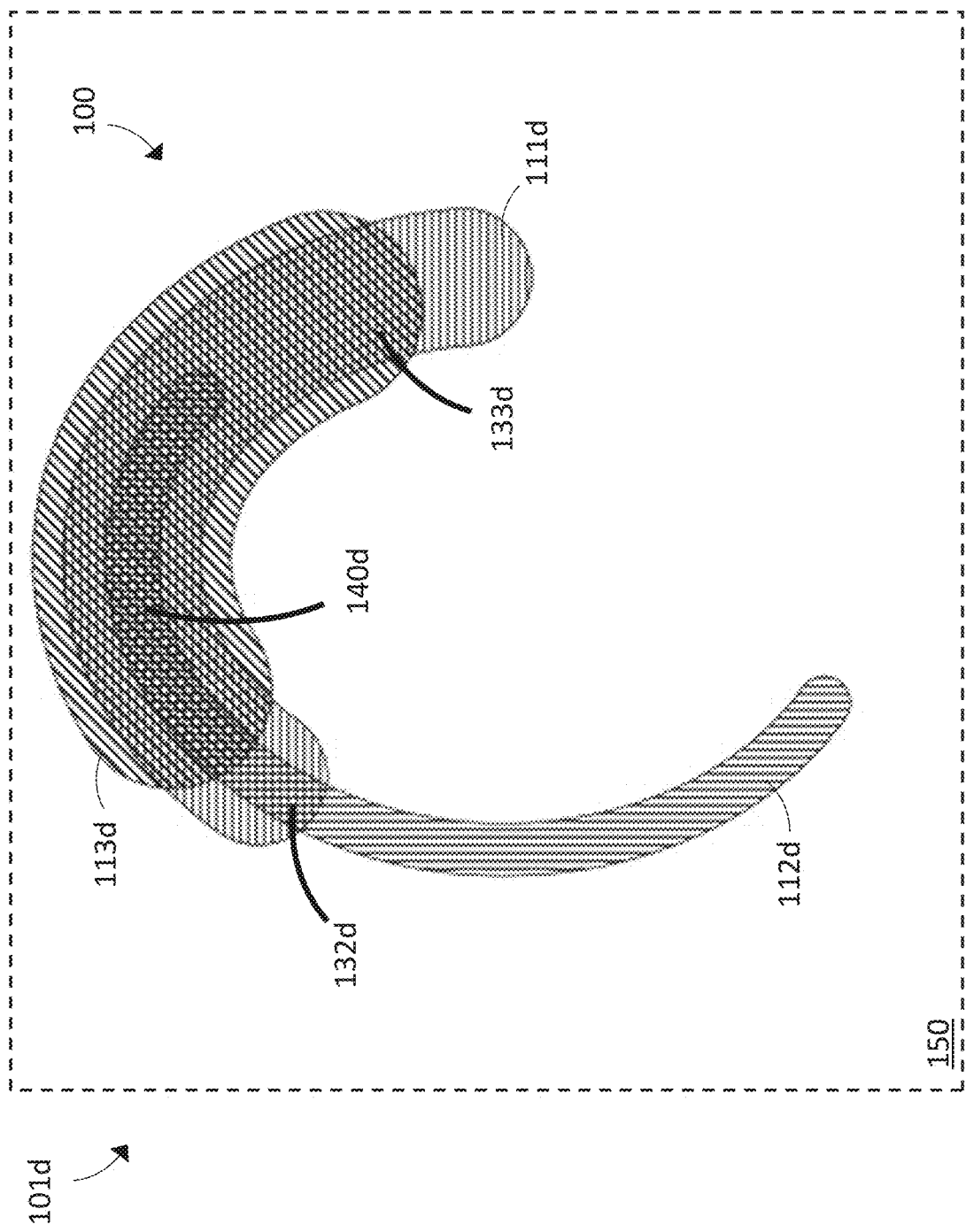
FIG. 1D is an illustrative diagram of an example of a fourth phase or stage in a display of a symbol (i.e., the number 0) in the display area of a display device in accordance with the present systems, devices, and methods.

FIG. 1D is an illustrative diagram of an example of a fourth phase or stage 101d in a display of a symbol 100 (i.e., the number 0) in the display area 150 of a display device (not shown) in accordance with the present systems, devices, and methods. Fourth stage 101d represents a subsequent time capture of the display of symbol 100 by the display device successively following the time capture represented by third stage 101c. The amount of time in between third stage 101c and fourth stage 101d may vary depending on the specific implementation, but generally FIGS. 1A, 1B, 1C, 1D, 1E, 1F, 1G, 1H, 1I, and 1J depict the display of symbol 100 in ten stages, so fourth stage 101d represents symbol 100 at roughly the fourth of ten display stages.

At exemplary fourth stage 101d, first, second, and third line segments 111c, 112c, and 113c of symbol 100 from third stage 101c continue to substantially persist and have evolved (e.g., been further drawn, dynamically extended, and/or progressively traced) to become first line segment 111d, second line segment 112d, and third line segment 113d, respectively. That is, in between third stage 101c and fourth stage 101d, the display device has drawn, progressively traced, or otherwise dynamically extended each of line segments 111c, 112c, and 113c to continue to follow, trace, or draw a respective instance or profile of symbol 100, and at fourth stage 101d such following, tracing, or drawing is not yet complete. First line segment 111d has the first intermediate color, the first linewidth or line weight, and the first opacity; second line segment 112d has the second intermediate color, the second linewidth or line weight, and the second opacity; and third line segment 113d has the third intermediate color, the third linewidth or line weight, and the third opacity. First line segment 111d and second line segment 112d overlap in region 132d to produce/display another intermediate color in region 132d; first line segment 111d and third line segment 113d overlap in region 133d to produce/display another new intermediate color, represented by a combination of horizontal hatching and diagonal hatching in FIG. 1D and continuing through FIGS. 1E, 1F, 1G, 1H, 1I, and 1J, in region 133d; and all three of first line segment 111d, second line segment 112d, and third line segment 113d overlap in region 140d to produce/display the color, represented by a combination of horizontal hatching, vertical hatching, and diagonal hatching in FIG. 1D and continuing through FIGS. 1E, 1F, 1G, 1H, 1I, and 1J, of symbol 100 in region 140d. Note that while there was a region 131c at stage 101c in which first line segment 111c and second line segment 112c overlapped without also having third line segment 113c in the stack, there is no such region at stage 101d.

Figure 1E:
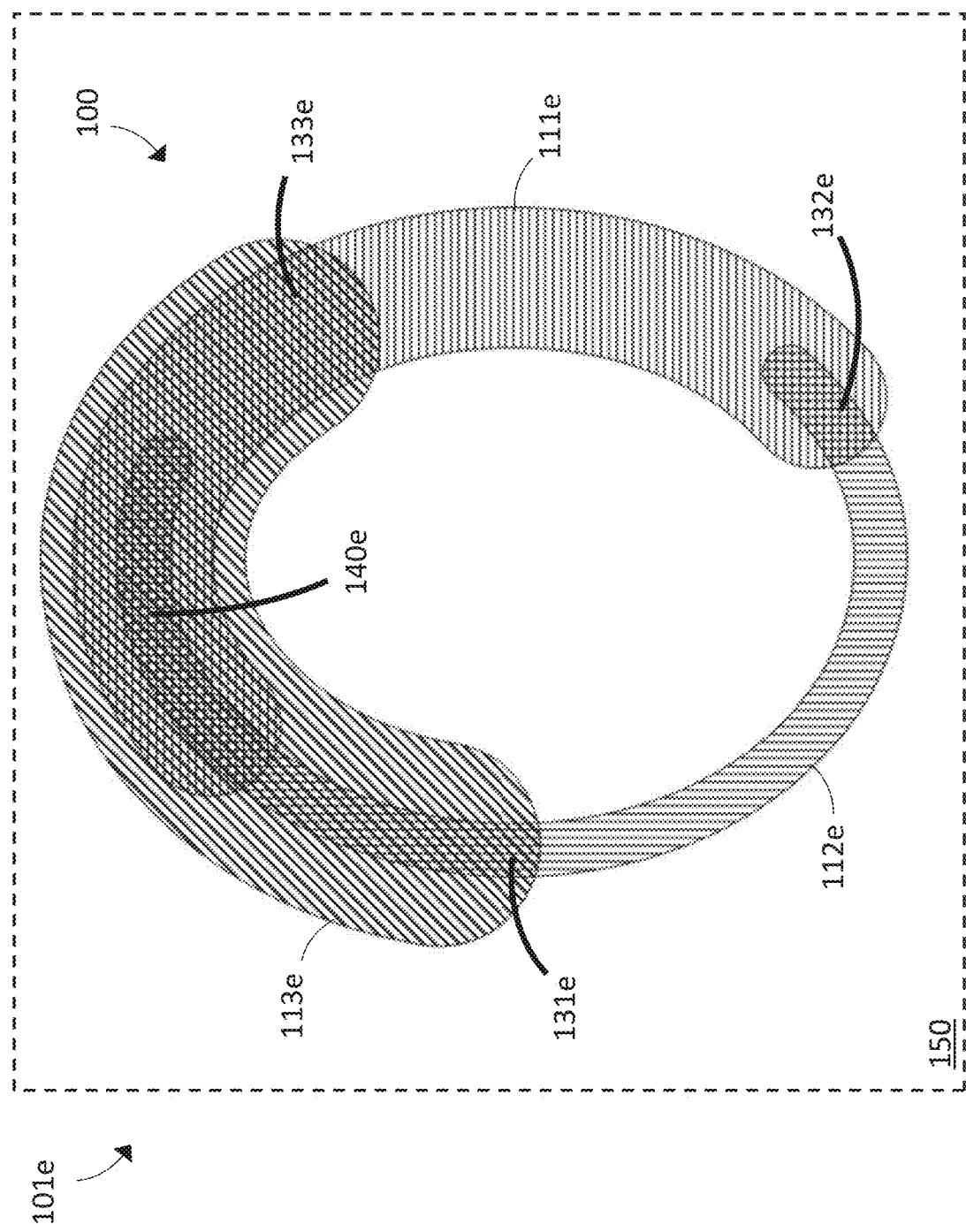
FIG. 1E is an illustrative diagram of an example of a fifth phase or stage in a display of a symbol (i.e., the number 0) in the display area of a display device in accordance with the present systems, devices, and methods.

FIG. 1E is an illustrative diagram of an example of a fifth phase or stage 101e in a display of a symbol 100 (i.e., the number 0) in the display area 150 of a display device (not shown) in accordance with the present systems, devices, and methods. Fifth stage 101e represents a subsequent time capture of the display of symbol 100 by the display device successively following the time capture represented by fourth stage 101d. The amount of time in between fourth stage 101d and fifth stage 101e may vary depending on the specific implementation, but generally FIGS. 1A, 1B, 1C, 1D, 1E, 1F, 1G, 1H, 1I, and 1J depict the display of symbol 100 in ten stages, so fifth stage 101e represents symbol 100 at roughly the fifth of ten display stages.

At exemplary fifth stage 101e, first, second, and third line segments 111d, 112d, and 113d of symbol 100 from fourth stage 101d continue to substantially persist and have evolved (e.g., been further drawn, dynamically extended, and/or progressively traced) to become first line segment 111e, second line segment 112e, and third line segment 113e, respectively. That is, in between fourth stage 101d and fifth stage 101e, the display device has drawn, progressively traced, or otherwise dynamically extended each of line segments 111d, 112d, and 113d to continue to follow, trace, or draw a respective instance or profile of symbol 100, and at fifth stage 101e such following, tracing, or drawing is not yet complete. First line segment 111e has the first intermediate color, the first linewidth or line weight, and the first opacity; second line segment 112e has the second intermediate color, the second linewidth or line weight, and the second opacity; and third line segment 113e has the third intermediate color, the third linewidth or line weight, and the third opacity. Second line segment 112e and third line segment 113e overlap in region 131e to produce/display the new intermediate color in region 131e; first line segment 111e and second line segment 112e overlap in region 132e to produce/display the other new intermediate color in region 132e; first line segment 111e and third line segment 113e overlap in region 133e to produce/display the still other new intermediate color in region 133e; and all three of first line segment 111e, second line segment 112e, and third line segment 113e overlap in region 140e to produce/display the color of symbol 100 in region 140e.

Figure 1F:
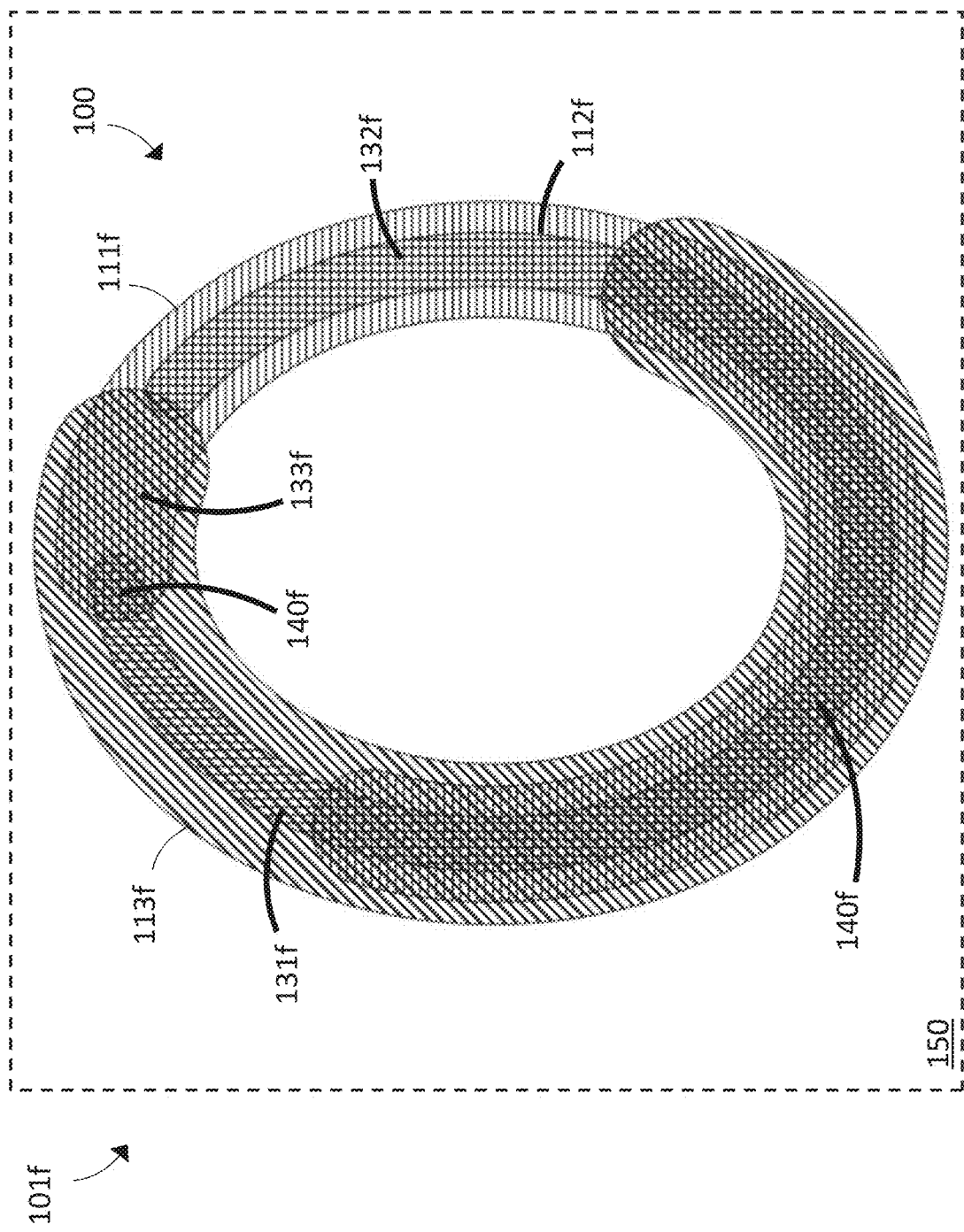
FIG. 1F is an illustrative diagram of an example of a sixth phase or stage in a display of a symbol (i.e., the number 0) in the display area of a display device in accordance with the present systems, devices, and methods.

FIG. 1F is an illustrative diagram of an example of a sixth phase or stage 101f in a display of a symbol 100 (i.e., the number 0) in the display area 150 of a display device (not shown) in accordance with the present systems, devices, and methods. Sixth stage 101f represents a subsequent time capture of the display of symbol 100 by the display device successively following the time capture represented by fifth stage 101e. The amount of time in between fifth stage 101e and sixth stage 101f may vary depending on the specific implementation, but generally FIGS. 1A, 1B, 1C, 1D, 1E, 1F, 1G, 1H, 1I, and 1J depict the display of symbol 100 in ten stages, so sixth stage 101f represents symbol 100 at roughly the sixth of ten display stages.

At exemplary sixth stage 101f, first, second, and third line segments 111e, 112e, and 113e of symbol 100 from fifth stage 101e continue to substantially persist and have evolved (e.g., been further drawn, dynamically extended, and/or progressively traced) to become first line segment 111f, second line segment 112f, and third line segment 113f, respectively. That is, in between fifth stage 101e and sixth stage 101f, the display device has drawn, progressively traced, or otherwise dynamically extended each of line segments 111e, 112e, and 113e to continue to follow, trace, or draw a respective instance or profile of symbol 100, and at sixth stage 101f such following, tracing, or drawing is not yet complete. First line segment 111f has the first intermediate color and the first opacity; second line segment 112f has the second intermediate color and the second opacity; and third line segment 113f has the third intermediate color and the third opacity. Second line segment 112f and third line segment 113f overlap in region 131f to produce/display the new intermediate color in region 131f; first line segment 111f and second line segment 112f overlap in region 132f to produce/display the other new intermediate color in region 132f; first line segment 111f and third line segment 113f overlap in region 133f to produce/display the still other new intermediate color in region 133f; and all three of first line segment 111f, second line segment 112f, and third line segment 113f overlap in regions 140f to produce/display the color of symbol 100 in regions 140f (note there are two discrete regions 140f at sixth stage 101f corresponding to two spatially-separated areas where all three of first line segment 111f, second line segment 112f, and third line segment 113f all overlap).

At exemplary sixth stage 101f, the respective linewidths or line weights of first line segment 111f, second line segment 112f, and third line segment 113f have begun to converge to the intended final target linewidth or line weight of symbol 100. That is, relative to the first linewidth or line weight of first line segment 111e from fifth stage 101e, the linewidth or line weight of first line segment 111f in sixth stage 101f has reduced, or generally become slightly thinner. Similarly, relative to the third linewidth or line weight of third line segment 113e from fifth stage 101e, the linewidth or line weight of third line segment 113f in sixth stage 101f has reduced, or generally become slightly thinner. As will become more apparent in subsequent stages 101g, 101 h, 101i, and 101j respectively illustrated in FIGS. 1G, 1H, 1I, and 1J, the linewidth or line weight of second line segment 112f in sixth stage 101f is substantially unchanged from the second linewidth or line weight of second line segment 112e from fifth stage 101e because the second linewidth or line weight closely approximates the intended final target linewidth or line weight of symbol 100.

Figure 1G:
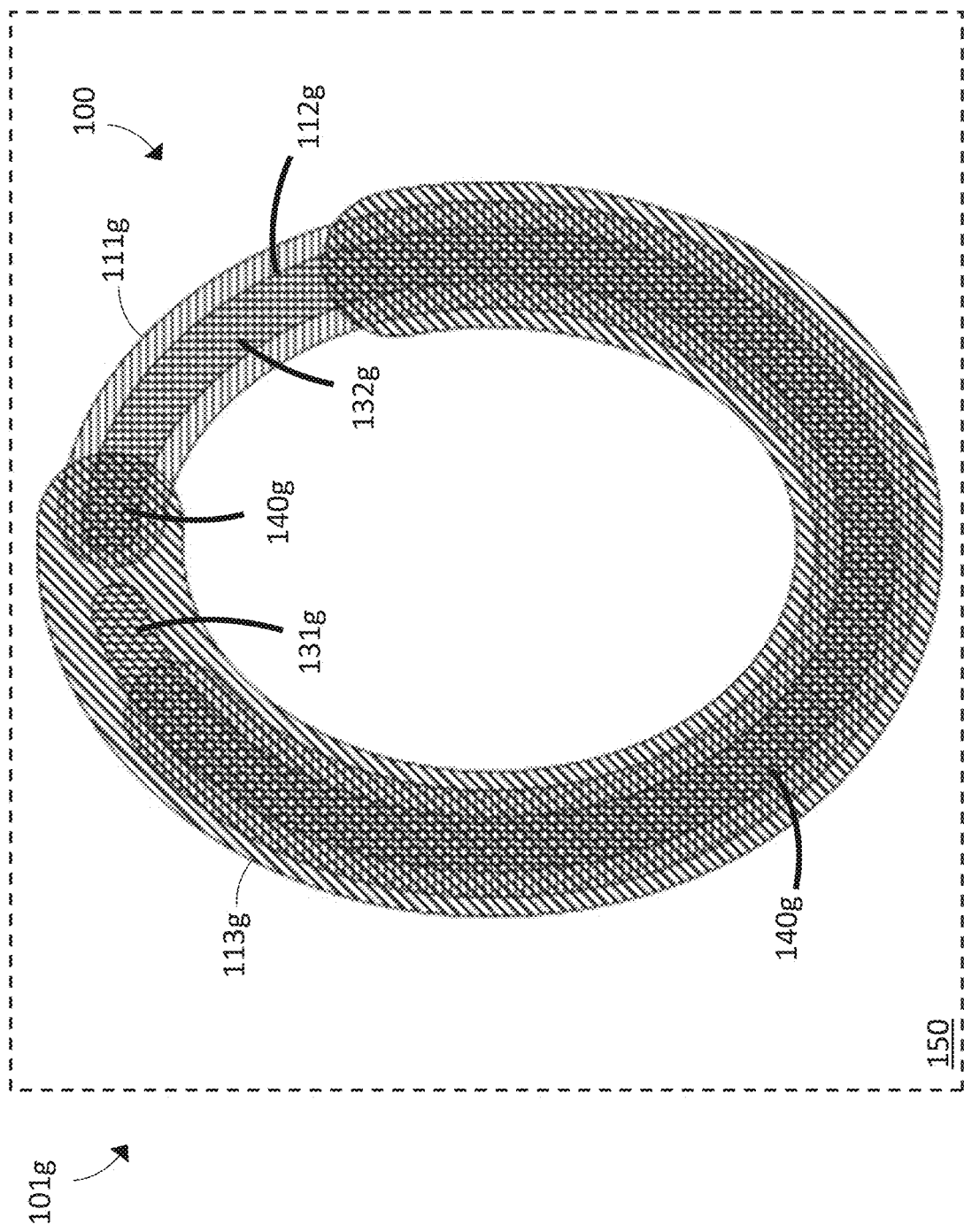
FIG. 1G is an illustrative diagram of an example of a seventh phase or stage in a display of a symbol (i.e., the number 0) in the display area of a display device in accordance with the present systems, devices, and methods.
Figure 11:
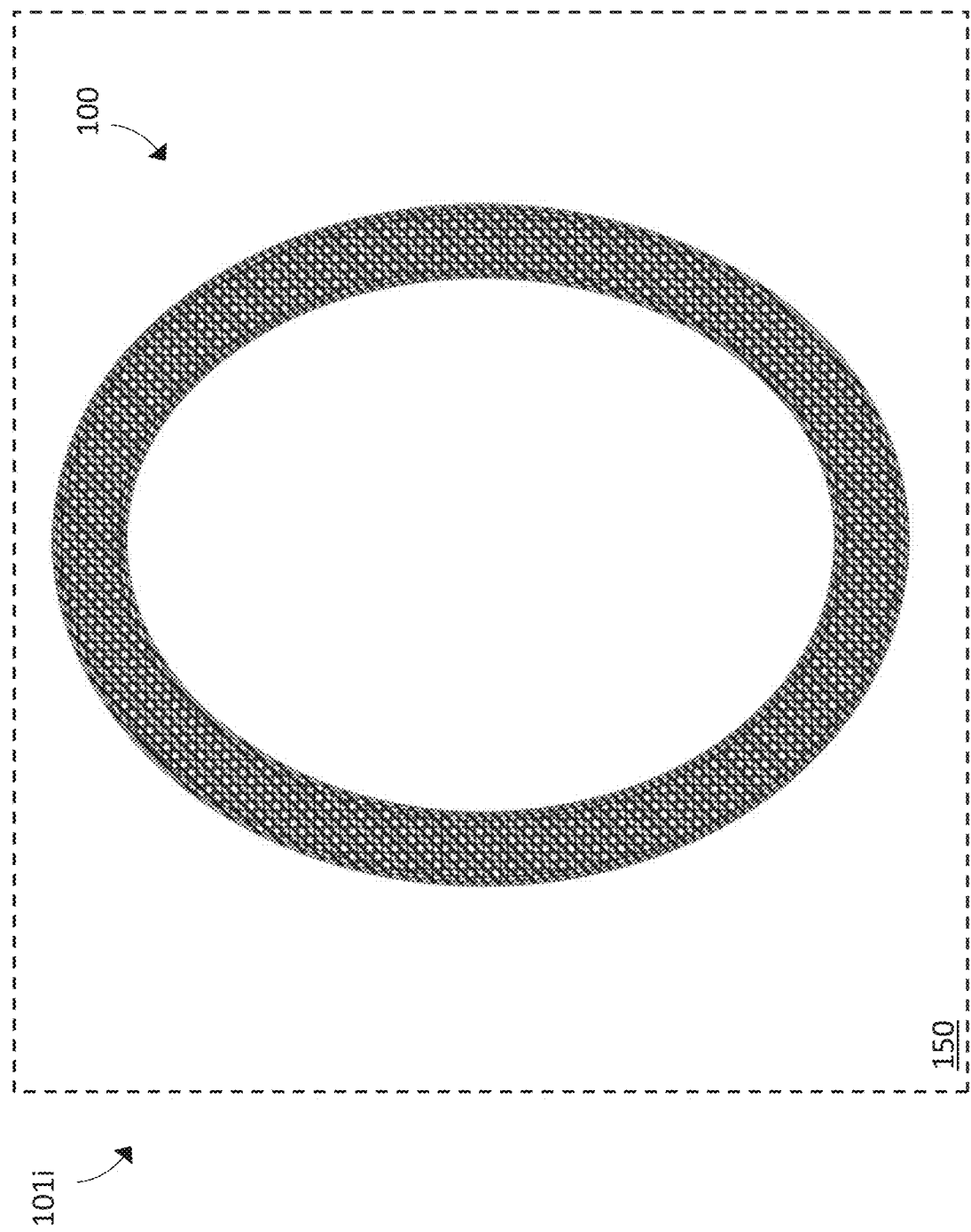

FIG. 1G is an illustrative diagram of an example of a seventh phase or stage 101g in a display of a symbol 100 (i.e., the number 0) in the display area 150 of a display device (not shown) in accordance with the present systems, devices, and methods. Seventh stage 101g represents a subsequent time capture of the display of symbol 100 by the display device successively following the time capture represented by sixth stage 101f. The amount of time in between sixth stage 101f and seventh stage 101g may vary depending on the specific implementation, but generally FIGS. 1A, 1B, 1C, 1D, 1E, 1F, 1G, 1H, 1I, and 1J depict the display of symbol 100 in ten stages, so seventh stage 101g represents symbol 100 at roughly the seventh of ten display stages.

At exemplary seventh stage 101g, first, second, and third line segments 111f, 112f, and 113f of symbol 100 from sixth stage 101f continue to substantially persist and have evolved (e.g., been further drawn, dynamically extended, and/or progressively traced) to become first line segment 111g, second line segment 112g, and third line segment 113g, respectively. That is, in between sixth stage 101f and seventh stage 101g, the display device has drawn, progressively traced, or otherwise dynamically extended each of line segments 111f, 112f, and 113f to continue to follow, trace, or draw a respective instance or profile of symbol 100, and at seventh stage 101g such following, tracing, or drawing is not yet complete. First line segment 111g has the first intermediate color and the first opacity; second line segment 112g has the second intermediate color and the second opacity; and third line segment 113g has the third intermediate color and the third opacity. The respective linewidths or line weights of first line segment 111g and third line segment 113g continue to converge at seventh stage 101g (i.e., continue to reduce, or generally become thinner relative to the respective linewidths or line weights of first line segment 111f and third line segment 113f from sixth stage 101f) to the intended final target linewidth or line weight of symbol 100 (i.e., the second linewidth or line weight of second line segment 112g). Second line segment 112g and third line segment 113g overlap in region 131g to produce/display the new intermediate color in region 131g; first line segment 111g and second line segment 112g overlap in region 132g to produce/display the other new intermediate color in region 132g; and all three of first line segment 111g, second line segment 112g, and third line segment 113g overlap in regions 140g to produce/display the color of symbol 100 in regions 140g.

FIG. 1H is an illustrative diagram of an example of an eighth phase or stage 101h in a display of a symbol 100 (i.e., the number 0) in the display area 150 of a display device (not shown) in accordance with the present systems, devices, and methods. Eighth stage 101h represents a subsequent time capture of the display of symbol 100 by the display device successively following the time capture represented by seventh stage 101g. The amount of time in between seventh stage 101g and eighth stage 101h may vary depending on the specific implementation, but generally FIGS. 1A, 1B, 1C, 1D, 1E, 1F, 1G, 1H, 1I, and 1J depict the display of symbol 100 in ten stages, so eighth stage 101h represents symbol 100 at roughly the eighth of ten display stages.

At exemplary eighth stage 101h, first, second, and third line segments 111g, 112g, and 113g of symbol 100 from seventh stage 101g continue to substantially persist and have evolved (e.g., been further drawn, dynamically extended, and/or progressively traced) to substantially complete three respective instances or traces 111h, 112h, and 113h of the profile of symbol 100. That is, in between seventh stage 101g and eighth stage 101h, the display device has drawn, progressively traced, or otherwise dynamically extended each of line segments 111g, 112g, and 113g to continue to follow, trace, or draw a respective instance or profile of symbol 100, and at eighth stage 101h such following, tracing, or drawing is at least approximately complete. First instance or trace 111h, second instance or trace 112h, and third instance or trace 113h all overlap and their respective first, second, and third intermediate colors are not discernible in FIG. 1H; however, they all overlap in and their respective first, second, and third intermediate colors additively blend or mix over region 140h to produce/display the color of symbol 100 throughout region 140h.

In FIG. 1H, it is apparent that first component 111a and first line segments 111b, 111c, 111d, 111e, 111f, and 111g all correspond to respective incomplete first instances or traces of the profile of symbol 100 (e.g., in a first display layer of display area 150), second component 112b and second line segments 112b, 112c, 112d, 112e, 112f, and 112g all correspond to respective incomplete second instances or traces of the profile of symbol 100 (e.g., in a second display layer of display area 150), and third line segments 113b, 113c, 113d, 113e, 113f, and 113g all correspond to respective incomplete third instances or traces of the profile of symbol 100 (e.g., in a first display layer of display area 150). Thus, the first instance or trace 111h of the profile of symbol 100, the second instance or trace 112h of the profile of symbol 100, and the third instance or trace 113h of the profile of symbol 100 are all substantially complete at exemplary eighth stage 101h such that region 140h represents a complete profile of symbol 100.

First instance or trace 111h, second instance or trace 112h, and third instance or trace 113h are all substantially complete instances or traces of the profile of symbol 100, but at eighth stage 101h their respective linewidths or line weights are not yet uniformly converged to the intended final target linewidth or line weight of symbol 100. Thus, while region 140h does represent a complete profile of symbol 100, at eighth stage 101h the linewidth or line weight of region 140h is still evolving (e.g., larger/thicker than and gradually reducing) to the intended final target linewidth or line weight of symbol 100.

Over the sequence of eight time captures depicted in FIGS. 1A, 1B, 1C, 1D, 1E, 1F, 1G, and 1H, it is apparent that each respective instance or trace 111$h$, 112$h$, and 113$h$ may evolve (i.e., be drawn, dynamically extended, progressively traced, or similar) at a respective rate, and that the respective rate at which each respective instance or trace 111$h$, 112$h$, and 113$h$ may vary over time. For example, first instance or trace 111$h$ may be drawn, dynamically extended, or progressively traced at a first rate which may vary at and/or between various ones of first stage 101$a$, second stage 101$b$, third stage 101$c$, fourth stage 101$d$, fifth stage 101$e$, sixth stage 101$f$, seventh stage 101$g$, and/or eighth stage 101$h$; second instance or trace 111$h$ may be drawn, dynamically extended, or progressively traced at a second rate which may vary at and/or between various ones of first stage 101$a$, second stage 101$b$, third stage 101$c$, fourth stage 101$d$, fifth stage 101$e$, sixth stage 101$f$, seventh stage 101$g$, and/or eighth stage 101$h$; and third instance or trace 111$h$ may be drawn, dynamically extended, or progressively traced at a third rate which may vary at and/or between various ones of first stage 101$a$, second stage 101$b$, third stage 101$c$, fourth stage 101$d$, fifth stage 101$e$, sixth stage 101$f$, seventh stage 101$g$, and/or eighth stage 101$h$. While the first rate, the second rate, and the third rate may each differ at various stages, in some implementations they may depend on one another to ensure that each instance or trace of the profile of the symbol (e.g., first instance or trace 111$h$, second instance or trace 112$h$, and third instance or trace 113$h$) is substantially completed at or by eighth stage 101$h$.

FIG. 1I is an illustrative diagram of an example of a ninth phase or stage 101$i$ in a display of a symbol 100 (i.e., the number 0) in the display area 150 of a display device (not shown) in accordance with the present systems, devices, and methods. Ninth stage 101$i$ represents a subsequent time capture of the display of symbol 100 by the display device successively following the time capture represented by eighth stage 101$h$. The amount of time in between eighth stage 101$h$ and ninth stage 101$i$ may vary depending on the specific implementation, but generally FIGS. 1A, 1B, 1C, 1D, 1E, 1F, 1G, 1H, 1I, and 1J depict the display of symbol 100 in ten stages, so ninth stage 101$i$ represents symbol 100 at roughly the ninth of ten display stages.

At exemplary ninth stage 101$i$, symbol 100 is completely drawn/displayed in its intended final target color and with it intended final target linewidth or line weight.

Figure 1J:
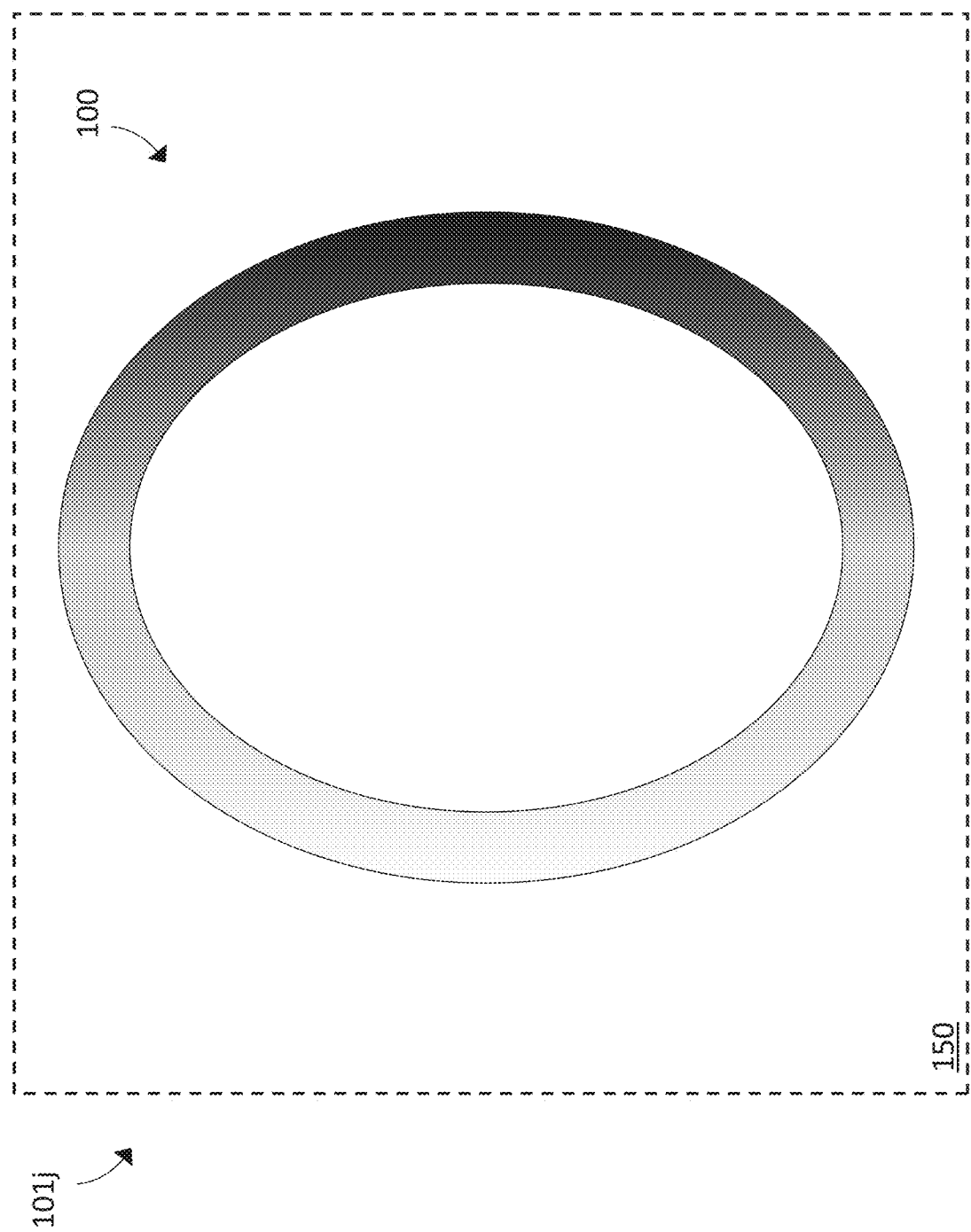
FIG. 1J is an illustrative diagram of an example of a tenth phase or stage in a display of a symbol (i.e., the number 0) in the display area of a display device in accordance with the present systems, devices, and methods.

FIG. 1J is an illustrative diagram of an example of an optional tenth phase or stage 101$j$ in a display of a symbol 100 (i.e., the number 0) in the display area 150 of a display device (not shown) in accordance with the present systems, devices, and methods. Optional tenth stage 101$j$ represents a subsequent time capture of the display of symbol 100 by the display device successively following the time capture represented by ninth stage 101$i$. The amount of time in between ninth stage 101$i$ and optional tenth stage 101$j$ may vary depending on the specific implementation, but generally FIGS. 1A, 1B, 1C, 1D, 1E, 1F, 1G, 1H, 1I, and 1J depict the display of symbol 100 in ten stages, so optional tenth stage 101$j$ represents symbol 100 at roughly the tenth of ten display stages.

At exemplary optional tenth stage 101$j$, the display device modifies the intended final target color of symbol 100 by applying a color gradient to symbol 100. As described previously, this color gradient may be applied as a spatial color gradient or a temporal color gradient. A spatial color gradient is depicted in FIG. 1J for ease of illustration.

FIGS. 1A, 1B, 1C, 1D, 1E, 1F, 1G, 1H, 1I, and 1J depict a sequential process by which symbol 100 is displayed in display area 150 of a display device (not shown). In accordance with the present systems, devices, and methods, the process depicted through FIGS. 1A, 1B, 1C, 1D, 1E, 1F, 1G, 1H, 1I, and 1J may be carried out in reverse to remove symbol 100 from display area 150 of the display device. That is, starting from a display of complete symbol 100 at tenth stage 101$j$ in FIG. 1J, symbol 100 may gradually devolve (e.g., break up, dynamically remove, regressively trace, or similar) into constituent colors and components following a process from (optional) stage 101$j$ of FIG. 1J to stage 101$i$ of FIG. 1I, from stage 101$i$ of FIG. 1I to stage 101$h$ of FIG. 1H, from stage 101$h$ of FIG. 1H to stage 101$g$ of FIG. 1G, from stage 101$g$ of FIG. 1G to stage 101$g$ of FIG. 1F, from stage 101$f$ of FIG. 1F to stage 101$e$ of FIG. 1E, from stage 101$e$ of FIG. 1E to stage 101$d$ of FIG. 1D, from stage 101$d$ of FIG. 1D to stage 101$c$ of FIG. 1C, from stage 101$c$ of FIG. 1C to stage 101$b$ of FIG. 1B, from stage 101$b$ of FIG. 1B to stage 101$a$ of FIG. 1A, and from stage 101$a$ of FIG. 1A to the complete removal or erasure of symbol 100 and all of its constituent components and colors from display area 150. This sequential removal process may be applied to a symbol (e.g., symbol 100) after the symbol (e.g., symbol 100) is displayed via a sequential display process (i.e., a backwards progression through FIGS. 1A, 1B, 1C, 1D, 1E, 1F, 1G, 1H, 1I, and 1J may be carried out some time after a forwards progression through FIGS. 1A, 1B, 1C, 1D, 1E, 1F, 1G, 1H, 1I, and 1J), or this sequential removal process may be applied to a symbol that has been originally displayed by a process other than a sequential display process (i.e., a process other than a forwards progression through FIGS. 1A, 1B, 1C, 1D, 1E, 1F, 1G, 1H, 1I, and 1J). In accordance with the present systems, devices, and methods, any symbol to be displayed by a display device may be displayed via a sequential display process as described herein, and similarly any symbol to be removed from the display of a display device may be removed via a sequential display process described herein.

A person of skill in the art will appreciate that the ten time captures illustrated at respective ones of the ten stages 101$a$, 101$b$, 101$c$, 101$d$, 101$e$, 101$f$, 101$g$, 101$h$, 101$i$, and 101$j$ used to represent the display of symbol 100 through FIGS. 1A, 1B, 1C, 1D, 1E, 1F, 1G, 1H, 1I, and 1J, respectively, are intended for illustrative purposes and there is nothing intended to be limiting or essential about the particular instances in time that are illustrated as captured. The exemplary display of symbol 100 as a representation of the present systems, devices, and methods could be illustrated in fewer than ten time captures (e.g., three, five, or seven time captures with, on average, greater time separation in between each successive capture than used in the illustrated ten captures), greater than ten time captures (e.g., eleven, fifteen, or twenty time captures with, on average, less time separation in between each successive capture than used in the illustrated ten captures), or a different set of ten time captures (e.g., a set of ten time captures in which at least one is different from those in illustrated stages 101$a$, 101$b$, 101$c$, 101$d$, 101$e$, 101$f$, 101$g$, 101$h$, 101$i$, and 101$j$).

The various methods, techniques, or processes described herein for displaying a symbol may be implemented using a wide range of display devices and display technologies. For example, the display device referred to throughout FIGS. 1A, 1B, 1C, 1D, 1E, 1F, 1G, 1H, 1I, and 1J may include a television screen, a projection display, a computer monitor, a laptop/tablet/smartphone displays, or similar. However, as previously described the present systems, devices, and methods may be particularly advantageous when employed using a wearable heads-up display, such as an augmented reality display or a pair of smart glasses.

Figure 2:
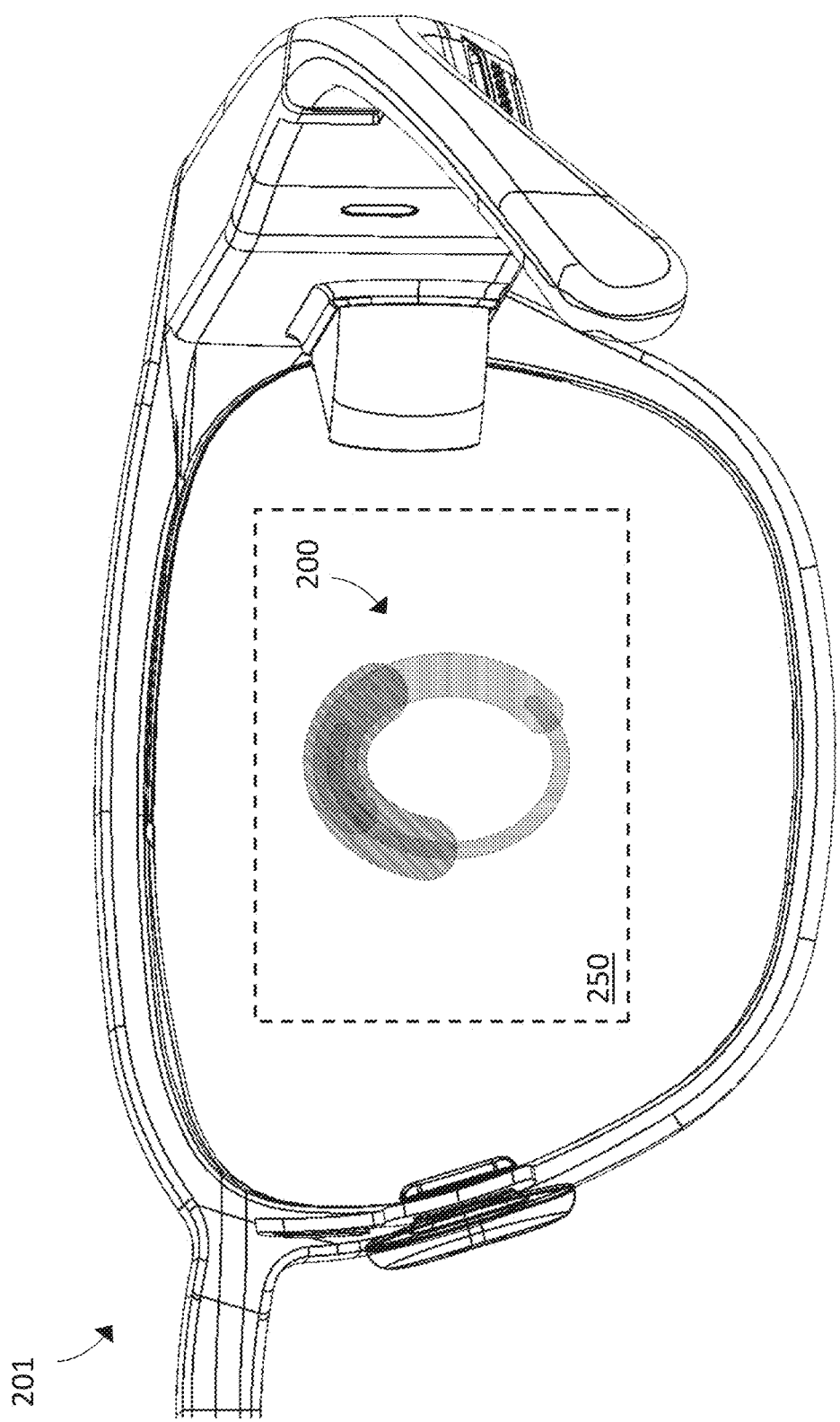
FIG. 2 is a front elevational view of a portion of a wearable heads-up display showing a display area and a visual symbol displayed in the display area 250 in accordance with the present systems, devices, and methods.

FIG. 2 is a front elevational view of a portion of a wearable heads-up display 201 showing a display area 250 and a visual symbol 200 displayed in the display area 250 in accordance with the present systems, devices, and methods. Comparing FIG. 2 to the elements of FIGS. 1A, 1B, 1C, 1D, 1E, 1F, 1G, 1H, 1I, and 1J, symbol 200 may correspond to symbol 100 and display area 250 may correspond to display area 150. While the display device itself is not shown in FIGS. 1A, 1B, 1C, 1D, 1E, 1F, 1G, 1H, 1I, and 1J to reduce clutter, FIG. 2 provides an illustrative example of an implementation in which the display device from FIGS. 1A, 1B, 1C, 1D, 1E, 1F, 1G, 1H, 1I, and 1J is a wearable heads-up display 201 having a display area 250.

Figure 3A:
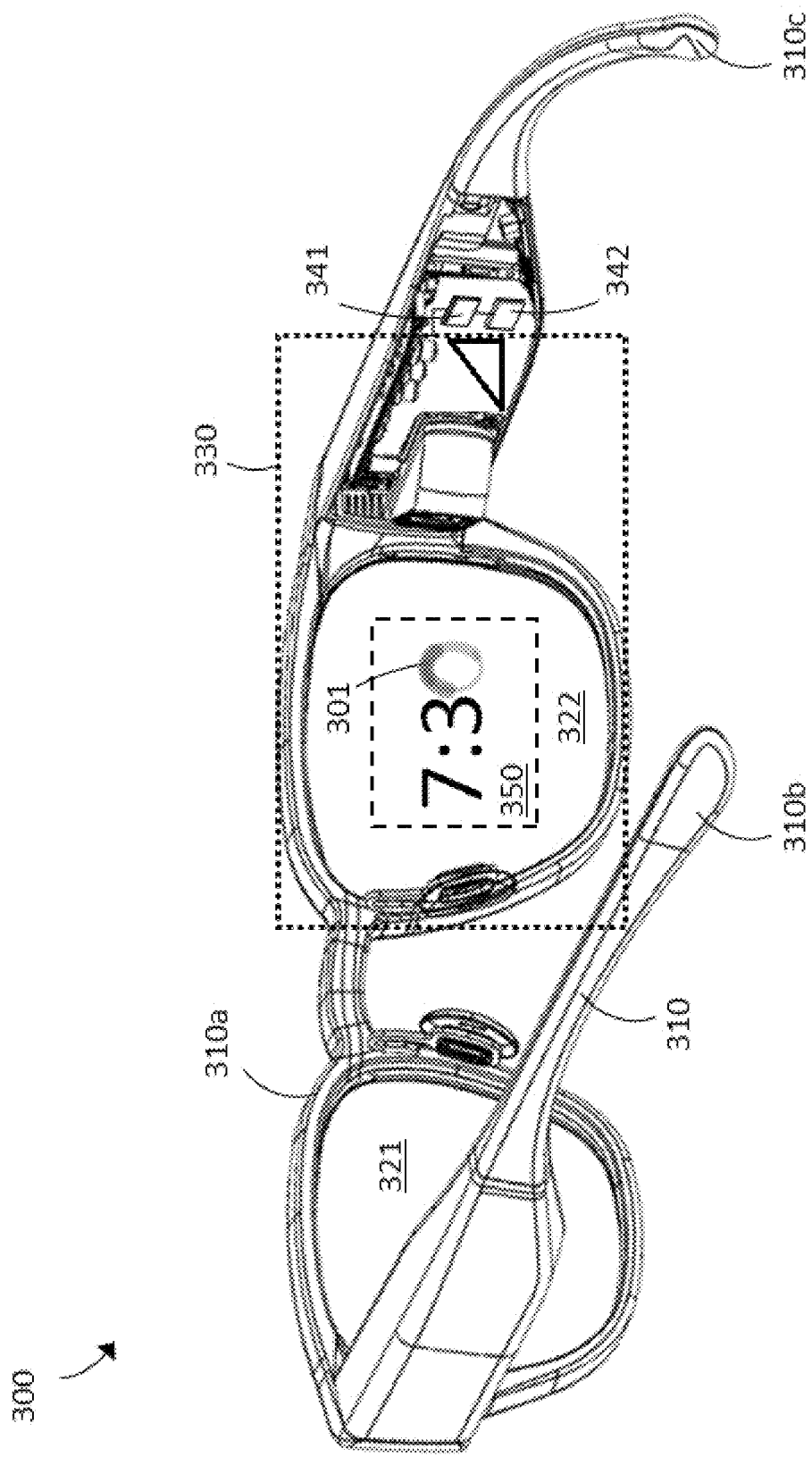
FIG. 3A is a perspective view of a wearable heads-up display displaying a visual symbol in accordance with the present systems, devices, and methods.

FIG. 3A is a perspective view of a wearable heads-up display 300 displaying a visual symbol 301 in accordance with the present systems, devices, and methods. Wearable heads-up display 300 comprises a support structure 310 that is sized and dimensioned to at least approximate an appearance of eyeglasses. That is, support structure 310 may include a front frame portion 310a and two respective arm or temple portions 310b, 310c that extend perpendicularly from the respective ends of the front frame portion 310a. Front frame portion 310a carries two lenses 321, 322, each of which is positioned in front of a respective eye of the user (not shown) when arm or temple portions 310b and 310c are positioned on either side of the user's head above the user's ears. Lenses 321, 322 may or may not be prescription eyeglass lenses depending on the specific implementation.

Support structure 310 further carries a display 330, a processor 341 communicatively coupled to the display 330, and a non-transitory processor-readable storage medium or memory 342 that is communicatively coupled to the processor 341. Display 330 includes a display area 350 in which symbol 301 is displayed to the user by wearable heads-up display 300 in accordance with the present systems, devices, and methods. The details of display 330 are depicted more clearly in the magnified/zoomed in view of wearable heads-up display 300 shown in FIG. 3B.

Figure 3B:
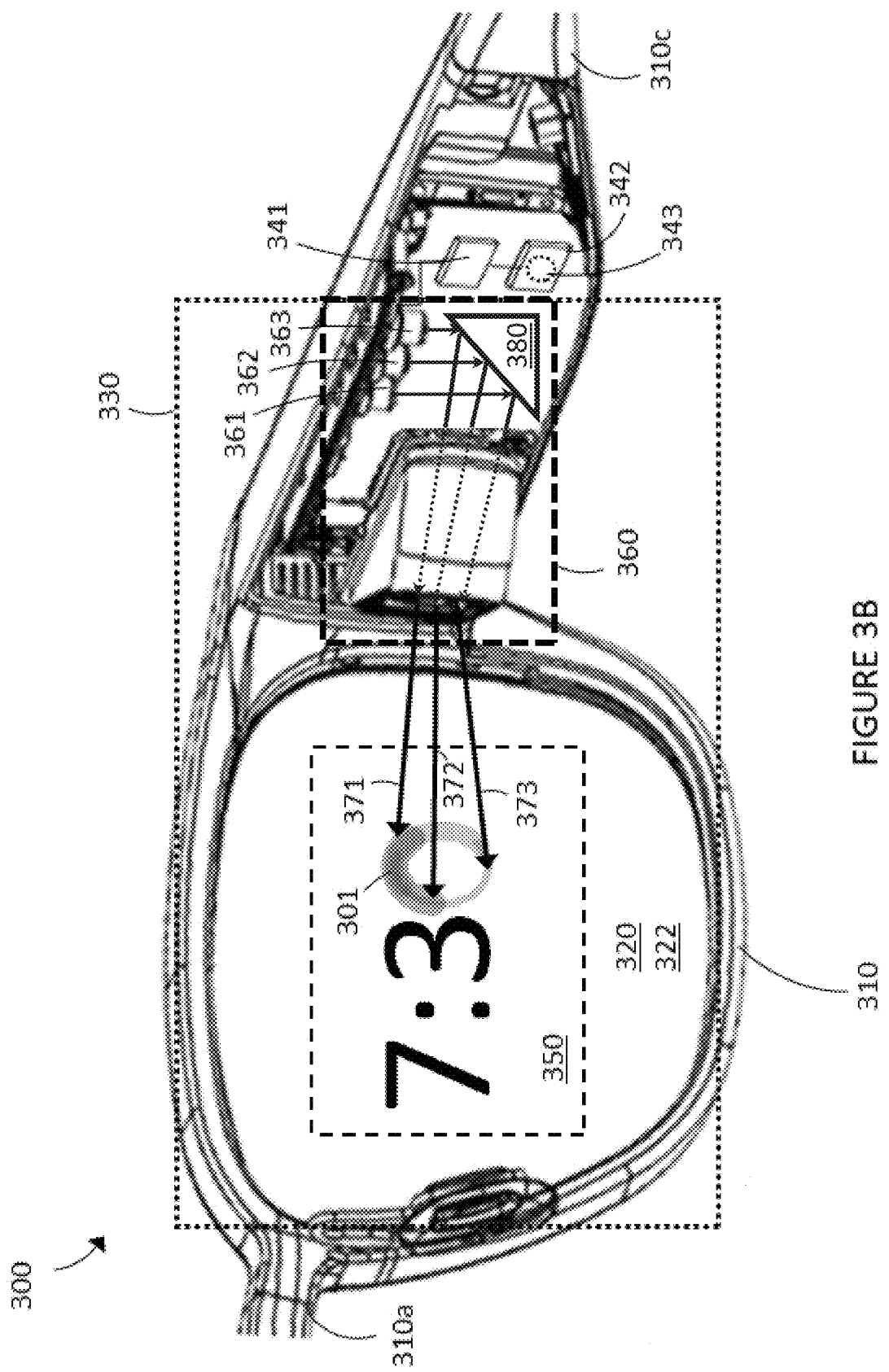
FIG. 3B is another perspective view of the wearable heads-up display from FIG. 3A showing more detail of the display thereof in accordance with the present systems, devices, and methods.

FIG. 3B is another perspective view of wearable heads-up display 300 from FIG. 3A showing more detail of the display 330 thereof. Display 330 comprises a light engine 360 that includes multiple light sources 361, 362, and 363, each of which generates a respective display light 371, 372, and 373, and a controllable optical component 380 that spatially scans, arranges, modulates, or otherwise distributes display light 371, 372, and 373 to produce display content. Display 330 further comprises a transparent combiner 320 which includes and/or is integrated with lens 322 and is positioned within a field of view of an eye of the user (not shown) when support structure 310 is worn on the head of the user. The display area 350 of transparent combiner 320 receives display light 371, 372, and 373 generated by the multiple light sources 361, 362, and 363, respectively, and modulated or distributed by the controllable optical component 380 in light engine 360 and redirects display light 371, 372, and 373 to the eye of the user. To complete this redirecting, transparent combiner 320 may include one or more holographic optical element(s), one or more waveguide(s) or lightguide(s), and/or one or more surface relief grating(s). Exemplary systems, devices, and methods that may be employed in wearable heads-up display 300 are described in: U.S. Pat. No. 9,958,682, US Patent Application Publication No. 2016-0377865, US Patent Application Publication No. 2017-0299956, US Patent Application Publication No. 2018-0180885, US Patent Application Publication No. 2016-0238845, and/or U.S. patent application Ser. No. 16/057,481, each of which is incorporated herein by reference in its entirety.

Transparent combiner 320 is carried by the front frame 310a of support structure 310 and light engine 360 is carried by an arm or temple portion 310c of support structure 310. In accordance with the present systems, devices, and methods, the multiple light sources 361, 362, and 363 in light engine 360 may each correspond to and, in use, generate a respective color or wavelength of light. For example, light source 361 may be a red light source to generate a red light, light source 362 may be a green light source to generate a green light, and light source 363 may be a blue light source to generate a blue light. In some implementations, light engine 360 may include a scanning laser projector in which light source 361 is a red laser diode to generate a red laser light, light source 362 is a green laser diode to generate a green laser light, light source 363 is a blue laser diode to generate a blue laser light, and controllable optical component 380 includes at least one scan mirror such as a piezo- or MEMS-based scan mirror. In other implementations, light engine 360 may include a microdisplay in which light source 361 is one of several red light-emitting diodes to generate red light, green light source 362 is one of several green light-emitting diodes to generate green light, light source 363 is one of several blue light-emitting diodes to generate blue light, and controllable optical component 380 includes at least one (e.g., reflective or transmissive) active-matrix liquid crystal layer of a microdisplay (LCD or LCOS) or spatial light modulator. In various implementations, light engine 360 may include more or fewer than three light sources 361, 362, and 363, and the nature of each light source (e.g., laser diode or light-emitting diode) depends on the specific implementation.

In accordance with the present systems, devices, and methods, each respective light source 361, 362, 363 (or more generally, each respectively colored light source 361, 362, 363) in a light engine 360 may contribute to a different degree (if at all) to each respective layer, instance, or trace of a profile of a symbol being displayed by a device (e.g., such as wearable heads-up display 300). As previously described, in the various implementations described here each respective instance or trace of a symbol may be drawn or displayed in a respective intermediate color. For example, a first instance or trace of a symbol may be displayed in red, a second instance or trace of a symbol may be displayed in green, and a third instance or trace of a symbol may be displayed in blue.

In FIG. 3B, each respective one of display lights 371, 372, and 373 corresponds to the display light used to display a respective instance or trace of symbol 301. For example, first light source 361 may generate display light 371 in a first intermediate color (e.g., red) to display first instance or trace 111h from FIG. 1H, second light source 362 may generate display light 372 in a second intermediate color (e.g., green) to display second instance or trace 112h from FIG. 1H, and third light source 363 may generate display light 373 in a third intermediate color (e.g., blue) to display third instance or trace 113h from FIG. 1H. Alternatively, as previously described, each respective instance or trace 111h, 112h, 113h may comprise a mixture, blend, or gradient of two or more colors as long as the desired resultant color for the symbol 301 being displayed is attained when all of the instances or traces 111h, 112h, and 113h are overlaid one on top of the other in the display area 150. In this case, first instance or trace 111h may comprise display light 371 generated by a first subset of the multiple light sources 361, 362, 363 (e.g., a combination of red light generated by light source 361 and green light generated by light source 362), second instance or trace 112*h* may comprise display light 372 generated by a second subset of the multiple light sources 361, 362, 363 (e.g., a combination of green light generated by light source 362 and blue light generated by light source 363), and third instance or trace 113*h* may comprise display light 373 generated by a third subset of the multiple light sources 361, 362, 363 (e.g., a combination of blue light generated by light source 363 and red light generated by light source 361).

Returning to the graphical concept of "display layers," a first subset of light sources 361, 362, and 363 may generate display light 371 to draw first instance 111*h* of a profile of symbol 301 in a first intermediate color in a first display layer of display area 350, a second subset of light sources 361, 362, and 363 may generate display light 372 to draw second instance 112*h* of a profile of symbol 301 in a second intermediate color in a second display layer of display area 350, and a third subset of light sources 361, 362, and 363 may generate display light 373 to draw third instance 113*h* of a profile of symbol 301 in a third intermediate color in a third display layer of display area 350. The first layer, the second layer, and the third layer may overlap in display area 350 such that display light 371 in the first intermediate color, display light 372 in the second intermediate color, and display light 373 in the third intermediate color all combine to produce/display the color of symbol 301 where first instance 111*h*, second instance 112*h*, and third instance 113*h* overlap.

A person of skill in the art will appreciate that display lights 371, 372, and 373 illustrated in FIG. 3B are not intended to provide a complete and exhaustive representation of all of the display light being generated by light engine 360 and impingent on display area 350 of transparent combiner 320. Display lights 371, 372, and 373 are used for exemplary illustration purposes only while additional display light would be generated by light engine 360 and impingent on transparent combiner 320 to cause the display of, for example, the "7:3" portion of the display content illustrated in FIG. 3B.

As described previously, wearable heads-up display 300 includes a processor 341 communicatively coupled to light engine 330 and a non-transitory processor-readable storage medium or memory 342 communicatively coupled to processor 341. Memory 342 stores processor-executable instructions and/or data 343 that, when executed by processor 341, cause display 330 (or more generally wearable heads-up display 300) to display symbol 301 in accordance with the present systems, devices, and methods. More specifically, executing processor-executable instructions and/or data 343 stored in memory 342 by processor 341 causes processor 341 to control light engine 360 (e.g., controls the modulation of light sources 361, 362, and 363 as well as other imaging elements (e.g., a controllable optical component 380) such as one or more scan mirror(s), one or more liquid crystal display(s) (e.g., (LCD or LCOS)), one or more spatial light modulator(s), and/or the like) in order to display symbol 301 in accordance with the present systems, devices, and methods.

Generally, in accordance with the present systems, devices, and methods, a processor (341) executing processor executable data and/or instructions (343) may define or identify an intended final target color (e.g., white) for a visual symbol (301). The processor (341) executing the processor-executable data and/or instructions (343) may break down, decompose, or otherwise separate the intended final target color (e.g., white) for the symbol (301) into a set of constituent colors (e.g., white may be separated into red, green, and blue, or generally separated into any combination of sections of a rainbow as long as the entire rainbow is represented). The processor (341) executing the processor-executable data and/or instructions (343) may map each constituent color in the set of constituent colors to a respective instance of the symbol (301) (resulting in a set of instances in of the symbol (301)), each of which may correspond to a respective layer, such that when the respective instances of the symbol (301) in the set of instances of the symbol (301) are all overlaid on top of each other in the display area (350) of the display device (300) a resultant color of the symbol (301) may match the intended final target color of the symbol (301). In order to enhance the aesthetic appeal and captivate the attention of a user of the display, the display device (300) may separately and gradually draw or progressively trace the respective instances of the symbol (301), in respective layers, in the display area (350) of the display device (300). Throughout the drawing or progressively displaying process, various regions of the profile of the symbol (301) may be realized at different times and by different overlay combinations of the respective instances of the symbol (301) to cause many different intermediate colors to be displayed during the initial stages of the display of the symbol (301) before all of the respective instances are completely drawn/traced and overlaid to produce the complete symbol (301) in its final intended target color.

In some implementations, processor-executable instructions and/or data 343 stored in memory 342 may include one or more animated sprite(s) that embody the sequential display process represented through FIGS. 1A, 1B, 1C, 1D, 1E, 1F, 1G, 1H, 1I, and 1J. Processor-executable instructions and/or data 343 may include a respective animated sprite for each respective symbol that wearable heads-up display 300 is operable to display using a sequential display process as described herein, where a corresponding animated sprite may be "called upon" and "played" or "invoked" when a particular symbol is to be sequentially displayed in accordance with the present systems, devices, and methods. For example, if wearable heads-up display is operable to display each alphanumeric character (e.g., each letter of the English alphabet and each of the ten digits: 0, 1, 2, 3, 4, 5, 6, 7, 8, 9) via a sequential display process as described herein, then processor-executable instructions and/or data 343 may include a respective animated sprite for each respective alphanumeric character (e.g., a respective animated sprite for each letter of the English alphabet, and a respective animated sprite for each of the ten digits: 0, 1, 2, 3, 4, 5, 6, 7, 8, 9). The blending/mixing of intermediate colors to produce a resultant color that matches an intended final target color of a symbol may be embedded in each animated sprite. For example, an animated sprite may encapsulate stages 101*a*, 101*b*, 101*c*, 101*d*, 101*e*, 101*f*, 101*g*, 101*h*, and 101*i* to display symbol 100 from FIGS. 1A, 1B, 1C, 1D, 1E, 1F, 1G, 1H, and 1I. Once a sprite is done animating, a color gradient may optionally be applied to the symbol (e.g., per stage 101*j* of FIG. 1J) over top of the sprite's alpha channel.

Generally, in accordance with the present systems, devices, and methods, a display device may include a display, a processor communicatively coupled to the display, and a non-transitory processor-readable storage medium or memory communicatively coupled to the processor. The non-transitory processor-readable storage medium or memory may store processor-executable instructions and/or data that, when executed by the processor, cause the display device to display at least one visual symbol in a subtle, aesthetically pleasing way that captivates the user's attention without detracting from the user's surroundings or environment. An example of such a way of displaying a symbol is illustrated sequentially through FIGS. 1A, 1B, 1C, 1D, 1E, 1F, 1G, 1H, 1I, and 1J (either forwards or backwards). Exemplary steps or acts by which this sequence is realized are characterized in methods 400a, 400b, 400c, 400d, 500a, 500b, 500c, 500d, 600a, 600b, 600c, 700, 800, and 900 respectively illustrated in FIGS. 4A, 4B, 4C, 4D, 5A, 5B, 5C, 5D, 6A, 6B, 6C, 7, 8, and 9. That is, the processor-executable instructions and/or data stored in the non-transitory processor-readable storage medium or memory of the display devices described herein are executed by a processor on-board the display device to cause the display device to perform any of methods 400a, 400b, 400c, 400d, 500a, 500b, 500c, 500d, 600a, 600b, 600c, 700, 800, and 900 respectively illustrated in FIGS. 4A, 4B, 4C, 4D, 5A, 5B, 5C, 5D, 6A, 6B, 6C, 7, 8, and 9.

Throughout the descriptions of methods 400a, 400b, 400c, 400d, 500a, 500b, 500c, 500d, 600a, 600b, 600c, 700, 800, and 900 respectively illustrated in FIGS. 4A, 4B, 4C, 4D, 5A, 5B, 5C, 5D, 6A, 6B, 6C, 7, 8, and 9, references to numbered elements from FIG. 3B and FIG. 1H are provided in parentheses. Such references are provided in parentheses to specifically represent that such referenced elements provide non-limiting exemplary implementations or embodiments in the context of each method and a person of skill in the art will appreciate that each method may be performed with, by, using, or together with physical features or elements other than those from FIGS. 3B and 1H.

Figure 4A:
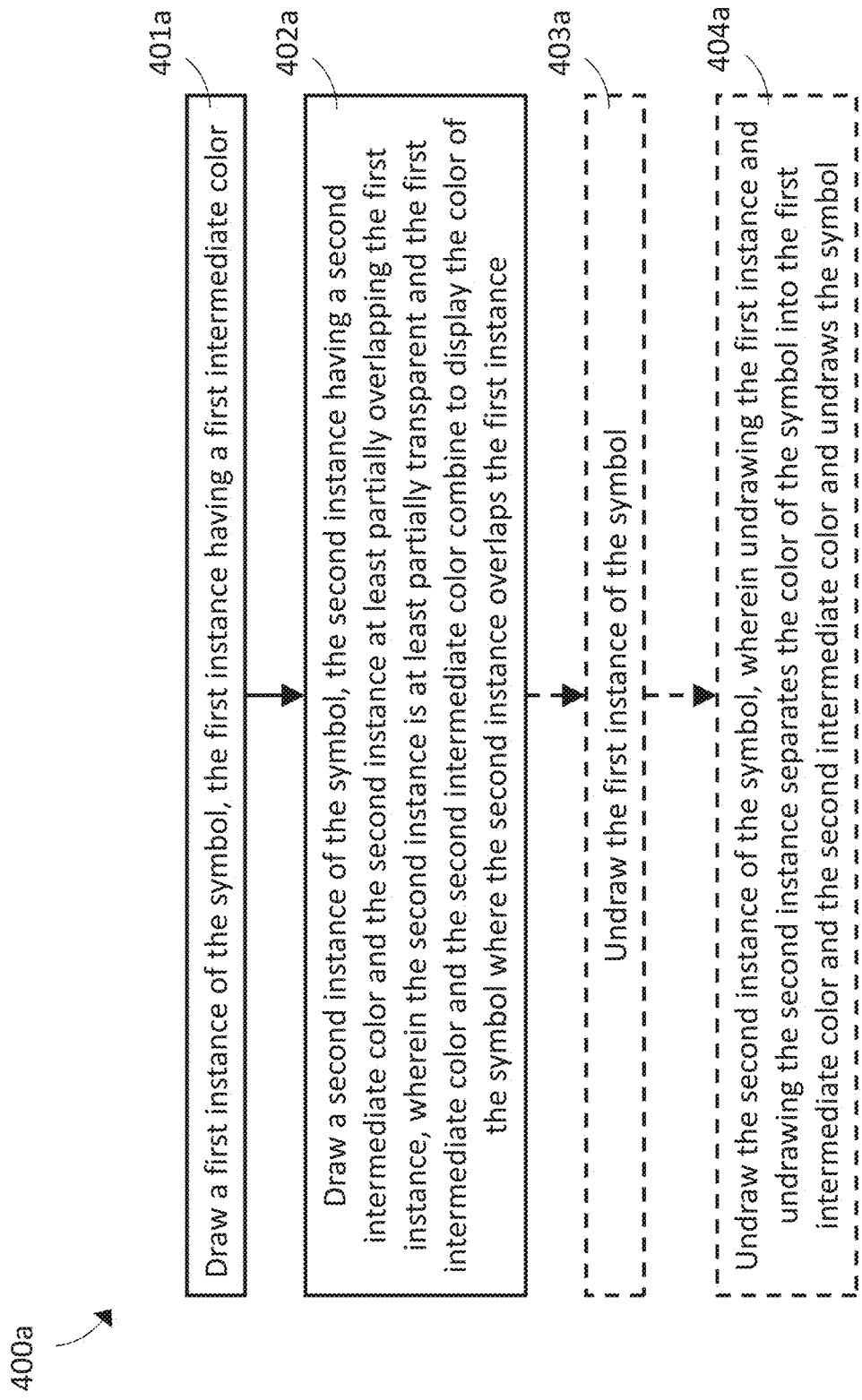
FIG. 4A is a flow-diagram showing a (e.g., processor-based) method of displaying a symbol in accordance with the present systems, devices, and methods.

FIG. 4A is a flow-diagram showing a (e.g., processor-based) method 400a of displaying a symbol in accordance with the present systems, devices, and methods. Method 400a includes two acts 401a and 402a and two optional acts 403a and 404a, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 400a may be carried out or performed by a display device, such as a wearable heads-up display (300), and to that end method 400a may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 400a stored in the memory (342), the processor (341) may cause the display device (300) to perform acts 401a, 402a, and (optionally) 403a and 404a of method 400a. Thus, the present systems, devices, and methods describe a computer program product (which may be provided as one or more software updates to another computer program product) comprising processor-executable instructions and/or data (343) which, when the program is executed by a computer or processor (341), cause the computer or processor (341) to carry out the acts of method 400a.

At 401a, the display device (300) draws a first instance (111h) of the symbol (301), the first instance (111h) having a first intermediate color. The first instance (111h) may be drawn by a display (330) of the display device (300). The first instance (111h) may be drawn by a light engine (360) of the display (330) of the display device (300). For example, drawing the first instance (111h) by the display (330) or light engine (360) of the display device (300) may include: generating display light (371) in the first intermediate color by at least a subset of multiple light sources (361, 362, 363), and arranging, directing, shaping, or otherwise structuring the display light (371) to trace a profile of the symbol (301) by a controllable optical component (380) of the display (330) or light engine (360), such as at least one scan mirror, at least one liquid crystal display (LCD or LCOS), at least one microdisplay, or at least one spatial light modulator.

Referring to FIG. 1A, drawing the first instance (111h) of the symbol (301) at 401a may include initiating the drawing the first instance (111h) of the symbol (301) at a first point (121a) in the display area (350) of the display device (300) and dynamically extending or progressively tracing the first instance (111h) from the first point (121a) to another point in the display area (350) of the display device (300). Referring to FIGS. 1A, 1B, 1C, 1D, 1E, 1F, 1G, and 1H, drawing the first instance (111h) of the symbol (301) at 401a may include persistently displaying a number of earlier portions (111a, 111b, 111c, 111d, 111e, 111f, and 111g) of the first instance (111h) of the symbol (301) while sequentially displaying a number of subsequent portions (e.g., first line segment 111b in second stage 101b when first portion 111a from first stage 101a is the earlier portion, first line segment 111c in third stage 101c when first line segment 111b from second stage 101b is the earlier portion, and so on) of the first instance (111h) of the symbol (301).

As previously described, drawing the first instance (111h) of the symbol (301) having a first intermediate color may include drawing the first instance (111h) of the symbol (301) having a color gradient spanning at least two intermediate colors.

At 402a, the display device (300) draws a second instance (112h) of the symbol (301), the second instance (112h) having a second intermediate color and the second instance (112h) at least partially overlapping the first instance (111h). The second instance (112h) may be at least partially transparent and the first intermediate color and the second intermediate color may combine to display the color of the symbol (301) where the second instance (112h) overlaps the first instance (111h). Similar to the first instance (111h), the second instance (112h) may be drawn by a display (330) of the display device (300). The second instance (112h) may be drawn by a light engine (360) of the display (330) of the display device (300). For example, drawing the second instance (112h) by the display (330) or light engine (360) of the display device (300) may include: generating display light (372) in the second intermediate color by at least a subset of multiple light sources (361, 362, 363), and arranging, directing, shaping, or otherwise structuring the display light (372) to trace a profile of the symbol (301) by a controllable optical component (380) of the display (330) or light engine (360), such as at least one scan mirror, at least one liquid crystal display (LCD or LCOS), at least one microdisplay, or at least one spatial light modulator.

Referring to FIG. 1A, drawing the second instance (112h) of the symbol (301) at 402a may include initiating the drawing the second instance (112h) of the symbol (301) at a second point (122a) in the display area (350) of the display device (300) and dynamically extending or progressively tracing the second instance (112h) from the first point (122a) to another point in the display area (350) of the display device (300). The second point (122a) where the second instance (112h) is initiated may be spatially-separated from the first point (121a) where the first instance (111h) is initiated. Referring to FIGS. 1A, 1B, 1C, 1D, 1E, 1F, 1G, and 1H, drawing the second instance (112h) of the symbol (301) at 402a may include persistently displaying a number of earlier portions (112a, 112b, 112c, 112d, 112e, 112f, and 112g) of the second instance (112h) of the symbol (301) while sequentially displaying a number of subsequent portions (e.g., second line segment 112b at second stage 101b when second portion 112a from first stage 101a is the earlier portion, second line segment 112c at third stage 101c when second line segment 112b from second stage 101b is the earlier portion, and so on) of the second instance (112h) of the symbol (301).

As previously described, the symbol (301) may include an alphanumeric character. In this case, drawing the first instance (111h) of the symbol (301) at 401a may include drawing a first instance (111h) of the alphanumeric character and drawing the second instance (112h) of the symbol (301) at 402a may include drawing a second instance (112h) of the alphanumeric character. In some implementations, the symbol may include a graphic (e.g., an alphanumeric character, an emblem, an icon, a logo, a glyph, an emoji, or a pictograph) having a single continuous line. In this case, drawing the first instance (111h) of the symbol (301) at 401a may include drawing a first instance (111h) of the graphic having a single continuous line and drawing the second instance (112h) of the symbol (301) at 402a may include drawing a second instance (112h) of the graphic having a single continuous line.

In some implementations, the color of the symbol (301) may be white. In such implementations, drawing the second instance (112h) of the symbol (301) at 402a, the second instance (112h) having a second intermediate color and the second instance (112h) at least partially overlapping the first instance (111h), may include drawing the second instance (112h) of the symbol (301), the second intermediate color of the second instance (112h) combining with the first intermediate color of the first instance (111h) where the second instance (112h) overlaps the first instance (111h) to display the white symbol (301).

As previously described, drawing the first instance (111h) of the symbol (301) at 401a may include drawing the first instance (111h) of the symbol (301) at a first rate and/or in a first direction and/or in a first layer, and drawing the second instance (112h) of the symbol (301) at 402a may include drawing the second instance (112h) of the symbol (301) at a second rate and/or in a second direction and/or in a second layer, the second rate different from the first rate, the second direction different from the first direction, and the second layer different from (e.g., underneath or on top of) the first layer.

At the completion of 402a, method 400a may end. That is, some implementations of method 400a may terminate after act 402a and not proceed to optional acts 403a and 404a. Other implementations, however, may proceed from act 402a to act 403a.

At optional 403a, the display device (300) undraws (e.g., dynamically removes, progressively erases, or regressively traces) the first instance (111h) of the symbol (301). The first instance (111h) may be undrawn by a display (330) of the display device (300). The first instance (111h) may be undrawn by a light engine (360) of the display (330) of the display device (300). For example, undrawing the first instance (111h) by the display (330) or light engine (360) of the display device (300) may include: generating display light (371) in the first intermediate color by at least a subset of multiple light sources (361, 362, 363), and arranging, directing, shaping, or otherwise structuring the display light (371) to untrace (e.g., remove a trace) a profile of the symbol (301) by a controllable optical component (380) of the display (330) or light engine (360), such as at least one scan mirror, at least one liquid crystal display (LCD or LCOS), at least one microdisplay, or at least one spatial light modulator.

Undrawing the first instance (111h) of the symbol (301) at 403a may include initiating the undrawing the first instance (111h) of the symbol (301) at a first point (121a, or elsewhere) in the display area (350) of the display device (300) and dynamically removing or regressively tracing the first instance (111h) from the first point (121a, or elsewhere) to another point in the display area (350) of the display device (300). Referring to a backwards progression through FIGS. 1A, 1B, 1C, 1D, 1E, 1F, 1G, and 1H (i.e., starting at FIG. 1H and working back to FIG. 1A), undrawing the first instance (111h) of the symbol (301) at 403a may include sequentially and persistently not displaying a number of earlier removed portions (111g, 111f, 111e, 111d, 111c, 111b, and then 111a) of the first instance (111h) of the symbol (301) while sequentially removing or "undisplaying" a number of subsequent portions (e.g., first line segment 111b in second stage 101b when first line segment 111c from third stage 101c is the earlier removed portion, first portion 111a in first stage 101a when first line segment 111b from second stage 101b is the earlier removed portion, and so on) of the first instance (111h) of the symbol (301). At optional 404a, the display device (300) undraws (e.g., dynamically removes, progressively erases, or regressively traces) the second instance (112h) of the symbol (301). The second instance (112h) may be undrawn by a display (330) of the display device (300). The second instance (112h) may be undrawn by a light engine (360) of the display (330) of the display device (300). For example, undrawing the second instance (112h) by the display (330) or light engine (360) of the display device (300) may include: generating display light (372) in the second intermediate color by at least a subset of multiple light sources (361, 362, 363), and arranging, directing, shaping, or otherwise structuring the display light (372) to untrace a profile of the symbol (301) by a controllable optical component (380) of the display (330) or light engine (360), such as at least one scan mirror, at least one liquid crystal display (LCD or LCOS), at least one microdisplay, or at least one spatial light modulator.

Undrawing the second instance (112h) of the symbol (301) at 404a may include initiating the undrawing the second instance (112h) of the symbol (301) at a second point (122a, or elsewhere) in the display area (350) of the display device (300) and dynamically removing or regressively tracing the second instance (112h) from the second point (122a, or elsewhere) to another point in the display area (350) of the display device (300). Referring to a backwards progression through FIGS. 1A, 1B, 1C, 1D, 1E, 1F, 1G, and 1H (i.e., starting at FIG. 1H and working back to FIG. 1A), undrawing the second instance (112h) of the symbol (301) at 404a may include sequentially and persistently not displaying a number of earlier removed portions (112g, 112f, 112e, 112d, 112c, 112b, and then 112a) of the second instance (112h) of the symbol (301) while sequentially removing or "undisplaying" a number of subsequent portions (e.g., second line segment 112b in second stage 101b when second line segment 112c from third stage 101c is the earlier removed portion, second portion 112a in first stage 101a when second line segment 112b from second stage 101b is the earlier removed portion, and so on) of the second instance (112h) of the symbol (301).

At optional 403a and 404a, undrawing the first instance (111h) of the symbol (301) and the second instance (112h) of the symbol (301) separates the color of the symbol (301)

into the first intermediate color and the second intermediate color and undraws the symbol (301) from the display area (350).

In some implementations of method 400a, acts 401a and 402a may be performed concurrently, and then at some point after the completion of acts 401a and 402a acts 403a and 404a may, if performed at all, be performed concurrently.

Figure 4B:
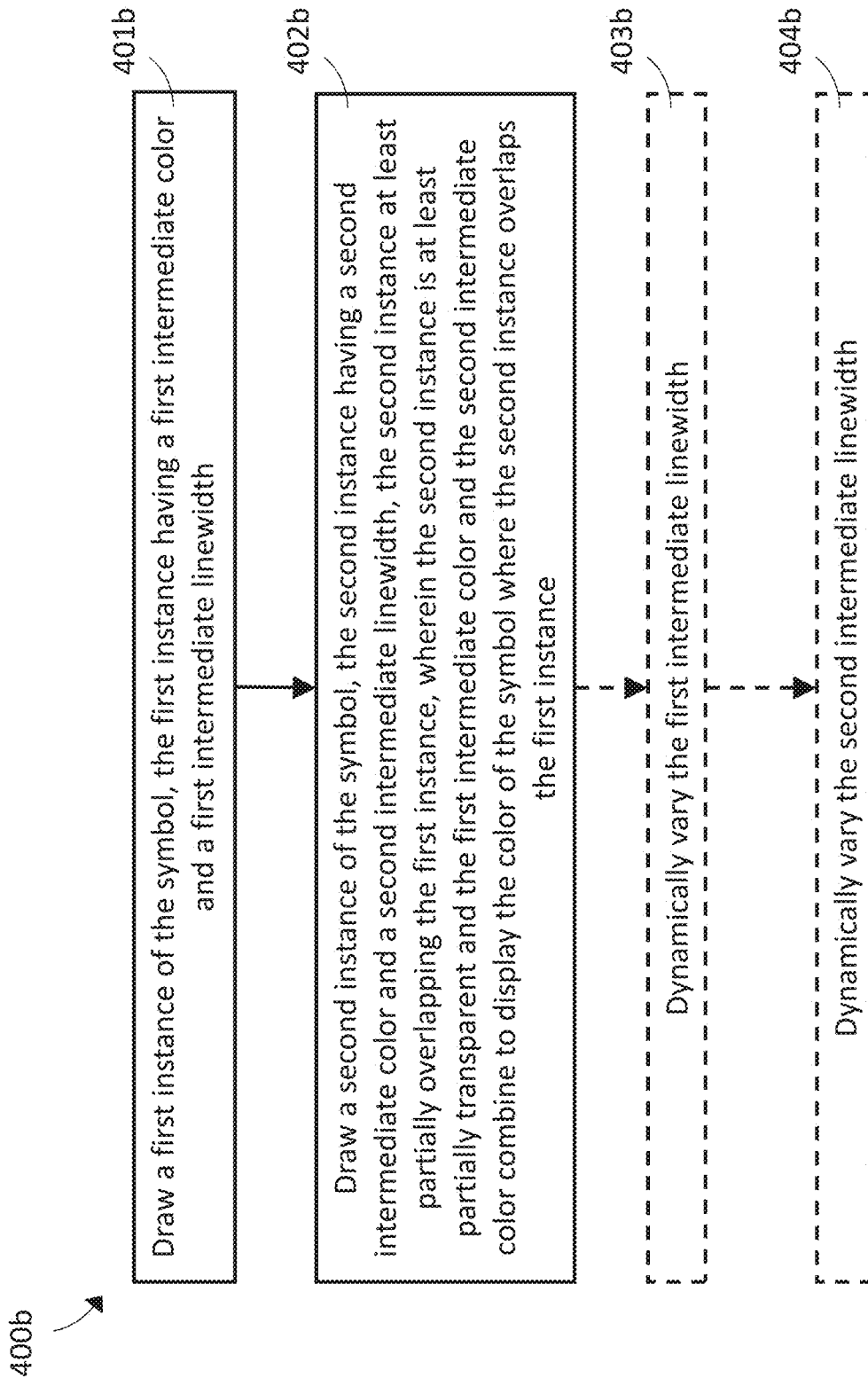
FIG. 4B is a flow-diagram showing another (e.g., processor-based) method of displaying a symbol in accordance with the present systems, devices, and methods.

FIG. 4B is a flow-diagram showing another (e.g., processor-based) method 400b of displaying a symbol in accordance with the present systems, devices, and methods. Method 400b includes two acts 401b and 402b and two optional acts 403b and 404b, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 400b may be carried out or performed by a display device, such as a wearable heads-up display (300), and to that end method 400b may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 400b stored in the memory (342), the processor (341) may cause the display device (300) to perform acts 401b, 402b, and (optionally) 403b and 404b of method 400b. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 400b.

Acts 401b and 402b of method 400b are substantially similar to acts 401a and 402a, respectively, of method 400a except that in method 400b the linewidth or line weight of each instance is also specified. That is, at 401b, the display device (300) draws a first instance (111h) of the symbol (301) having a first intermediate color and a first intermediate linewidth and at 402b, the display device (300) draws a second instance (112h) of the symbol (301) having a second intermediate color and a second intermediate linewidth. Other than the linewidth specifications, acts 401b and 402b of method 400b are substantially similar to acts 401a and 402a, respectively, of method 400a. However, additionally, whereas method 400a optionally includes acts 403a and 404a, method 400b optionally includes acts 403b and 404b.

At 403b, the display device (300) dynamically varies the first intermediate linewidth of the first instance (111h). In some implementations, the display device (300) may dynamically vary the first intermediate linewidth to match the intended final target linewidth of the symbol (301). For example, if the first intermediate linewidth is less than the intended final target linewidth of the symbol (301) then at 403b the display device (300) may dynamically grow, expand, or thicken the linewidth of the first instance (111h) to match the intended final target linewidth of the symbol (301), and if the first intermediate linewidth is greater than the intended final target linewidth of the symbol (301) then at 403b the display device (300) may dynamically shrink, reduce, or thin the linewidth of the first instance (111h) to match the intended final target linewidth of the symbol (301). In some implementations, the display device (300) may first dynamically vary the first intermediate linewidth away from the intended final target linewidth of the symbol (301) (e.g., if the first intermediate linewidth is thicker than the intended final target linewidth of the symbol (301), the display device may first dynamically grow, expand, or thicken the linewidth of the first instance (111h) before dynamically shrinking, reducing, or thinning the linewidth of the first instance (111h)) and then dynamically vary the first intermediate linewidth to match the intended final target linewidth of the symbol (301). For example, dynamically varying the first intermediate linewidth of the first instance (111h) by the display (330) or light engine (360) of the display device (300) may include: generating display light (371) in the first intermediate color by at least a subset of multiple light sources (361, 362, 363), and arranging, directing, shaping, or otherwise structuring the display light (371) to vary a displayed linewidth by a controllable optical component (380) of the display (330) or light engine (360), such as at least one scan mirror, at least one liquid crystal display (LCD or LCOS), at least one microdisplay, or at least one spatial light modulator.

At 404b, the display device (300) dynamically varies the second intermediate linewidth of the second instance (112h) to match the intended final target linewidth of the symbol (301), either directly or by first dynamically varying the second intermediate linewidth away from the intended final target linewidth of the symbol (301) as described for the first intermediate linewidth at 403b. For example, dynamically varying the second intermediate linewidth of the second instance (112h) by the display (330) or light engine (360) of the display device (300) may include: generating display light (372) in the second intermediate color by at least a subset of multiple light sources (361, 362, 363), and arranging, directing, shaping, or otherwise structuring the display light (372) to vary a displayed linewidth by a controllable optical component (380) of the display (330) or light engine (360), such as at least one scan mirror, at least one liquid crystal display (LCD or LCOS), at least one microdisplay, or at least one spatial light modulator.

In some implementations, act 403b may be performed concurrently with act 401b and act 404b may be performed concurrently with act 402b. In some implementations act 401b may be performed concurrently with act 402b. Thus, in some implementations acts 401b, 402b, 403b, and 404b may all be performed concurrently.

To generalize acts 403b and 404b, at least one of the first intermediate linewidth of the first instance (111h) and/or the second intermediate linewidth of the second instance (112h) may be different from (e.g., greater than or less than) the intended final target linewidth of the symbol (301). If the first intermediate linewidth of the first instance (111h) is different from (e.g., greater than or less than) the intended final target linewidth of the symbol (301), then act 403b may be performed and the display device (300) may dynamically vary (e.g., dynamically shrink or dynamically expand) the first intermediate linewidth to match the linewidth of the symbol (301). If the second intermediate linewidth of the second instance (112h) is different from (e.g., greater than or less than) the intended final target linewidth of the symbol (301), then act 404b may be performed and the display device (300) may dynamically vary (e.g., dynamically shrink or dynamically expand) the second intermediate linewidth to match the linewidth of the symbol (301).

In some implementations, methods 400a from FIG. 4A and 400b from FIG. 4B may be combined. That is, in some implementations, all of acts 401a/401b, 402a/402b, 403a, 403b, 404a, and 404b may be performed by a display device (300) to display and "undisplay" a symbol (301). In such implementations, in addition to undrawing the first instance (111h) of the symbol (301) at 403a and undrawing the second instance (112h) of the symbol (301) at 404a, the combined method may also include dynamically restoring the intermediate linewidth of at least one of the first instance (111h) and/or the second instance (112h) (i.e., whichever linewidth(s) was/were dynamically varied in act 403b and/or act 404b).

Figure 4C:
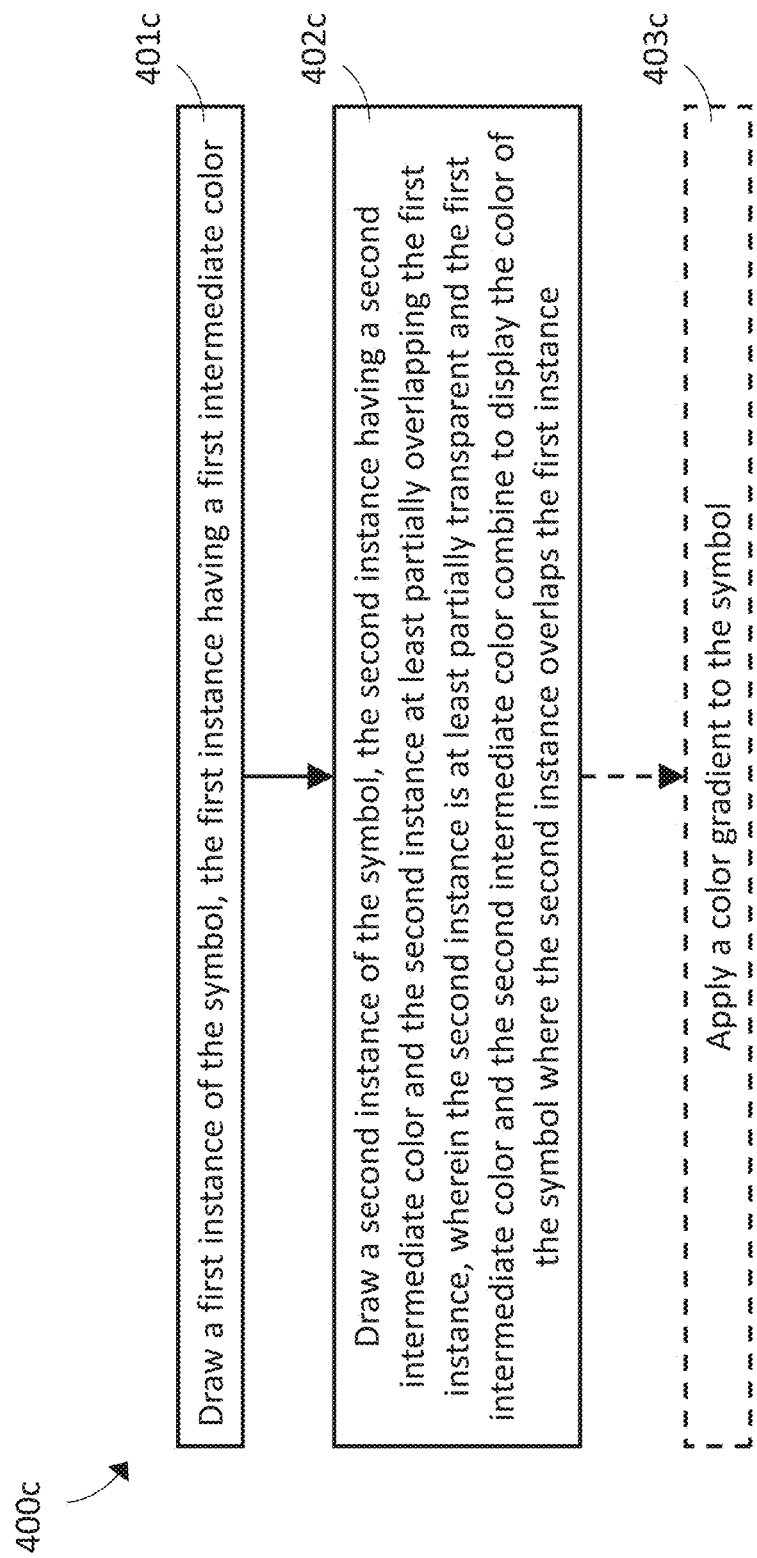
FIG. 4C is a flow-diagram showing another (e.g., processor-based) method of displaying a symbol in accordance with the present systems, devices, and methods.

FIG. 4C is a flow-diagram showing another (e.g., processor-based) method 400c of displaying a symbol in accordance with the present systems, devices, and methods. Method 400c includes two acts 401c and 402c and one optional act 403c, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 400c may be carried out or performed by a display device, such as a wearable heads-up display (300), and to that end method 400c may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 400c stored in the memory (342), the processor (341) may cause the display device (300) to perform acts 401c, 402c, and (optionally) 403c of method 400c. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 400c.

Acts 401c and 402c of method 400c are substantially similar to acts 401a and 402a, respectively, of method 400a. That is, at 401c, the display device (300) draws a first instance (111h) of the symbol (301) having a first intermediate color and at 402c, the display device (300) draws a second instance (112h) of the symbol (301) having a second intermediate color. However, additionally, whereas method 400a optionally includes acts 403a and 404a, method 400c optionally includes act 403c.

At optional 403c, the display device (300) applies a color gradient to the symbol (301). For example, a display (330) or light engine (360) component of the display device (300) may apply the color gradient to the symbol (301) substantially as described in relation to tenth display stage 101j of FIG. 1J. Multiple light sources (i.e., at least two of light sources 361, 362, and/or 363) may generate display light (i.e., at least two of 371, 372, and/or 373) to produce the at least wo colors necessary to apply the gradient at 403c and at least one controllable optical component 380 (e.g., scan mirror, LCD, SLM, or similar) of the display (330) may spatially direct the display light (at least two of 371, 372, and/or 373) over the display area (350) to display the color gradient.

Method 400c of FIG. 4C may be combined with either or both of methods 400a of FIG. 4A and/or method 400b of FIG. 4B.

Figure 4D:
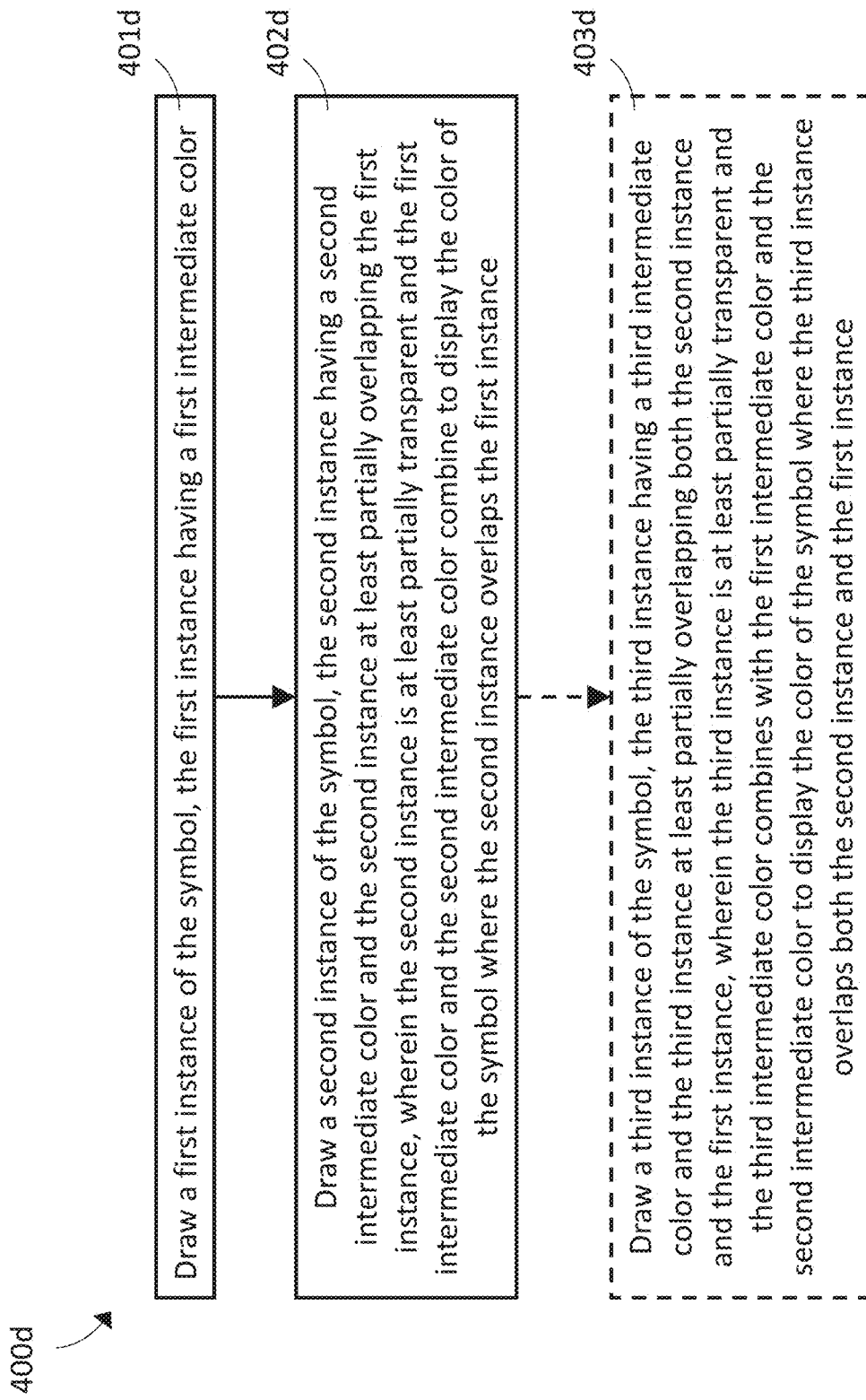
FIG. 4D is a flow-diagram showing another (e.g., processor-based) method of displaying a symbol in accordance with the present systems, devices, and methods.

FIG. 4D is a flow-diagram showing another (e.g., processor-based) method 400d of displaying a symbol in accordance with the present systems, devices, and methods. Method 400d includes two acts 401d and 402d and one optional act 403d, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 400d may be carried out or performed by a display device, such as a wearable heads-up display (300), and to that end method 400d may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 400d stored in the memory (342), the processor (341) may cause the display device (300) to perform acts 401d, 402d, and (optionally) 403d of method 400d. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 400d.

Acts 401d and 402d of method 400d are substantially similar to acts 401a and 402a, respectively, of method 400a. That is, at 401d, the display device (300) draws a first instance (111h) of the symbol (301) having a first intermediate color and at 402d, the display device (300) draws a second instance (112h) of the symbol (301) having a second intermediate color. However, additionally, whereas method 400a optionally includes acts 403a and 404a, method 400d optionally includes act 403d.

At optional 403d, the display device (300) draws a third instance (113h) of the symbol (301) having a third intermediate color. The third instance (113h) may at least partially overlap both the second instance (112h) and the first instance (111h). The third instance (113h) may be at least partially transparent so that the third intermediate color combines with both the first intermediate color and the second intermediate color to display the color of the symbol (301) where the third instance (113h) overlaps both the second instance (112h) and the first instance (111h).

The third instance (113h) may be drawn by a display (330) of the display device (300). The third instance (113h) may be drawn by a light engine (360) of the display (330) of the display device (300). For example, drawing the third instance (113h) by the display (330) or light engine (360) of the display device (300) may include: generating display light (373) in the third intermediate color by at least a subset of multiple light sources (361, 362, 363), and arranging, directing, shaping, or otherwise structuring the display light (373) to trace a profile of the symbol (301) by a controllable optical component (380) of the display (330) or light engine (360), such as at least one scan mirror, at least one liquid crystal display (LCD or LCOS), at least one microdisplay, or at least one spatial light modulator. As previously described, the color of the symbol (301) may, for example, be white. In this case, act 403d may include drawing the third instance (113h) of the symbol (301), the third intermediate color of the third instance (113h) combining with both the second intermediate color of the second instance (112h) and the first intermediate color of the first instance (111h) where the third instance (113h) overlaps both the second instance (112h) and the first instance (111h) to display the white symbol (301).

Figure 5A:
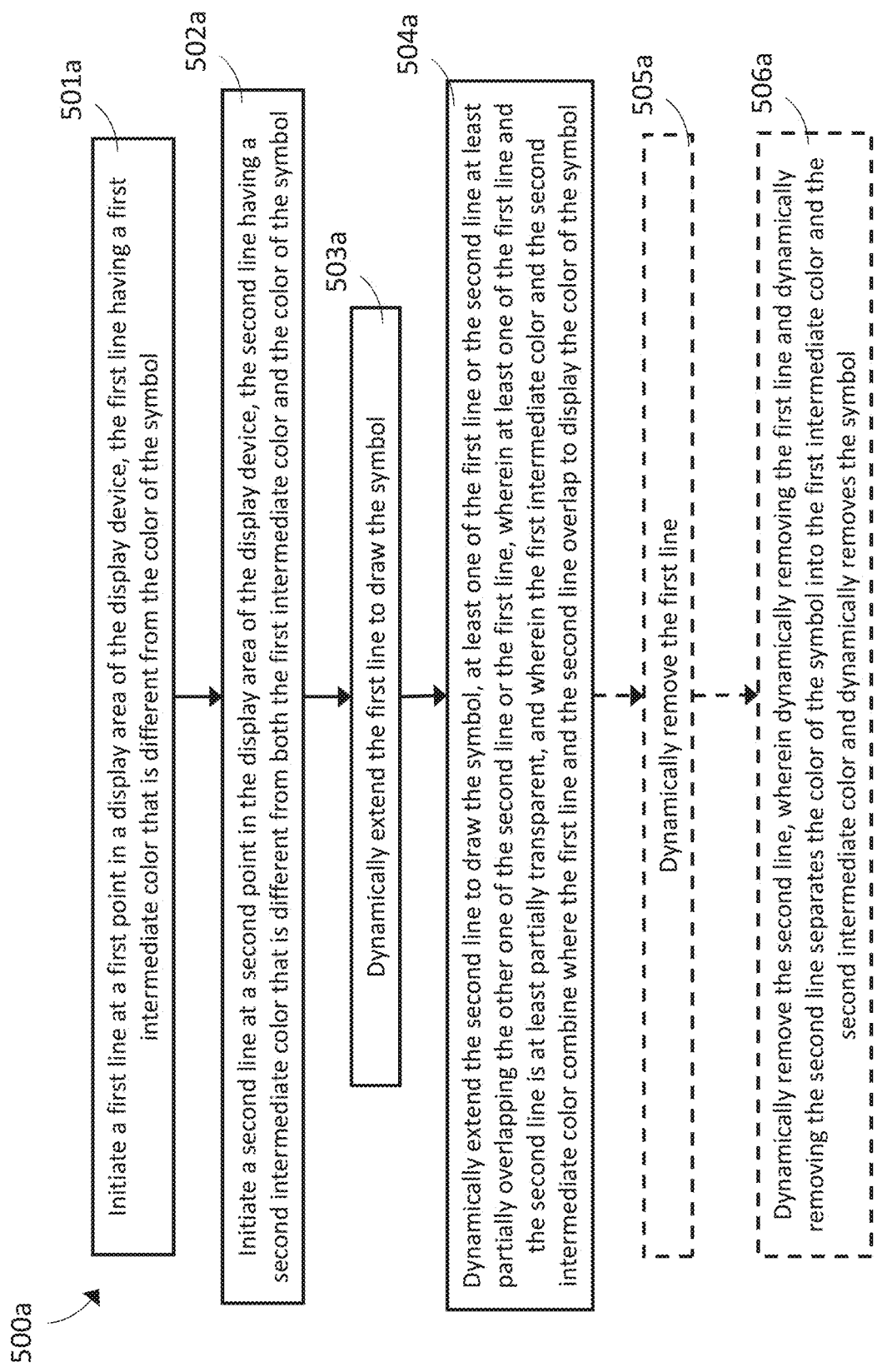
FIG. 5A is a flow-diagram showing a (e.g., processor-based) method of displaying a symbol in accordance with the present systems, devices, and methods.

FIG. 5A is a flow-diagram showing a (e.g., processor-based) method 500a of displaying a symbol in accordance with the present systems, devices, and methods. Method 500a includes four acts 501a, 502a, 503a, and 504a and two optional acts 505a and 506a, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 500a may be carried out or performed by a display device, such as a wearable heads-up display (300), and to that end method 500a may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 500a stored in the memory (342), the processor (341) may cause the display device (300) to perform acts 501a, 502a, 503a, 504a, and (optionally) 505a and 506a of method 500a. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 500a.

At 501a, the display device (300) initiates a first line (111a from FIG. 1A) at a first point (121a from FIG. 1A) in the display area (350), the first line (111a) having a first intermediate color that is different from a color of the symbol (301). The first line (111a) may be initiated by a display (330) of the display device (300). The first line (111a) may be initiated by a light engine (360) of the display (330) of the display device (300). For example, initiating the first line (111a) by the display (330) or light engine (360) of the display device (300) may include: generating display light (371) in the first intermediate color by at least a subset of multiple light sources (361, 362, 363), and arranging, directing, shaping, or otherwise structuring the display light (371) to display the first line (111a) by a controllable optical component (380) of the display (330) or light engine (360), such as at least one scan mirror, at least one liquid crystal display (LCD or LCOS), at least one microdisplay, or at least one spatial light modulator.

As previously described, initiating the first line (111a) of the symbol (301) having a first intermediate color may include initiating the first line (111a) of the symbol (301) having a color gradient spanning at least two intermediate colors.

At 502a, the display device (300) initiates a second line (112a from FIG. 1A) at a second point (122a from FIG. 1A) in the display area (350), the second line (112a) having a second intermediate color that is different from both the first intermediate color of the first line (111a) and the color of the symbol (301). The second line (112a) may be initiated by a display (330) of the display device (300). The second line (112a) may be initiated by a light engine (360) of the display (330) of the display device (300). For example, initiating the second line (112a) by the display (330) or light engine (360) of the display device (300) may include: generating display light (372) in the second intermediate color by at least a subset of multiple light sources (361, 362, 363), and arranging, directing, shaping, or otherwise structuring the display light (372) to display the second line (112a) by a controllable optical component (380) of the display (330) or light engine (360), such as at least one scan mirror, at least one liquid crystal display (LCD or LCOS), at least one microdisplay, or at least one spatial light modulator.

The second point (122a) in the display area (350) at which the second line (112a) is initiated by the display device (300) may be spatially-separated from the first point (121a) in the display area (350) at which the first line is initiated by the display device (300).

At 503a, the display device (300) dynamically extends the first line (111a) to draw the symbol (301) (e.g., a first instance (111h) of the symbol (301)). Referring to FIGS. 1A, 1B, 1C, 1D, 1E, 1F, 1G, and 1H, drawing the symbol (301) may include persistently displaying a number of earlier portions (111a, 111b, 111c, 111d, 111e, 111f, and 111g) of the first line while sequentially displaying a number of subsequent portions (e.g., first line segment 111b subsequent to first portion 111a, first line segment 111c subsequent to first line segment 111b, and so on) of the first line.

At 504a, the display device (300) dynamically extends the second line (112a) to draw the symbol (301) (e.g., a second instance (112h) of the symbol (301)). Referring to FIGS. 1A, 1B, 1C, 1D, 1E, 1F, 1G, and 1H, drawing the symbol (301) may include persistently displaying a number of earlier portions (112a, 112b, 112c, 112d, 112e, 112f, and 112g) of the second line while sequentially displaying a number of subsequent portions (e.g., second line segment 112b subsequent to second portion 112a, second line segment 112c subsequent to second line segment 112b, and so on) of the second line.

At 503a and 504a, the display device (300) dynamically extends the first line and the second line to cause at least one of the first line or the second line to at least partially overlap the other one of the second line or the first line. That is, either at 503a the display device (300) dynamically extends the first line to at least partially overlap the second line, or at 504a the display device (300) dynamically extends the second line to at least partially overlap the first line. At least one (e.g., the top or uppermost one) of the first line and the second line is at least partially transparent and the display device (300) causes the first intermediate color and the second intermediate color to combine to display the color of the symbol (301) where the first line and the second line overlap.

Method 500a may include selecting at least one of the first intermediate color and/or the second intermediate color to produce an intended final target color for portions of the symbol (301) where the first intermediate color and the second intermediate color overlap. As previously described, the color of the symbol (301) may be white. In implementations for which the color of the symbol (301) is white, initiating, at 502*a*, the second line (112*a*) at the second point (122*a*) in the display area (350) of the display device (300), the second line (112*a*) having a second intermediate color that is different from both the first intermediate color and the color of the symbol (301), may include initiating, at 502*a*, the second line (112*a*) at the second point (122*a*) in the display area (350) of the display device (300), the second line (112*a*) having a second intermediate color that combines with the first intermediate color to display white where the first line (111*a*) and the second line (112*a*) overlap.

As previously described, the symbol (301) may include an alphanumeric character. In this case, dynamically extending the first line (111*a*) to draw the symbol (301) at 503*a* may include dynamically extending the first line (111*a*) to draw the alphanumeric character and dynamically extending the second line (112*a*) to draw the symbol (301) at 504*a* may include dynamically extending the second line (112*a*) to draw the alphanumeric character. In some implementations, the symbol may include a graphic (e.g., an alphanumeric character, an emblem, an icon, a logo, a glyph, an emoji, or a pictograph) having a single continuous line. In this case, dynamically extending the first line (111*a*) to draw the symbol (301) at 503*a* may include dynamically extending the first line (111*a*) to draw the graphic having a single continuous line and dynamically extending the second line (112*a*) to draw the symbol (301) at 504*a* may include dynamically extending the second line (112*a*) to draw the graphic having a single continuous line.

As previously described, dynamically extending the first line (111*a*) to draw the symbol (301) at 503*a* may include dynamically extending the first line (111*a*) to draw the symbol (301) at a first rate and/or in a first direction and/or in a first layer, and dynamically extending the second line (112*a*) to draw the symbol (301) at 504*a* may include dynamically extending the second line (112*a*) to draw the symbol (301) at a second rate and/or in a second direction and/or in a second layer, the second rate different from the first rate, the second direction different from the first direction, and the second layer different from (e.g., underneath or on top of) the first layer.

At the completion of 504*a*, method 500*a* may end. That is, some implementations of method 500*a* may terminate after act 504*a* and not proceed to optional acts 505*a* and 506*a*. Other implementations, however, may proceed from act 504*a* to act 505*a*.

At optional 505*a*, the display device (300) dynamically removes the first line (111*h*) from the display area (350). The first line (111*h*) may be dynamically removed by a display (330) of the display device (300). The first line (111*h*) may be dynamically removed by a light engine (360) of the display (330) of the display device (300). For example, dynamically removing the first line (111*h*) by the display (330) or light engine (360) of the display device (300) may include: generating display light (371) in the first intermediate color by at least a subset of multiple light sources (361, 362, 363), and arranging, directing, shaping, or otherwise structuring the display light (371) to remove or "undisplay" successive portions of the first line by a controllable optical component (380) of the display (330) or light engine (360), such as at least one scan mirror, at least one liquid crystal display (LCD or LCOS), at least one microdisplay, or at least one spatial light modulator.

Dynamically removing the first line (111*h*) at 505*a* may include initiating the dynamically removing the first line at a first point (121*a*, or elsewhere) in the display area (350) of the display device (300) and undrawing or regressively tracing the first line (111*h*) from the first point (121*a*, or elsewhere) to another point in the display area (350) of the display device (300). Referring to a backwards progression through FIGS. 1A, 1B, 1C, 1D, 1E, 1F, 1G, and 1H (i.e., starting at FIG. 1H and working back to FIG. 1A), dynamically removing the first line (111*h*) at 505*a* may include sequentially and persistently not displaying a number of earlier removed portions (111*g*, 111*f*, 111*e*, 111*d*, 111*c*, 111*b*, and then 111*a*) of the first line (111*h*) while sequentially removing or "undisplaying" a number of subsequent portions (e.g., first line segment 111*b* in second stage 101*b* when first line segment 111*c* from third stage 101*c* is the earlier removed portion, first portion 111*a* in first stage 101*a* when first line segment 111*b* from second stage 101*b* is the earlier removed portion, and so on) of the first line (111*h*).

At optional 506*a*, the display device (300) dynamically removes the second line (112*h*) from the display area (350). The second line (112*h*) may be dynamically removed by a display (330) of the display device (300). The second line (112*h*) may be dynamically removed by a light engine (360) of the display (330) of the display device (300). For example, dynamically removing the second line (112*h*) by the display (330) or light engine (360) of the display device (300) may include: generating display light (372) in the second intermediate color by at least a subset of multiple light sources (361, 362, 363), and arranging, directing, shaping, or otherwise structuring the display light (372) to remove or "undisplay" successive portions of the second line by a controllable optical component (380) of the display (330) or light engine (360), such as at least one scan mirror, at least one liquid crystal display (LCD or LCOS), at least one microdisplay, or at least one spatial light modulator.

Dynamically removing the second line (112*h*) at 506*a* may include initiating the dynamically removing the second line (112*h*) at a second point (122*a*, or elsewhere) in the display area (350) of the display device (300) and undrawing or regressively tracing the second line (112*h*) from the second point (122*a*, or elsewhere) to another point in the display area (350) of the display device (300). Referring to a backwards progression through FIGS. 1A, 1B, 1C, 1D, 1E, 1F, 1G, and 1H (i.e., starting at FIG. 1H and working back to FIG. 1A), dynamically removing the second line (112*h*) at 506*a* may include sequentially and persistently not displaying a number of earlier removed portions (112*g*, 112*f*, 112*e*, 112*d*, 112*c*, 112*b*, and then 112*a*) of the second line (112*h*) while sequentially removing or "undisplaying" a number of subsequent portions (e.g., second line segment 112*b* in second stage 101*b* when second line segment 112*c* from third stage 101*c* is the earlier removed portion, second portion 112*a* in first stage 101*a* when second line segment 112*b* from second stage 101*b* is the earlier removed portion, and so on) of the second line (112*h*).

At optional 505*a* and 506*a*, dynamically removing the first line (111*h*) and the second line (112*h*) separates the color of the symbol (301) into the first intermediate color and the second intermediate color and dynamically removes the symbol (301) from the display area (350).

In some implementations of method 500*a*, acts 501*a* and 502*a* may be performed concurrently, and then at some point after the completion of acts 501*a* and 502*a*, acts 503*a* and 504*a* may be performed concurrently, and then at some point after the completion of acts 503*a* and 504*a*, acts 505*a* and 506*a* may, if performed at all, be performed concurrently.

Figure 5B:
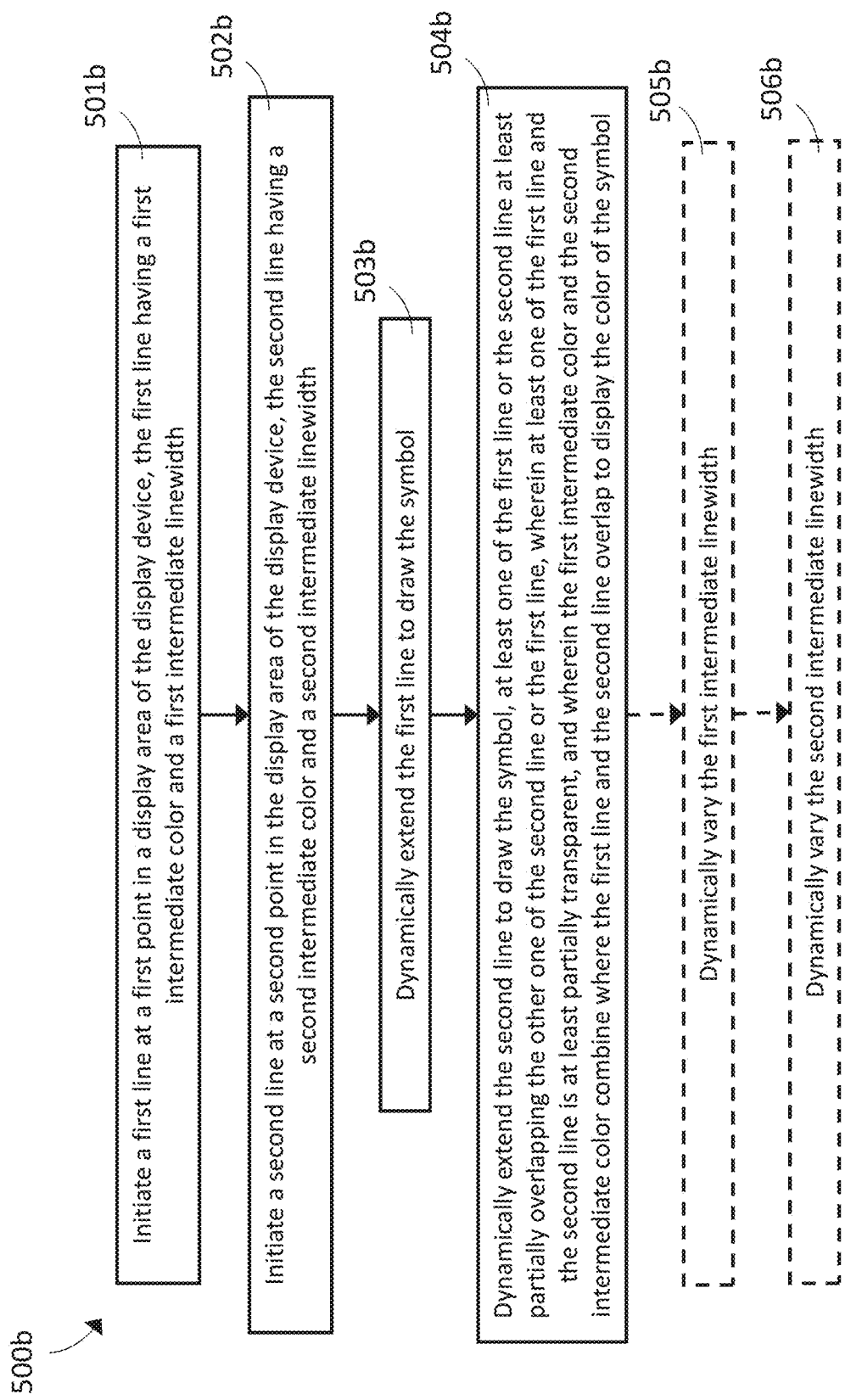
FIG. 5B is a flow-diagram showing another (e.g., processor-based) method of displaying a symbol in accordance with the present systems, devices, and methods.

FIG. 5B is a flow-diagram showing another (e.g., processor-based) method 500*b* of displaying a symbol in accordance with the present systems, devices, and methods.

Method 500*b* includes four acts 501*b*, 502*b*, 503*b*, and 504*bb* and two optional acts 505*b* and 506*b*, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 500*b* may be carried out or performed by a display device, such as a wearable heads-up display (300), and to that end method 500*b* may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 500*b* stored in the memory (342), the processor (341) may cause the display device (300) to perform acts 501*b*, 502*b*, 503*b*, 504*b*, and (optionally) 505*b* and 506*b* of method 500*b*. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 500*b*.

Acts 501*b*, 502*b*, 503*b*, and 504*b* of method 500*b* are substantially similar to acts 501*a*, 502*a*, 503*a*, and 504*a*, respectively, of method 500*a* except that in method 500*b* the linewidth or line weight of each line is also specified. That is, at 501*b*, the display device (300) initiates a first line (111*a*) having a first intermediate color and a first intermediate linewidth and at 503*b*, the display device (300) dynamically extends the first line (111*a*) to draw the symbol (301). At 502*b*, the display device (300) initiates a second line (112*a*) having a second intermediate color and a second intermediate linewidth and at 504*b*, the display device (300) dynamically extends the second line (112*a*) to draw the symbol (301). Other than the linewidth specifications, acts 501*b*, 502*b*, 503*b*, and 504*b* of method 500*b* are substantially similar to acts 501*a*, 502*a*, 503*a*, and 504*a*, respectively, of method 500*a*. However, additionally, whereas method 500*a* optionally includes acts 505*a* and 506*a*, method 500*b* optionally includes acts 505*b* and 506*b*.

At optional 505*b*, the display device (300) dynamically varies the first intermediate linewidth of the first line (111*h*). In some implementations, the display device (300) may dynamically vary the first intermediate linewidth to match the intended final target linewidth of the symbol (301). For example, if the first intermediate linewidth is less than the intended final target linewidth of the symbol (301) then at 505*b* the display device (300) may dynamically grow, expand, or thicken the linewidth of the first line (111*h*) to match the intended final target linewidth of the symbol (301), and if the first intermediate linewidth is greater than the intended final target linewidth of the symbol (301) then at 505*b* the display device (300) may dynamically shrink, reduce, or thin the linewidth of the first line (111*h*) to match the intended final target linewidth of the symbol (301). In some implementations, the display device (300) may first dynamically vary the first intermediate linewidth away from the intended final target linewidth of the symbol (301) (e.g., if the first intermediate linewidth is thicker than the intended final target linewidth of the symbol (301), the display device may first dynamically grow, expand, or thicken the linewidth of the first line before dynamically shrinking, reducing, or thinning the linewidth of the first line (111*h*)) and then dynamically vary the first intermediate linewidth to match the intended final target linewidth of the symbol (301). For example, dynamically varying the first intermediate linewidth of the first line (111*h*) by the display (330) or light engine (360) of the display device (300) may include: generating display light (371) in the first intermediate color by at least a subset of multiple light sources (361, 362, 363), and arranging, directing, shaping, or otherwise structuring the display light (371) to vary a displayed linewidth by a controllable optical component (380) of the display (330) or light engine (360), such as at least one scan mirror, at least one liquid crystal display (LCD or LCOS), at least one microdisplay, or at least one spatial light modulator.

At optional 506*b*, the display device (300) dynamically varies the second intermediate linewidth of the second line (112*h*) to match the intended final target linewidth of the symbol (301), either directly or by first dynamically varying the second intermediate linewidth away from the intended final target linewidth of the symbol (301) as described for the first intermediate linewidth at 505*b*. For example, dynamically varying the second intermediate linewidth of the second instance (112*h*) by the display (330) or light engine (360) of the display device (300) may include: generating display light (372) in the second intermediate color by at least a subset of multiple light sources (361, 362, 363), and arranging, directing, shaping, or otherwise structuring the display light (372) to vary a displayed linewidth by a controllable optical component (380) of the display (330) or light engine (360), such as at least one scan mirror, at least one liquid crystal display (LCD or LCOS), at least one microdisplay, or at least one spatial light modulator.

In some implementations, act 505*b* may be performed concurrently with act 503*b*, and act 506*b* may be performed concurrently with act 504*b*. In some implementations act 501*b* may be performed concurrently with act 502*b*, and act 503*b* may be performed concurrently with act 504*b*. Thus, in some implementations acts 503*b*, 504*b*, 505*b*, and 506*b* may all be performed concurrently.

To generalize acts 505*b* and 506*b*, at least one of the first intermediate linewidth of the first line (111*h*) and/or the second intermediate linewidth of the second line (112*h*) may be different from (e.g., greater than or less than) the intended final target linewidth of the symbol (301). If the first intermediate linewidth of the first line (111*h*) is different from (e.g., greater than or less than) the intended final target linewidth of the symbol (301), then act 505*b* may be performed and the display device (300) may dynamically vary (e.g., dynamically shrink or dynamically expand) the first intermediate linewidth to match the linewidth of the symbol (301). If the second intermediate linewidth of the second line (112*h*) is different from (e.g., greater than or less than) the intended final target linewidth of the symbol (301), then act 506*b* may be performed and the display device (300) may dynamically vary (e.g., dynamically shrink or dynamically expand) the second intermediate linewidth to match the linewidth of the symbol (301).

In some implementations, methods 500*a* from FIG. 5A and 500*b* from FIG. 5B may be combined. That is, in some implementations, all of acts 501*a*/501*b*, 502*a*/502*b*, 503*a*/503*b*, 504*a*/504*b*, 505*a*, 505*b*, 506*a*, and 506*b* may be performed by a display device (300) to display and "undisplay" a symbol (301). In such implementations, in addition to dynamically removing the first line (111h) at 505a and dynamically removing the second line (112h) at 506a, the combined method may also include dynamically restoring the intermediate linewidth of at least one of the first line (111h) and/or the second line (112h) (i.e., whichever linewidth(s) was/were dynamically varied in act 505b and/or act 506b).

Figure 5C:
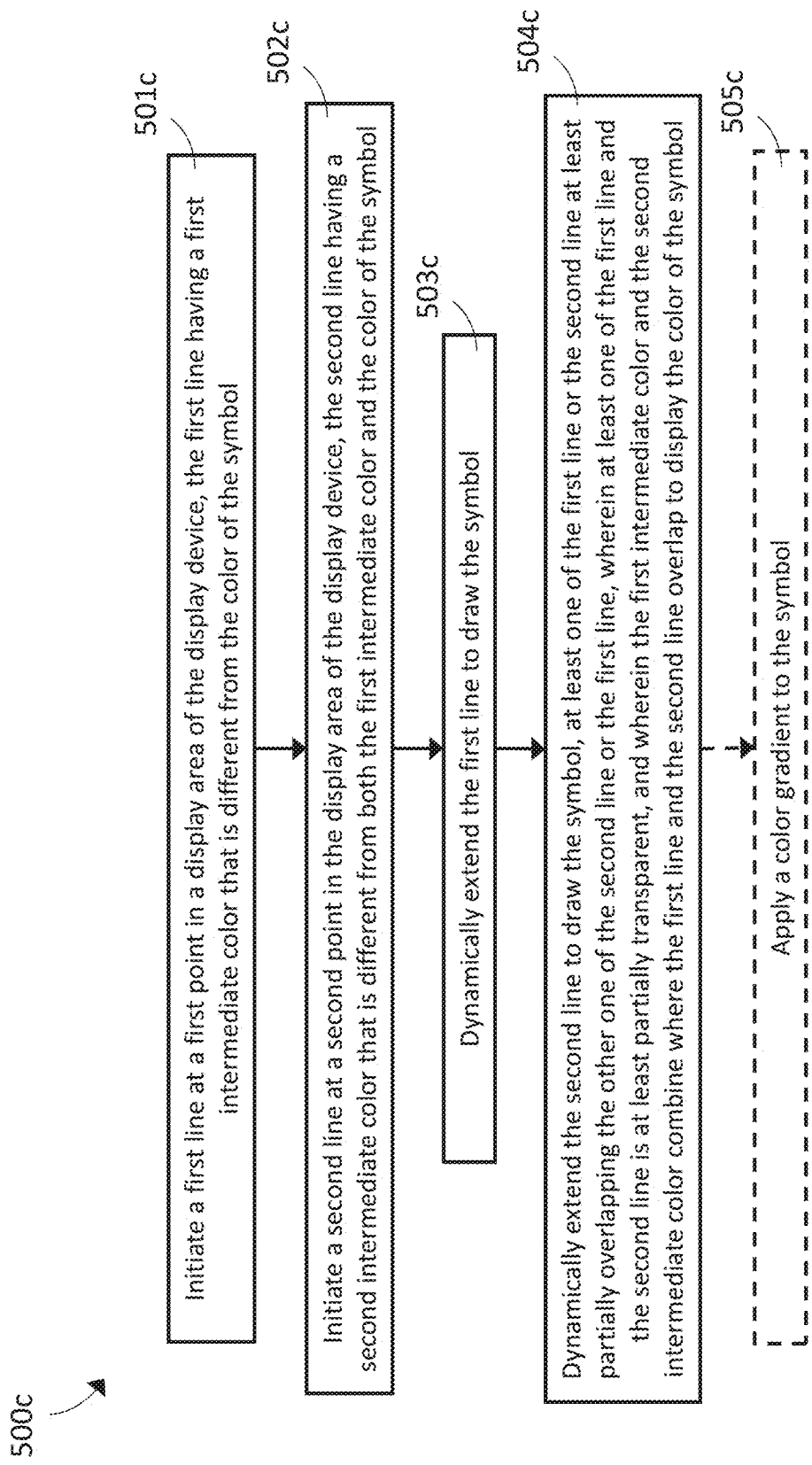
FIG. 5C is a flow-diagram showing another (e.g., processor-based) method of displaying a symbol in accordance with the present systems, devices, and methods.

FIG. 5C is a flow-diagram showing another (e.g., processor-based) method 500c of displaying a symbol in accordance with the present systems, devices, and methods. Method 500c includes four acts 501c, 502c, 503c, and 504c and one optional act 505c, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 500c may be carried out or performed by a display device, such as a wearable heads-up display (300), and to that end method 500c may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 500c stored in the memory (342), the processor (341) may cause the display device (300) to perform acts 501c, 502c, 503c, 504c, and (optionally) 505c of method 500c. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 500c.

Acts 501c, 502c, 503c, and 504c of method 500c are substantially similar to acts 501a, 502a, 503a, and 504a, respectively, of method 500a. That is, at 501c, the display device (300) initiates a first line (111a) having a first intermediate color and at 503c, the display device (300) dynamically extends the first line (111a) to draw the symbol (301). At 502c, the display device (300) initiates a second line (112a) having a second intermediate color and at 504c, the display device (300) dynamically extends the second line (112a) to draw the symbol (301). However, additionally, whereas method 500a optionally includes acts 505a and 506a, method 500c optionally includes act 505c.

At optional 505c, the display device (300) applies a color gradient to the symbol (301). For example, a display (330) or light engine (360) component of the display device (300) may apply the color gradient to the symbol (301) substantially as described in relation to tenth display stage 101j of FIG. 1J. Multiple light sources (i.e., at least two of light sources 361, 362, and/or 363) may generate display light (i.e., at least two of 371, 372, and/or 373) to produce the at least two colors necessary to apply the gradient at 505c and at least one controllable optical component 380 (e.g., scan mirror, LCD, SLM, or similar) of the display (330) may spatially direct the display light (at least two of 371, 372, and/or 373) over the display area (350) to display the color gradient.

Method 500c of FIG. 5C may be combined with either or both of methods 500a of FIG. 5A and/or method 500b of FIG. 5B.

Figure 5D:
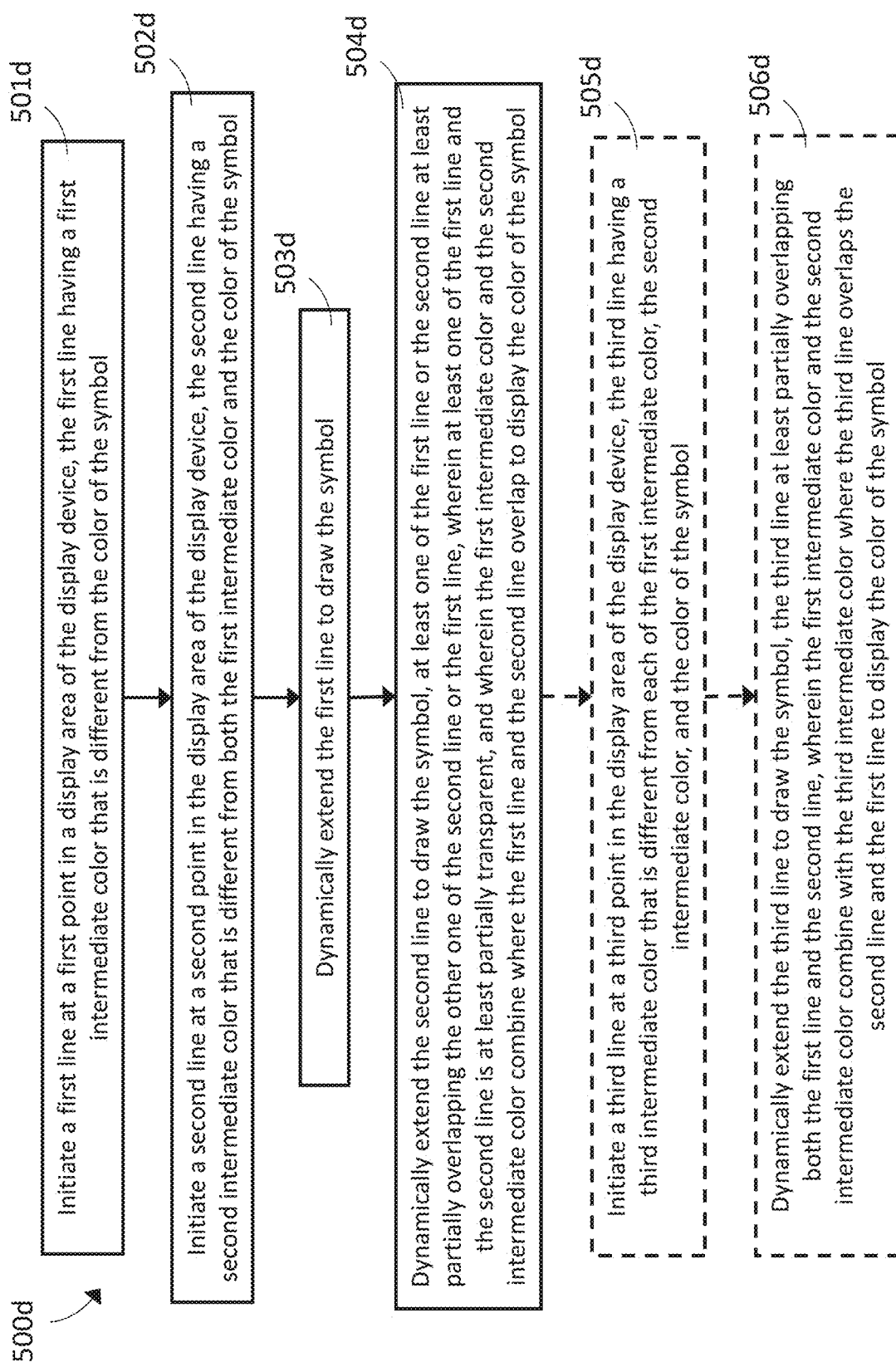
FIG. 5D is a flow-diagram showing another (e.g., processor-based) method of displaying a symbol in accordance with the present systems, devices, and methods.

FIG. 5D is a flow-diagram showing another (e.g., processor-based) method 500d of displaying a symbol in accordance with the present systems, devices, and methods. Method 500d includes four acts 501d, 502d, 503d, and 504d and two optional acts 505d and 506d, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 500d may be carried out or performed by a display device, such as a wearable heads-up display (300), and to that end method 500d may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 500d stored in the memory (342), the processor (341) may cause the display device (300) to perform acts 501d, 502d, 503d, 504d, and (optionally) 505d and 506d of method 500d. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 500d.

Acts 501d, 502d, 503d, and 504d of method 500d are substantially similar to acts 501a, 502a, 503a, and 504a, respectively, of method 500a. That is, at 501d, the display device (300) initiates a first line (111a) having a first intermediate color and at 503d, the display device (300) dynamically extends the first line (111a) to draw the symbol (301). At 502d, the display device (300) initiates a second line (112a) having a second intermediate color and at 504d, the display device (300) dynamically extends the second line (112a) to draw the symbol (301). However, additionally, whereas method 500a optionally includes acts 505a and 506a, method 500d optionally includes acts 505d and 506d.

At optional 505d, the display device (300) initiates a third line (113b) at a third point in the display area (350), the third line (113b) having a third intermediate color that is different from each of the first intermediate color, the second intermediate color, and the intended final target color of the symbol (301).

The third line (113b) may be initiated by a display (330) of the display device (300). The third line (113b) may be initiated by a light engine (360) of the display (330) of the display device (300). For example, initiating the third line (113b) by the display (330) or light engine (360) of the display device (300) may include: generating display light (373) in the third intermediate color by at least a subset of multiple light sources (361, 362, 363), and arranging, directing, shaping, or otherwise structuring the display light (373) to display the third line (113b) by a controllable optical component (380) of the display (330) or light engine (360), such as at least one scan mirror, at least one liquid crystal display (LCD or LCOS), at least one microdisplay, or at least one spatial light modulator.

At optional 506*d*, the display device (300) dynamically extends the third line (113*h*) to draw the symbol (301). Referring to FIGS. 1A, 1B, 1C, 1D, 1E, 1F, 1G, and 1H, drawing the symbol (301) may include persistently displaying a number of earlier portions (113*b*, 113*c*, 113*d*, 113*e*, 113*f*, and 113*g*) of the third line while sequentially displaying a number of subsequent portions (e.g., third line segment 111*c* subsequent to third line segment portion 111*b*, third line segment 111*d* subsequent to third line segment 111*c*, and so on) of the third line. The third line (113*h*) may at least partially overlap both the second line (112*h*) and the first line (111*h*). The third line (113*h*) may be at least partially transparent so that the third intermediate color combines with both the first intermediate color and the second intermediate color to display the color of the symbol (301) where the third line (113*h*) overlaps both the second line (112*h*) and the first line (111*h*). For example, if the color of the symbol (301) is white, then the third intermediate color, the second intermediate color, and the first intermediate color may all be selected so that white is displayed in regions of the display area (350) where the third intermediate color, the second intermediate color, and the first intermediate color all overlap.

Figure 6A:
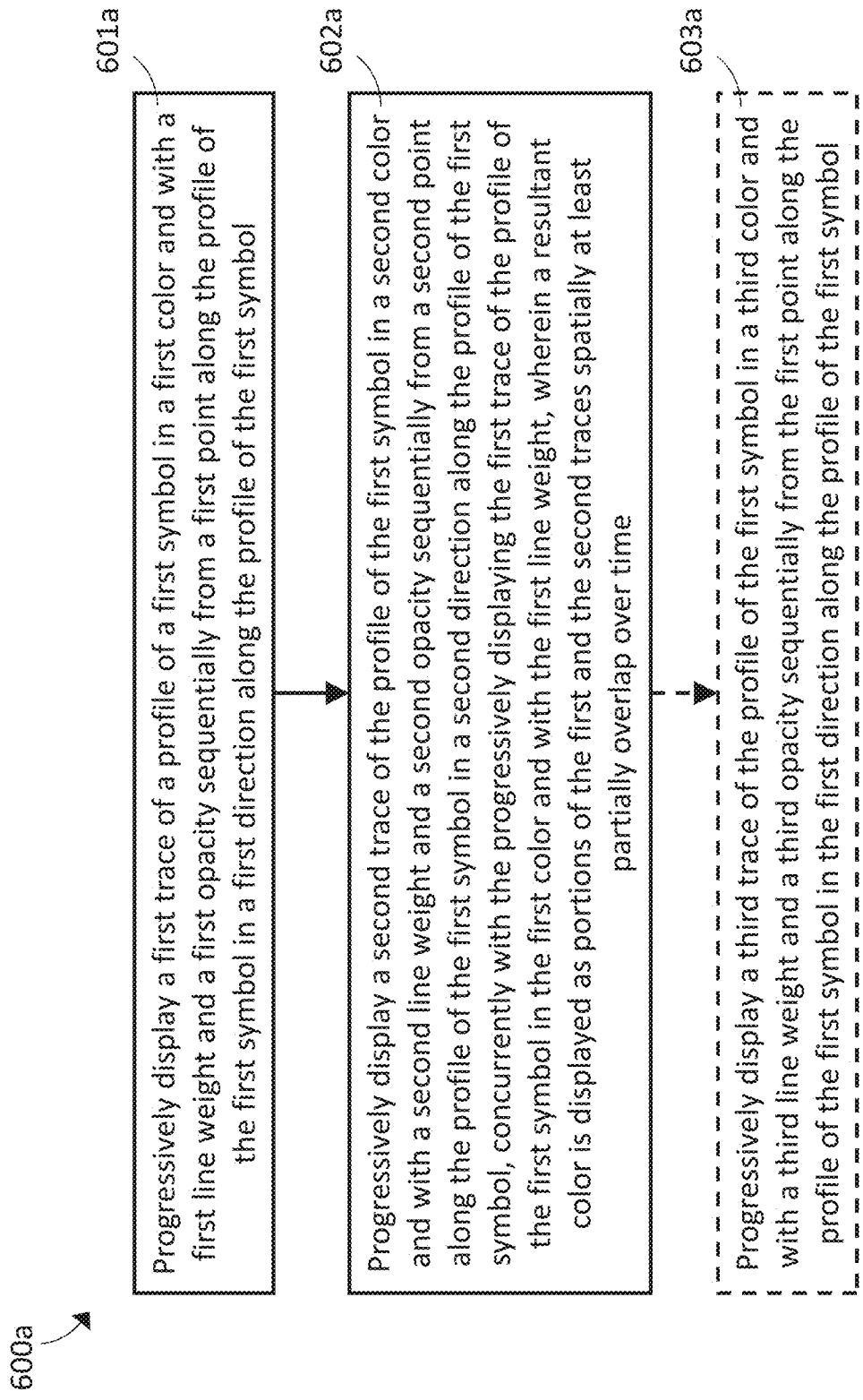
FIG. 6A is a flow-diagram showing a (e.g., processor-based) method of generating visual displays of symbols on a display device in accordance with the present systems, devices, and methods.

FIG. 6A is a flow-diagram showing a (e.g., processor-based) method 600*a* of generating visual displays of symbols on a display device in accordance with the present systems, devices, and methods. Method 600*a* includes two acts 601*a* and 602*a* and one optional act 603*a*, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 600*a* may be carried out or performed by a display device, such as a wearable heads-up display (300), and to that end method 600*a* may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 600*a* stored in the memory (342), the processor (341) may cause the display device (300) to perform acts 601*a*, 602*a*, and (optionally) 603*a* of method 600*a*. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 600*a*.

At 601*a*, the display device (300) progressively displays a first trace (111*h*) of a profile of a first symbol (301) in a first color and with a first line weight and a first opacity sequentially from a first point (121*a*) along the profile of the first symbol (301) in a first direction along the profile of the first symbol (301). The first trace (111*h*) may be progressively displayed by a display (330) of the display device (300). The first trace (111*h*) may be progressively displayed by a light engine (360) of the display (330) of the display device (300). For example, progressively displaying the first trace (111*h*) by the display (330) or light engine (360) of the display device (300) may include: generating display light (371) in the first color by at least a subset of multiple light sources (361, 362, 363), and arranging, directing, shaping, or otherwise structuring the display light (371) to trace a profile of the first symbol (301) by a controllable optical component (380) of the display (330) or light engine (360), such as at least one scan mirror, at least one liquid crystal display (LCD or LCOS), at least one microdisplay, or at least one spatial light modulator.

Referring to FIGS. 1A, 1B, 1C, 1D, 1E, 1F, 1G, and 1H, progressively displaying the first trace (111*h*) of the profile of the first symbol (301) may include persistently displaying a number of earlier portions (111*a*, 111*b*, 111 *c*, 111*d*, 111*e*, 111*f*, and 111*g*) of the first trace (111*h*) of the profile of the first symbol (301) in the first color and with the first line weight while sequentially displaying a number of subsequent portions (e.g., first line segment 111*b* in second stage 101*b* when first portion 111*a* from first stage 101*a* is the earlier portion, first line segment 111*c* in third stage 101*c* when first line segment 111*b* from second stage 101*b* is the earlier portion, and so on) of the first trace (111*h*).

As previously described, progressively displaying the first trace (111*h*) of the profile of the first symbol (301) in a first color and with a first line weight and a first opacity may include operating at least two light sources (e.g., any two or more of 361, 362, 363) with respective colors, the respective colors different from one another and different from the first color, to produce the first color.

The first symbol (301) may include an alphanumeric character, and progressively displaying the first trace (111*h*) of the profile of the first symbol (301) at 601*a* may include progressively displaying a first trace of the profile of an alphanumeric character.

At 602*a*, the display device (300) progressively displays a second trace (112*h*) of the profile of the first symbol (301) in a second color and with a second line weight and a second opacity sequentially from a second point (122*a*) along the profile of the first symbol (301) in a second direction along the profile of the first symbol (301). Act 602*a* may be performed concurrently with the progressively displaying the first trace (111*h*) of the profile of the first symbol (301) in the first color and with the first line weight of act 601*a*. In accordance with the present systems, devices, and methods, a resultant color may be displayed as portions of the first (111*h*) and the second (112*h*) traces spatially at least partially overlap over time.

The second trace (112*h*) may be progressively displayed by a display (330) of the display device (300). The second trace (112*h*) may be progressively displayed by a light engine (360) of the display (330) of the display device (300). For example, progressively displaying the second trace (112*h*) by the display (330) or light engine (360) of the display device (300) may include: generating display light (372) in the second color by at least a subset of multiple light sources (361, 362, 363), and arranging, directing, shaping, or otherwise structuring the display light (372) to trace a profile of the first symbol (301) by a controllable optical component (380) of the display (330) or light engine (360), such as at least one scan mirror, at least one liquid crystal display (LCD or LCOS), at least one microdisplay, or at least one spatial light modulator.

Referring to FIGS. 1A, 1B, 1C, 1D, 1E, 1F, 1G, and 1H, progressively displaying the second trace (112*h*) of the profile of the first symbol (301) may include persistently displaying a number of earlier portions (112a, 112b, 112c, 112d, 112e, 112f, and 112g) of the second trace (112h) of the profile of the first symbol (301) in the second color and with the second line weight while sequentially displaying a number of subsequent portions (e.g., second line segment 112b in second stage 101b when second portion 112a from first stage 101a is the earlier portion, second line segment 112c in third stage 101c when second line segment 112b from second stage 101b is the earlier portion, and so on) of the second trace (112h).

In some implementations, progressively displaying the first trace (111h) of the profile of the first symbol (301) sequentially from the first point (121a) along the profile of the first symbol (301) in a first direction along the profile of the first symbol (301) at 601a may include progressively displaying the first trace (111h) of the profile of the first symbol (301) sequentially from the first point (121a) along the profile of the first symbol (301) to the second point (122a) along the profile of the first symbol (301) in the first direction along the profile of the first symbol (301) from the first point (121a) toward the second point (122a), and vice versa. In other implementations, progressively displaying the first trace (111h) of the profile of the first symbol (301) sequentially from the first point (121a) along the profile of the first symbol (301) in a first direction along the profile of the first symbol (301) at 601a may include progressively displaying the first trace (111h) of the profile of the first symbol (301) sequentially from the first point (121a) along the profile of the first symbol (301) to another point adjacent the first point (121a) along the profile of the first symbol (301) in the first direction along the profile of the first symbol (301) from the first point (121a) toward the other point adjacent the first point (121a).

Acts 601a and 602a may be performed concurrently and, for example, in separate display layers or "drawing levels" of the display area (350) of the display device (300). For example, the display device (300) may perform act 601a in or at a first drawing level of the display area (350) and the display device (300) may perform act 602a substantially concurrently in or at a second drawing level of the display area (350).

In some implementations, method 600a may include selecting (e.g., by a processor (341) on-board the display device (300)) at least one of the first or the second color to produce a target color (e.g., white) for portions of the profile of the first symbol (301) when the first (111h) and the second (112h) traces overlap. In some implementations, method 600a may include selecting (e.g., by a processor (341) on-board the display device (300)) at least one of the first or the second opacity to produce a target color (e.g., white) for portions of the profile of the first symbol (301) when the first (111h) and the second (112h) traces overlap.

In some implementations, method 600a may include acts 601a and 602a and not include optional act 603a. Other implementations, however, may include act 603a.

At optional 603a, the display device (300) progressively displays a third trace (113h) of the profile of the first symbol (301) in a third color and with a third line weight and a third opacity (and, e.g., in a third drawing level that may be different from both the first drawing level and the second drawing level) sequentially from a third point (which may match the first point 121a or he second point 122a, or may be spatially-separated from both the first point 121a and the second point 122a in the display area (350)) along the profile of the first symbol (301) in a third direction (which may match either the first direction or the second direction, or be different from both the first direction and the second direc-tion) along the profile of the first symbol (301). Optional act 603a may be performed concurrently with the progressively displaying the first trace (111h) of the profile of the first symbol (301) in the first color and with the first line weight of act 601a and/or concurrently with the progressively displaying the second trace (112h) of the profile of the first symbol (301) in the second color and with the second line weight of act 602a. If performed concurrently, all three of acts 601, 602a, and 603a may begin and end at substantially the same time, or their respective start and/or end time(s) may be staggered such that at least one of the first trace (111h), the second trace (112h), and/or the third trace (113h) lags behind at least one other one of the first trace (111h), the second trace (112h), and/or the third trace (113h) and/or at least one of the first trace (111h), the second trace (112h), and/or the third trace (113h) completes the profile of the first symbol (301) before at least one other one of the first trace (111h), the second trace (112h), and/or the third trace (113h). In accordance with the present systems, devices, and methods, a resultant color may be displayed as portions of the first (111h), the second (112h), and the third (113h) traces spatially at least partially overlap over time.

The third trace (113h) may be progressively displayed by a display (330) of the display device (300). The third trace (113h) may be progressively displayed by a light engine (360) of the display (330) of the display device (300). For example, progressively displaying the third trace (113h) by the display (330) or light engine (360) of the display device (300) may include: generating display light (373) in the third color by at least a subset of multiple light sources (361, 362, 363), and arranging, directing, shaping, or otherwise structuring the display light (373) to trace a profile of the first symbol (301) by a controllable optical component (380) of the display (330) or light engine (360), such as at least one scan mirror, at least one liquid crystal display (LCD or LCOS), at least one microdisplay, or at least one spatial light modulator.

Referring to FIGS. 1A, 1B, 1C, 1D, 1E, 1F, 1G, and 1H, progressively displaying the third trace (113h) of the profile of the first symbol (301) may include persistently displaying a number of earlier portions (113b, 113c, 113d, 113e, 113f, and 113g) of the third trace (113h) of the profile of the first symbol (301) in the third color and with the third line weight while sequentially displaying a number of subsequent portions (e.g., third line segment 113c in third stage 101c when third line segment 113b from second stage 101b is the earlier portion, third line segment 113d in fourth stage 101d when third line segment 113c from third stage 101c is the earlier portion, and so on) of the third trace (113h).

Figure 6B:
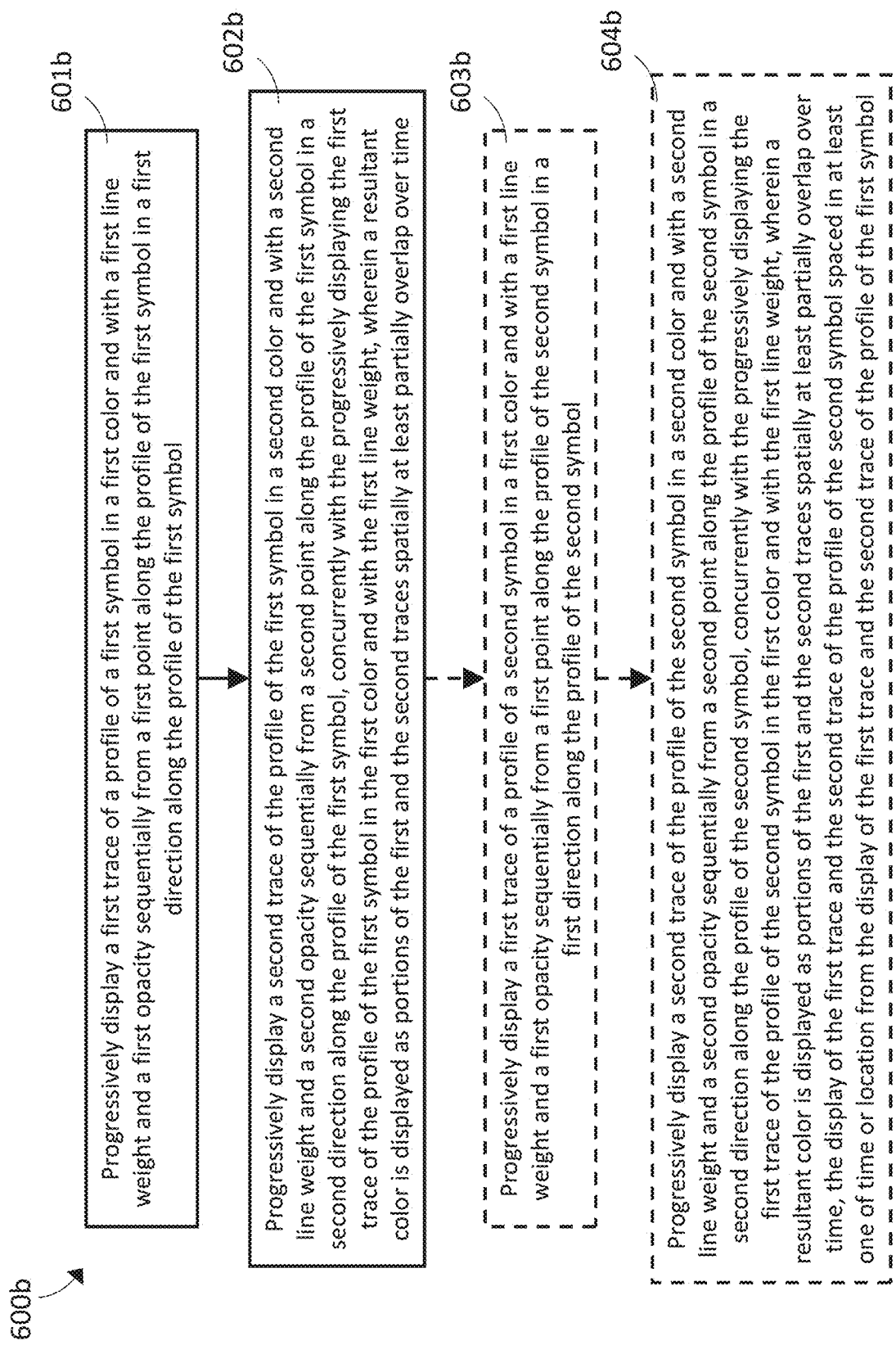
FIG. 6B is a flow-diagram showing another (e.g., processor-based) method of generating visual displays of symbols on a display device in accordance with the present systems, devices, and methods.

FIG. 6B is a flow-diagram showing another (e.g., processor-based) method 600b of generating visual displays of symbols on a display device in accordance with the present systems, devices, and methods. Method 600b includes two acts 601b and 602b and two optional act 603b and 604b, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 600b may be carried out or performed by a display device, such as a wearable heads-up display (300), and to that end method 600b may be embodied in processor-executable instructions and/or data (343) stored in a non-transitory processor-readable storage medium or memory (342) carried on-board the display device (300) and executed by a processor (341)

carried on-board the display device (300). When the processor (341) executes the processor-executable instructions and/or data (343) that embody method 600b stored in the memory (342), the processor (341) may cause the display device (300) to perform acts 601b, 602b, and (optionally) 603b and 604b of method 600b. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 600b.

Acts 601b and 602b of method 600b are substantially similar to acts 601a and 602a, respectively, of method 600a. That is, at 601b, the display device (300) progressively displays a first trace (111h) of a profile of a first symbol (301) in a first color and with a first line width, and at 602b, the display device (300) progressively displays a second trace (112h) of the profile of the first symbol (301) in a second color and with a second line width. However, additionally, whereas method 600a optionally includes act 603a, method 600b optionally includes acts 603b and 604b to display at least a second symbol in addition to the first symbol (301).

At optional 603b, the display device (300) progressively displays a first trace of a profile of a second symbol in a first color and with a first line width and first opacity. Other than the fact that act 603b relates to a second symbol rather than the first symbol (301), act 603b is substantially similar to act 601b. The first color of the second symbol may be the same as or different from the first color of the first symbol (301). The first line width of the second symbol may be the same as or different from the first line width of the first symbol (301). The first opacity of the second symbol may be the same as or different from the first opacity of the first symbol (301).

At optional 604b, the display device (300) progressively displays at least a second trace of a profile of a second symbol in a second color and with a second line width and second opacity. Other than the fact that act 604b relates to a second symbol rather than the first symbol (301), act 604b is substantially similar to act 602b. The second color of the second symbol may be the same as or different from the second color of the first symbol (301). The second line width of the second symbol may be the same as or different from the second line width of the first symbol (301). The second opacity of the second symbol may be the same as or different from the second opacity of the first symbol (301).

Generally, in method 600b and/or in other implementations of methods where a second symbol is displayed, the display of the first trace and the second trace of the profile of the second symbol may be spaced in at least one of time or location from the display of the first trace and the second trace of the profile of the first symbol.

In some implementations, acts 603b and 604b may be performed concurrently with one another. In various implementations, acts 603b and 604b may be performed concurrently (with either complete overlap in time or partial overlap in time) with acts 601b and 602b, or acts 603b and 604b may be performed after acts 601b and 602b have been completed. That is, a second symbol may be sequentially displayed substantially concurrently (either completely or at least partially) with a sequential display of a first symbol, or a second symbol may be sequentially displayed after a sequential display of a first symbol has been completed.

Figure 6C:
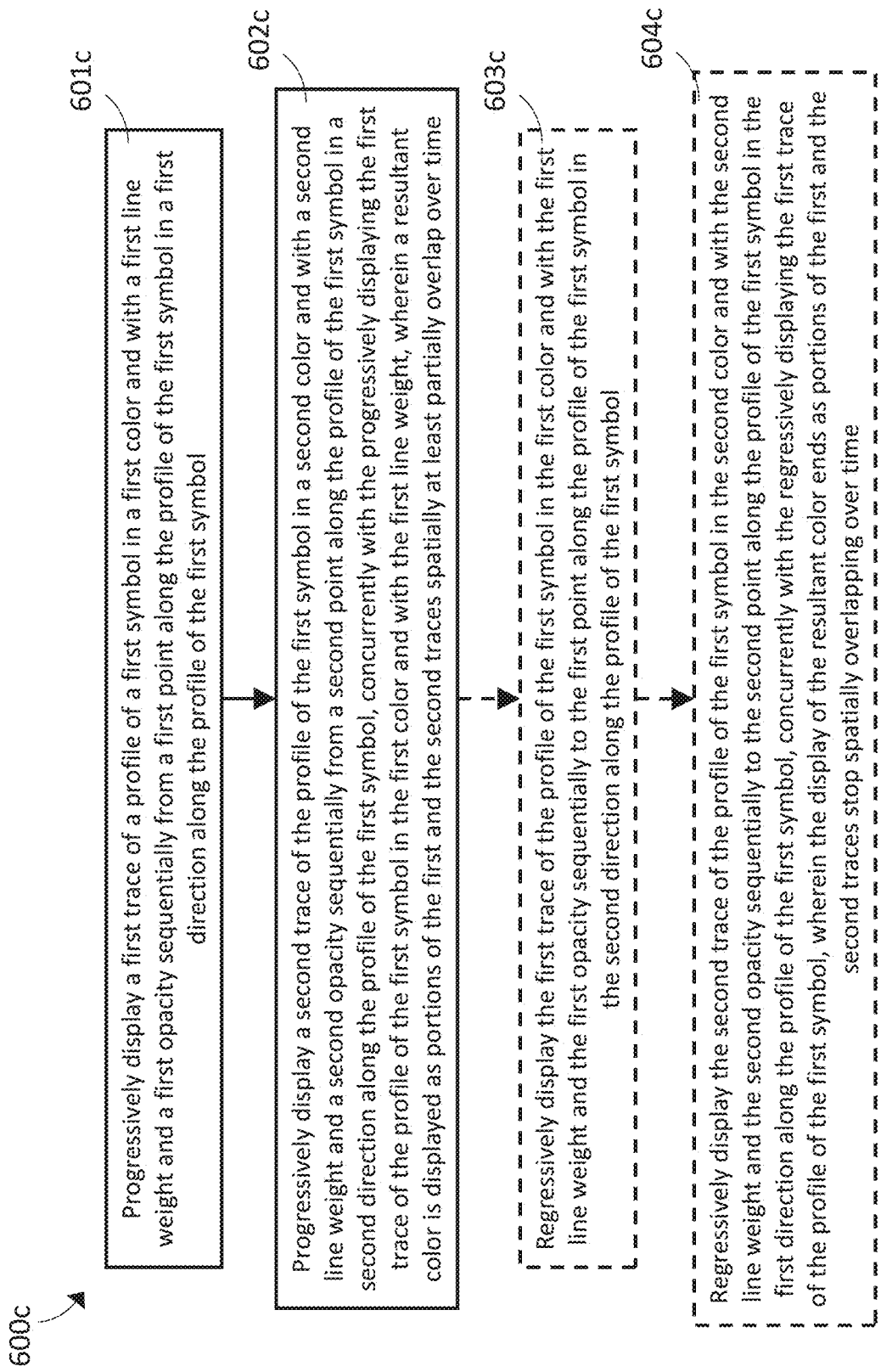
FIG. 6C is a flow-diagram showing another (e.g., processor-based) method of generating visual displays of symbols on a display device in accordance with the present systems, devices, and methods.

FIG. 6C is a flow-diagram showing another (e.g., processor-based) method 600c of generating visual displays of symbols on a display device in accordance with the present systems, devices, and methods. Method 600c includes two acts 601c and 602c and two optional act 603c and 604c, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 600c may be carried out or performed by a display device, such as a wearable heads-up display (300), and to that end method 600c may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 600c stored in the memory (342), the processor (341) may cause the display device (300) to perform acts 601c, 602c, and (optionally) 603c and 604c of method 600c. Thus, the present systems, devices, and methods describe a computer program product (which may be provided as one or more software updates to another computer program product) comprising processor-executable instructions and/or data (343) stored on one or more non-transitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 600c.

Acts 601c and 602c of method 600c are substantially similar to acts 601a and 602a, respectively, of method 600a. That is, at 601c, the display device (300) progressively displays a first trace (111h) of a profile of a first symbol (301) in a first color and with a first line width, and at 602c, the display device (300) progressively displays a second trace (112h) of the profile of the first symbol (301) in a second color and with a second line width. However, additionally, whereas method 600a optionally includes act 603a, method 600c optionally includes acts 603c and 604c to remove, erase, or "undisplay" the first symbol (301) from the display area (350).

At optional 603c, the display device (300) regressively displays the first trace (111h) of the profile of the first symbol (301) in the first color and with the first line weight and the first opacity sequentially to the first point (121a) along the profile of the first symbol (301) in a direction opposite the first direction. For example, the display device (300) may regressively display the first trace (111h) of the profile of the first symbol (301) in the second direction along the profile of the first symbol (301).

The first trace (111h) of the profile of the first symbol (301) may be regressively displayed by a display (330) or, more specifically, by a light engine (360) of the display (330) of the display device (300). For example, regressively displaying the first trace (111h) of the profile of the first symbol (301) by the display (330) or light engine (360) of the display device (300) may include: generating display light (371) in the first color by at least a subset of multiple light sources (361, 362, 363), and arranging, directing, shaping, or otherwise structuring the display light (371) to untrace a profile of the symbol (301) by a controllable optical component (380) of the display (330) or light engine (360), such as at least one scan mirror, at least one liquid crystal display (LCD or LCOS), at least one microdisplay, or at least one spatial light modulator. Referring to a backwards progression through FIGS. 1A, 1B, 1C, 1D, 1E, 1F, 1G, and 1H (i.e., starting at FIG. 1H and working back to FIG. 1A), regressively displaying the first trace (111*h*) of the profile of the first symbol (301) at 603*a* may include sequentially and persistently not displaying a number of earlier removed portions (111*g*, 111*f*, 111*e*, 111*d*, 111*c*, 111*b*, and then 111*a*) of the first trace (111*h*) of the profile of the first symbol (301) while sequentially removing or "undisplaying" a number of subsequent portions (e.g., first line segment 111*b* in second stage 101*b* when first line segment 111*c* from third stage 101*c* is the earlier removed portion, first portion 111*a* in first stage 101*a* when first line segment 111*b* from second stage 101*b* is the earlier removed portion, and so on) of the first trace (111*h*) of the profile of the first symbol (301).

At optional 604*a*, the display device (300) regressively displays the second trace (112*h*) of the profile of the first symbol (301) in the second color and with the second line weight and the second opacity sequentially to the second point (122*a*) along the profile of the first symbol (301) in a direction opposite the second direction. For example, the display device (300) may regressively display the second trace (112*h*) of the profile of the first symbol (301) in the first direction along the profile of the first symbol (301).

The second trace (112*h*) of the profile of the first symbol (301) may be regressively displayed by a display (330) or, more specifically, by a light engine (360) of the display (330) of the display device (300). For example, regressively displaying the second trace (112*h*) of the profile of the first symbol (301) by the display (330) or light engine (360) of the display device (300) may include: generating display light (372) in the second color by at least a subset of multiple light sources (361, 362, 363), and arranging, directing, shaping, or otherwise structuring the display light (372) to untrace a profile of the symbol (301) by a controllable optical component (380) of the display (330) or light engine (360), such as at least one scan mirror, at least one liquid crystal display (LCD or LCOS), at least one microdisplay, or at least one spatial light modulator. Referring to a backwards progression through FIGS. 1A, 1B, 1C, 1D, 1E, 1F, 1G, and 1H (i.e., starting at FIG. 1H and working back to FIG. 1A), regressively displaying the second trace (112*h*) of the profile of the first symbol (301) at 604*a* may include sequentially and persistently not displaying a number of earlier removed portions (112*g*, 112*f*, 112*e*, 112*d*, 112*c*, 112*b*, and then 112*a*) of the second trace (112*h*) of the profile of the first symbol (301) while sequentially removing or "undisplaying" a number of subsequent portions (e.g., second line segment 112*b* in second stage 101*b* when second line segment 112*c* from third stage 101*c* is the earlier removed portion, second portion 112*a* in first stage 101*a* when second line segment 112*b* from second stage 101*b* is the earlier removed portion, and so on) of the second trace (112*h*) of the profile of the first symbol (301).

The resultant color of the first symbol (301) may end as portions of the first (111*h*) and the second (112*h*) traces stop spatially overlapping over time. In some implementations, acts 603*c* and 604*c* may be performed substantially concurrently after the completion of acts 601*c* and 602*c*.

As previously described, undrawing, dynamically removing, regressively displaying, or otherwise "undisplaying" a symbol via a sequential display process as described herein may be performed regardless of whether or not the same symbol was displayed (e.g., drawn, dynamically extended, or progressively traced) by a similar sequential display process. That is, a backwards progression through FIGS. 1A, 1B, 1C, 1D, 1E, 1F, 1G, 1H, 1I, and 1J starting at FIG. 1J and ending at FIG. 1A may be implemented for any symbol regardless of whether or not the same symbol was displayed by a forwards progression through FIGS. 1A, 1B, 1C, 1D, 1E, 1F, 1G, 1H, 1I, and 1J starting at FIG. 1A, and ending at FIG. 1J. Methods 700, 800, and 900 of FIGS. 7, 8, and 9, respectively, provide illustrative examples of "undisplaying" a symbol regardless of the process by which the symbol was displayed.

Figure 7:
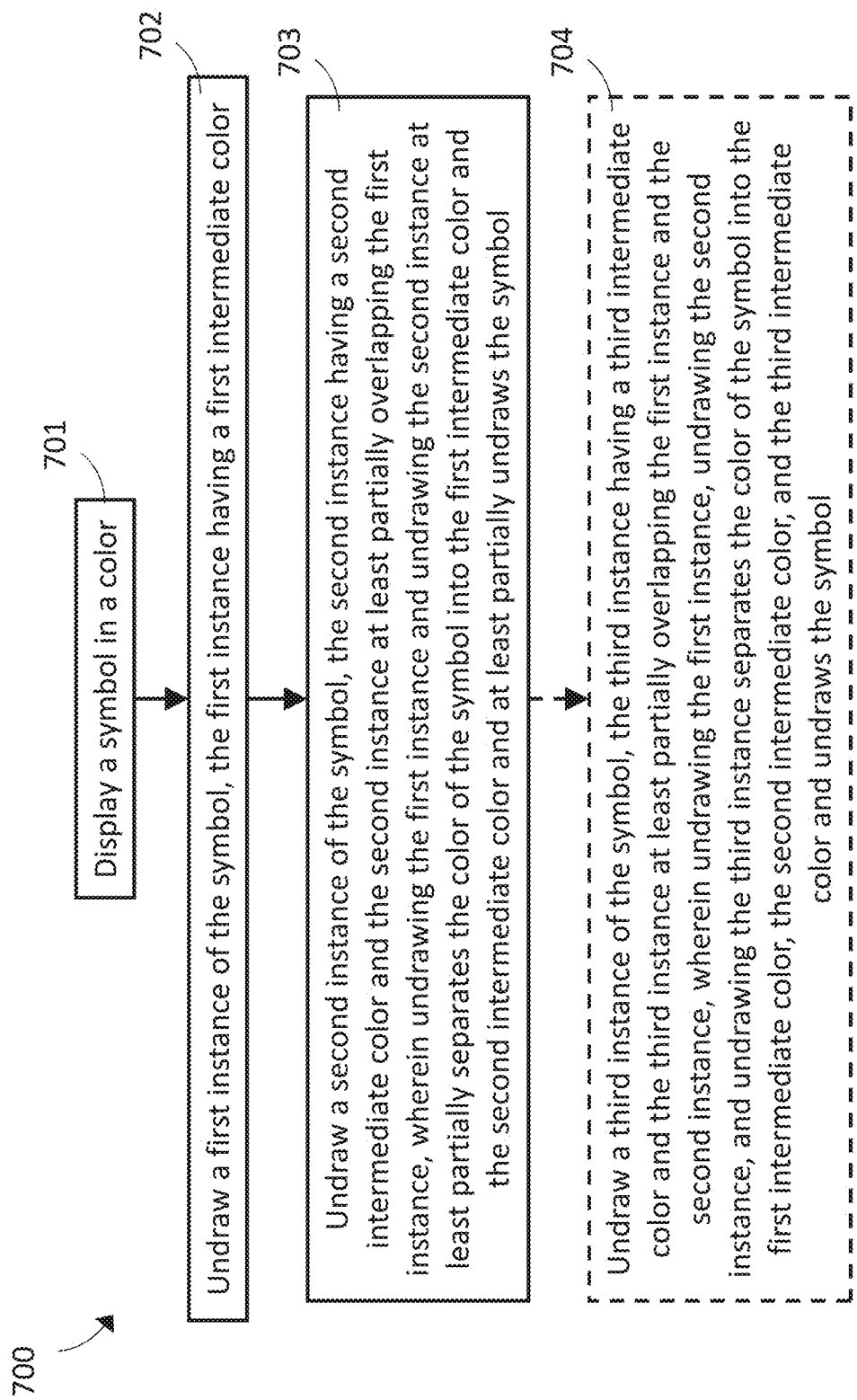
FIG. 7 is a flow-diagram showing a (e.g., processor-based) method of removing or "undisplaying" a displayed symbol from the display area of a display device in accordance with the present systems, devices, and methods.

FIG. 7 is a flow-diagram showing a (e.g., processor-based) method 700 of removing or "undisplaying" a displayed symbol (301) from the display area (350) of a display device (300) in accordance with the present systems, devices, and methods. Method 700 includes three acts 701, 702, and 703 and one optional act 704, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 700 may be carried out or performed by a display device, such as a wearable heads-up display (300), and to that end method 700 may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 700 stored in the memory (342), the processor (341) may cause the display device (300) to perform acts 701, 702, 703, and (optionally) 704 of method 700. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 700.

At 701, the display (330) of the display device (300) displays the symbol in a color. The symbol may be, for example, an alphanumeric character, a graphic, a glyph, an icon, an emoji, a pictograph, an emblem, or a logo.

At 702, the display (330) of the display device (300) undraws a first instance (111*h*) of the symbol (301), the first instance having a first intermediate color. Undrawing the first instance (111*h*) creates regions of the display area (350) where the first instance (111*h*) does not form part of the symbol (301) and thereby removes the first intermediate color component from the color of the symbol (301) in such regions.

At 703, the display (330) of the display device (300) undraws a second instance (112*h*) of the symbol (301), the second instance (112*h*) having a second intermediate color and the second instance (112*h*) at least partially overlapping the first instance (111*h*). Undrawing the second instance (112*h*) creates regions of the display area (350) where the second instance (112*h*) does not form part of the symbol (301) and thereby removes the second intermediate color component from the color of the symbol (301) in such regions. Generally, undrawing the first instance (111*h*) at 702 and undrawing the second instance (112h) at 703 at least partially separates the color of the symbol (301) into the first intermediate color and the second intermediate color and at least partially undraws the symbol (301) (i.e., at least partially removes the symbol (301) from the display area (350)).

Acts 702 and 703 may be performed in series, or they may be performed at least partially concurrently with one another. In some implementations, the color of the symbol (301) may comprise only two constituent color components (i.e., a first intermediate color and a second intermediate color) and, in such implementations, method 700 may terminate without including act 704. However, in other implementations the color of the symbol (301) may comprise at least three constituent color components (i.e., a first intermediate color, a second intermediate color, and a third intermediate color) and, in such implementations, method 700 may include optional act 704.

At optional 704, the display (330) of the display device (300) undraws a third instance (113h) of the symbol (301), the third instance (113h) having a third intermediate color and the third instance (113h) at least partially overlapping both the first instance (111h) and the second instance (112h). Undrawing the third instance (113h) creates regions of the display area (350) where the third instance (113h) does not form part of the symbol (301) and thereby removes the third intermediate color component from the color of the symbol (301) in such regions. Generally, undrawing the first instance (111h) at 702, undrawing the second instance (112h) at 703, and undrawing the third instance (113h) at 704 separates the color of the symbol (301) into the first intermediate color, the second intermediate color, and the third intermediate color and undraws the symbol (301) (i.e., removes the symbol (301) from the display area (350)).

Figure 8:
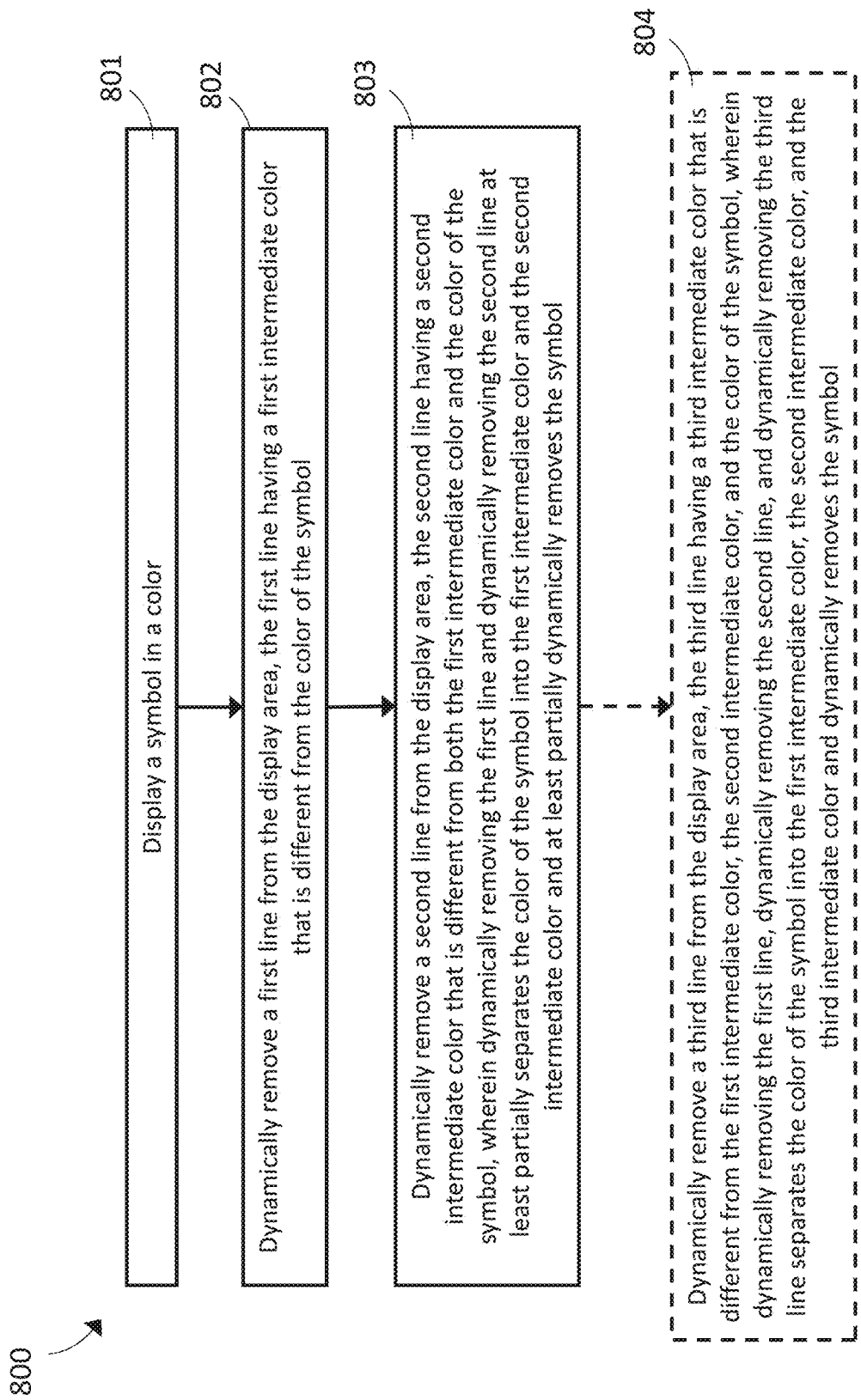
FIG. 8 is a flow-diagram showing another (e.g., processor-based) method of removing or "undisplaying" a displayed symbol from the display area of a display device in accordance with the present systems, devices, and methods.

FIG. 8 is a flow-diagram showing another (e.g., processor-based) method 800 of removing or "undisplaying" a displayed symbol (301) from the display area (350) of a display device (300) in accordance with the present systems, devices, and methods. Method 800 includes three acts 801, 802, and 803 and one optional act 804, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 800 may be carried out or performed by a display device, such as a wearable heads-up display (300), and to that end method 800 may be embodied in processor-executable instructions and/or data (343) stored in a nontransitory processor-readable storage medium or memory (342) carried on-board the display device (300) and executed by a processor (341) carried on-board the display device (300). When the processor (341) executes the processor-executable instructions and/or data (343) that embody method 800 stored in the memory (342), the processor (341) may cause the display device (300) to perform acts 801, 802, 803, and (optionally) 804 of method 800. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 800.

At 801, the display (330) of the display device (300) displays the symbol in a color. The symbol may be, for example, an alphanumeric character, a graphic, a glyph, an icon, an emoji, a pictograph, an emblem, or a logo.

At 802, the display (330) of the display device (300) dynamically removes a first line (111h) from the display area (350), the first line (111h) having a first intermediate color that is different from the color of the symbol. Dynamically removing the first line (111h) creates regions of the display area (350) where the first line (111h) does not form part of the symbol (301) and thereby removes the first intermediate color component from the color of the symbol (301) in such regions.

At 803, the display (330) of the display device (300) dynamically removes a second line (112h) from the display area (350), the second line (112h) having a second intermediate color that is different from both the first intermediate color and the color of the symbol. The second line (112h) at least partially overlaps the first line (111h). Dynamically removing the second line (112h) creates regions of the display area (350) where the second line (112h) does not form part of the symbol (301) and thereby removes the second intermediate color component from the color of the symbol (301) in such regions. Generally, dynamically removing the first line (111h) at 802 and dynamically removing the second line (112h) at 803 at least partially separates the color of the symbol (301) into the first intermediate color and the second intermediate color and at least partially dynamically removes the symbol (301) from the display area (350).

Acts 802 and 803 may be performed in series, or they may be performed at least partially concurrently with one another. In some implementations, the color of the symbol (301) may comprise only two constituent color components (i.e., a first intermediate color and a second intermediate color) and, in such implementations, method 800 may terminate without including act 804. However, in other implementations the color of the symbol (301) may comprise at least three constituent color components (i.e., a first intermediate color, a second intermediate color, and a third intermediate color) and, in such implementations, method 800 may include optional act 804.

At optional 804, the display (330) of the display device (300) dynamically removes a third line (113h) from the display area (350), the third line (113h) having a third intermediate color that is different from each of the first intermediate color, the second intermediate color, and the color of the symbol (301). The third line (113h) at least partially overlaps both the first line (111h) and the second line (112h). Dynamically removing the third line (113h) creates regions of the display area (350) where the third line (113h) does not form part of the symbol (301) and thereby removes the third intermediate color component from the color of the symbol (301) in such regions. Generally, dynamically removing the first line (111h) at 802, dynamically removing the second line (112h) at 803, and dynamically removing the third line (113h) at 804 separates the color of the symbol (301) into the first intermediate color, the second intermediate color, and the third intermediate color and dynamically removes the symbol (301) from the display area (350).

Figure 9:
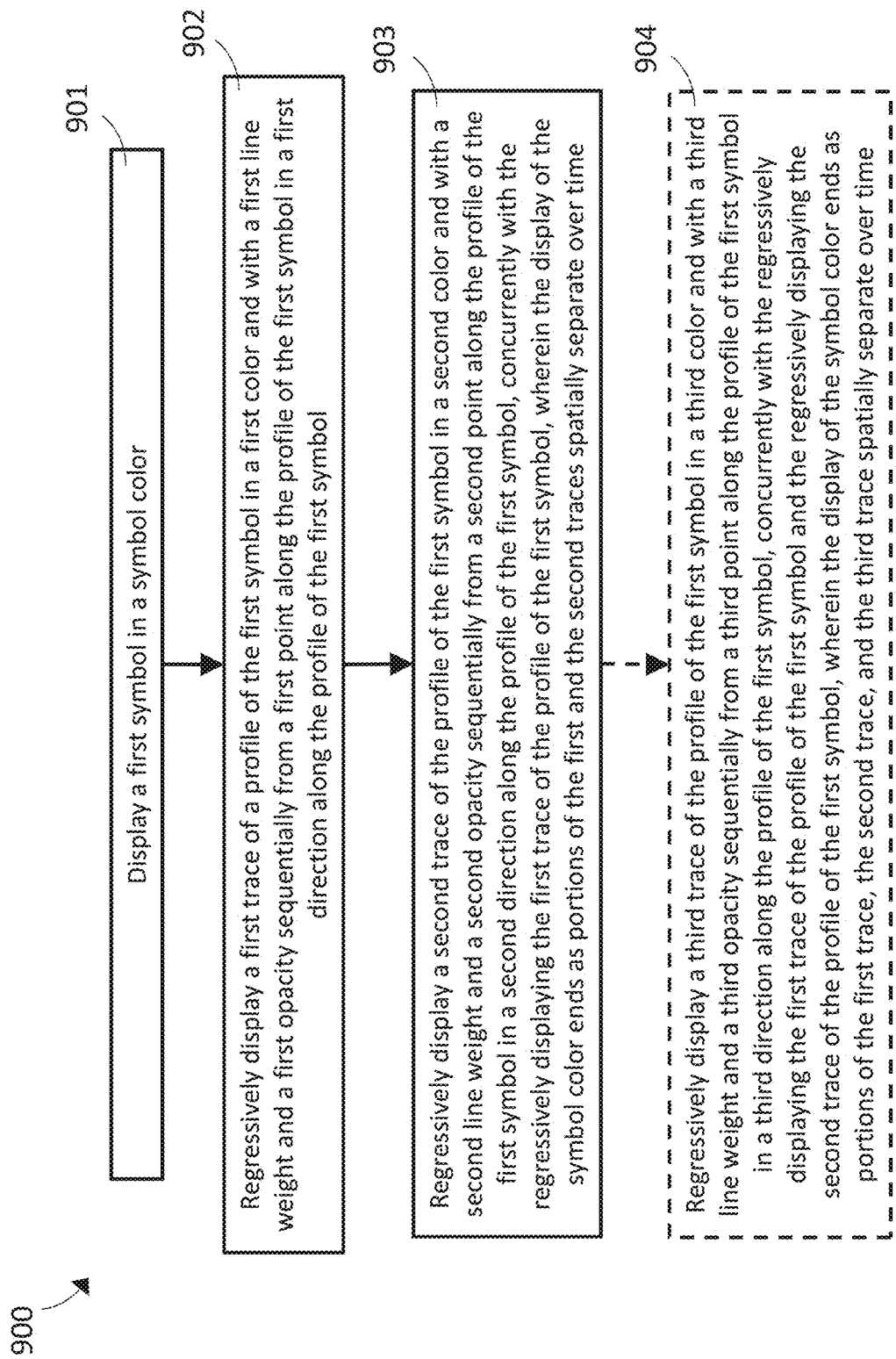
FIG. 9 is a flow-diagram showing a (e.g., processor-based) method of removing or "undisplaying" displayed visual symbols from the display area of a display device in accordance with the present systems, devices, and methods.

FIG. 9 is a flow-diagram showing a (e.g., processor-based) method 900 of removing or "undisplaying" displayed visual symbols (e.g., 301) from the display area (350) of a display device (300) in accordance with the present systems, devices, and methods. Method 900 includes three acts 901, 902, and 903 and one optional act 904, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 900 may be carried out or performed by a display device, such as a wearable heads-up display (300), and to that end method 900 may be embodied in processor-executable instructions and/or data (343) stored in a non-transitory processor-readable storage medium or memory (342) carried on-board the display device (300) and executed by a processor (341) carried on-board the display device (300). When the processor (341) executes the processor-executable instructions and/or data (343) that embody method 900 stored in the memory (342), the processor (341) may cause the display device (300) to perform acts 901, 902, 903, and (optionally) 904 of method 900. Thus, the present systems, devices, and methods describe a computer program product (which may be provided as one or more software updates to another computer program product) comprising processor-executable instructions and/or data (343) stored on one or more nontransitory computer- or processor-readable mediums (e.g., memory, registers, magnetic disks, optical disks, FLASH, HDDs, SSDs) which, when the program is executed by a computer or processor (341), cause the computer or processor (341) to carry out the acts of method 900.

At 901, the display (330) of the display device (300) displays a first symbol (301) in a symbol color. The first symbol (301) may be, for example, an alphanumeric character, a graphic, a glyph, an icon, an emoji, a pictograph, an emblem, or a logo. The symbol color may be any color, including but not limited to white.

At 902, the display (330) of the display device (300) regressively displays a first trace (111h) of a profile of the first symbol (301) in a first color, and with a first line weight and a first opacity, sequentially from a first point (121a) along the profile of the first symbol (301) in a first direction along the profile of the first symbol (301). Regressively displaying the first trace (111h) of the profile of the first symbol (301) creates regions of the display area (350) where the first trace (111h) does not form part of the first symbol (301) and thereby removes the first color component from the symbol color in such regions (e.g., sequentially removing portions from one location to another, for instance continuously removing pixels along the trace from one end to another).

At 903, the display (330) of the display device (300) regressively displays a second trace (112h) of a profile of the first symbol (301) in a second color, and with a second line weight and a second opacity, sequentially from a second point (122a) along the profile of the first symbol (301) in a second direction along the profile of the first symbol (301). Regressively displaying the second trace (112h) of the profile of the first symbol (301) creates regions of the display area (350) where the second trace (112h) does not form part of the first symbol (301) and thereby removes the second color component from the symbol color in such regions. Generally, regressively displaying the first trace (111h) at 902 and regressively displaying the second trace (112h) at 903 ends the display of the symbol color in regions where the first trace (111h) and the second trace (112h) overlap and at least partially removes the symbol (301) from the display area (350).

Acts 902 and 903 may be performed in series, or they may be performed at least partially concurrently with one another. In some implementations, the symbol color may comprise only two constituent color components (i.e., a first color and a second color) and, in such implementations, method 900 may terminate without including act 904. However, in other implementations the symbol color may comprise at least three constituent color components (i.e., a first color, a second color, and a third color) and, in such implementations, method 900 may include optional act 904.

At optional 904, the display (330) of the display device (300) regressively displays a third trace (113h) of a profile of the first symbol (301) in a third color, and with a third line weight and a third opacity, sequentially from a third point along the profile of the first symbol (301) in a third direction along the profile of the first symbol (301). Regressively displaying the third trace (113h) of the profile of the first symbol (301) creates regions of the display area (350) where the third trace (113h) does not form part of the first symbol (301) and thereby removes the third color component from the symbol color in such regions. Generally, regressively displaying the first trace (111h) at 902, regressively displaying the second trace (112h) at 903, and regressively displaying the third trace (113h) at 904 ends the display of the symbol color and removes the symbol (301) from the display area (350).

In various implementations, at least two of the first line weight, the second line weight, and/or the third line weight may be the same as one another and/or at least two of the first line weight, the second line weight, and/or the third line weight may be different from one another. The first line weight, the second line weight, and/or the third line weight may dynamically evolve (e.g., expand, grow, or thicken; or reduce, shrink, or thin) through acts 902, 902, and 904, respectively.

The second point (122a) may be spatially-separated from the first point (121a). The third point may be the same as the first point (121a) or the second point (122a), or the third point may be spatially-separated from both the first point (121a) and the second point (122a).

In various implementations, at least two of the first direction, the second direction, and/or the direction may be the same as one another and/or at least two of the first direction, the second direction, and/or the third direction may be different from one another. The various implementations of the present systems, devices, and methods described herein provide subtle and aesthetically pleasing ways of catching the attention or visual focus of a user of a display device. As previously described, such can be particularly advantageous when the display device is a wearable heads-up display that overlays display content on the user's view of their surroundings or environment. Overlaying display content on the user's view of their surroundings or environment can result in so much visual stimulation that directing the user's visual attention to any particular display item can become a challenge. For example, if the user is observing a busy city street when the wearable heads-up display displays an important notification, it can be difficult to present the notification in a visual way that can reliably capture the user's attention without overwhelming the user with distracting display content that could put their safety at risk in the busy city street environment. The present systems, devices, and methods dynamically and/or progressively draw or trace symbols, combine and uncombine colors, and evolve linewidths to elegantly capture the user's attention without taking up substantially more space in the user's field of view than the displayed symbol itself, thereby enabling the user to continue to see their surroundings and environment.

In some implementations, one or more optical fiber(s) may be used to guide light signals along some of the paths illustrated herein. For example, light may travel from a light source to a first point of redirection (e.g., to a light-redirection element) through one or more optical fiber cable(s).

The visual displays described herein may include one or more sensor(s) (e.g., microphone, camera, thermometer, compass, and/or others) for collecting data from the user's environment. For example, one or more camera(s) may be used to provide feedback to the processor of the visual display and influence where on the transparent display(s) any given image should be displayed.

The visual displays described herein may include one or more on-board power sources (e.g., one or more battery(ies)), a wireless transceiver for sending/receiving wireless communications, and/or a tethered connector port for coupling to a computer and/or charging the one or more on-board power source(s).

The visual displays described herein may receive and respond to commands from the user in one or more of a variety of ways, including without limitation: voice commands through a microphone; touch commands through buttons, switches, or a touch sensitive surface; gesture-based commands through gesture detection systems; and/or communications received from a communication device.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other visual displays, not necessarily the exemplary visual displays generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium," "non-transitory processor-readable storage medium," or "non-transitory processor-readable memory" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of displaying a symbol on a wearable heads-up display, wherein the symbol includes a color and the wearable heads-up display includes a transparent combiner, the method comprising:
  drawing a first instance of the symbol on the transparent combiner, the first instance having a first intermediate color that is different from the color of the symbol; and
  drawing a second instance of the symbol on the transparent combiner, the second instance having a second intermediate color that is different from the color of the symbol and the second instance at least partially overlapping the first instance on the transparent combiner to visually compose the symbol on the transparent combiner, wherein the second instance is at least partially transparent and the first intermediate color and the second intermediate color combine to display the color of the symbol where the second instance overlaps the first instance on the transparent combiner, and wherein drawing a first instance of the symbol on the transparent combiner and drawing a second instance of the symbol on the transparent combiner are performed at least partially concurrently.

2. The method of claim 1, further comprising:
  drawing a third instance of the symbol on the transparent combiner, the third instance having a third intermediate color that is different from the color of the symbol and the third instance at least partially overlapping both the second instance and the first instance on the transparent combiner to visually compose the symbol on the transparent combiner, wherein the third instance is at least partially transparent and the third intermediate color combines with the first intermediate color and the second intermediate color to display the color of the symbol where the third instance overlaps both the second instance and the first instance on the transparent combiner.

3. The method of claim 1, further comprising:
  undrawing the first instance of the symbol on the transparent combiner; and
  undrawing the second instance of the symbol on the transparent combiner, wherein undrawing the first instance and undrawing the second instance separates the color of the symbol into the first intermediate color and the second intermediate color and undraws the symbol on the transparent combiner.

4. The method of claim 1 wherein the symbol includes a linewidth and at least one of the first instance and/or the second instance has an intermediate linewidth that is different from the linewidth of the symbol, the method further comprising:
  dynamically varying the intermediate linewidth on the transparent combiner to match the linewidth of the symbol.

5. The method of claim 4 wherein the first instance has a first intermediate linewidth that is different from the linewidth of the symbol and the second instance has a second intermediate linewidth that is different from both the first intermediate linewidth and the linewidth of the symbol, the method further comprising:
  dynamically varying the first intermediate linewidth on the transparent combiner to match the linewidth of the symbol; and
  dynamically varying the second intermediate linewidth on the transparent combiner to match the linewidth of the symbol.

6. The method of claim 4 wherein the intermediate linewidth is greater than the linewidth of the symbol, and wherein dynamically varying the intermediate linewidth on the transparent combiner to match the linewidth of the symbol includes dynamically shrinking the intermediate linewidth on the transparent combiner to match the linewidth of the symbol.

7. The method of claim 4, further comprising:
  dynamically restoring the intermediate linewidth on the transparent combiner;
  undrawing the first instance of the symbol on the transparent combiner; and
  undrawing the second instance of the symbol on the transparent combiner, wherein dynamically restoring the intermediate linewidth on the transparent combiner, undrawing the first instance on the transparent combiner, and undrawing the second instance on the transparent combiner separates the color of the symbol into the first intermediate color and the second intermediate color on the transparent combiner, and wherein undrawing the first instance on the transparent combiner and undrawing the second instance on the transparent combiner undraws the symbol on the transparent combiner.

8. The method of claim 1 wherein the symbol is an alphanumeric character, and wherein:
  drawing a first instance of the symbol on the transparent combiner includes drawing a first instance of the alphanumeric character on the transparent combiner; and
  drawing a second instance of the symbol on the transparent combiner includes drawing a second instance of the alphanumeric character on the transparent combiner.

9. The method of claim 1 wherein:
  drawing a first instance of the symbol on the transparent combiner includes initiating the drawing the first instance of the symbol on the transparent combiner at a first point in a display area of the transparent combiner; and
  drawing a second instance of the symbol on the transparent combiner includes initiating the drawing the second instance of the symbol on the transparent combiner at a second point in the display area of the transparent combiner, the second point spatially-separated from the first point in the display area of the transparent combiner.

10. The method of claim 1, further comprising:
  applying a color gradient to the symbol on the transparent combiner.

11. The method of claim 1 wherein drawing a first instance of the symbol on the transparent combiner includes drawing the first instance of the symbol on the transparent combiner at a first rate, and wherein drawing a second instance of the symbol on the transparent combiner includes drawing the second instance of the symbol on the transparent combiner at a second rate, the second rate different from the first rate.

12. The method of claim 1 wherein drawing a first instance of the symbol on the transparent combiner includes drawing the first instance of the symbol on the transparent combiner in a first direction, and wherein drawing a second instance of the symbol on the transparent combiner includes drawing the second instance of the symbol on the transparent combiner in a second direction, the second direction different from the first direction.

13. The method of claim 1 wherein drawing a first instance of the symbol on the transparent combiner, the first instance having a first intermediate color that is different from the color of the symbol, includes drawing the first instance of the symbol on the transparent combiner, the first instance having a color gradient spanning at least two intermediate colors.

14. The method of claim 1 wherein drawing a first instance of the symbol on the transparent combiner includes persistently displaying a number of earlier portions of the first instance of the symbol on the transparent combiner while sequentially displaying a number of subsequent portions of the first instance of the symbol on the transparent combiner, and wherein drawing a second instance of the symbol on the transparent combiner includes persistently displaying a number of earlier portions of the second instance of the symbol on the transparent combiner while sequentially displaying a number of subsequent portions of the second instance of the symbol on the transparent combiner.

15. The method of claim 1 wherein drawing a first instance of the symbol on the transparent combiner includes drawing the first instance of the symbol in a first layer on the transparent combiner, and wherein drawing a second instance of the symbol on the transparent combiner includes drawing the second instance of the symbol in a second layer on the transparent combiner.

16. A wearable heads-up display comprising:
a light engine to generate display light;
a transparent combiner positioned in a field of view of an eye of a user when the wearable heads-up display is worn on a head of the user, the transparent combiner to receive display light generated by the light engine and direct the display light to the eye of the user;
a processor communicatively coupled to the light engine; and
a non-transitory, processor-readable memory communicatively coupled to the processor, the non-transitory processor-readable memory storing processor-executable data and/or instructions that, when executed by the processor, cause the wearable heads-up display to:
draw a first instance of a symbol on the transparent combiner, the first instance having a first intermediate color that is different from a color of the symbol; and
at least partially concurrently with drawing the first instance of the symbol on the transparent combiner, draw a second instance of the symbol on the transparent combiner, the second instance having a second intermediate color that is different from the color of the symbol and the second instance at least partially overlapping the first instance on the transparent combiner to visually compose the symbol on the transparent combiner, wherein the second instance is at least partially transparent and the first intermediate color and the second intermediate color combine to display the color of the symbol on the transparent combiner.

17. The wearable heads-up display of claim 16 wherein the processor-executable data and/or instructions, when executed by the processor, further cause the wearable heads-up display to:
draw a third instance of the symbol on the transparent combiner, the third instance having a third intermediate color that is different from the color of the symbol and the third instance at least partially overlapping both the second instance and the first instance on the transparent combiner to visually compose the symbol on the transparent combiner, wherein the third instance is at least partially transparent and the third intermediate color combines with the first intermediate color and the second intermediate color to display the color of the symbol where the third instance overlaps both the second instance and the first instance on the transparent combiner.

18. The wearable heads-up display of claim 16 wherein the processor-executable data and/or instructions, when executed by the processor, further cause the wearable heads-up display to:
undraw the first instance of the symbol on the transparent combiner; and
undraw the second instance of the symbol on the transparent combiner, wherein undrawing the first instance and undrawing the second instance separates the color of the symbol into the first intermediate color and the second intermediate color and undraws the symbol on the transparent combiner.

19. The wearable heads-up display of claim 16 wherein:
the symbol has a linewidth;
the processor-executable data and/or instructions that, when executed by the processor, cause the wearable heads-up display to draw a first instance of a symbol on the transparent combiner, cause the wearable heads-up display to draw the first instance of the symbol having an intermediate linewidth on the transparent combiner; and
the processor-executable data and/or instructions, when executed by the processor, further cause the wearable heads-up display to dynamically vary the intermediate linewidth on the transparent combiner to match the linewidth of the symbol.

20. The wearable heads-up display of claim 16 wherein the processor-executable data and/or instructions, when executed by the processor, further cause the wearable heads-up display to apply a color gradient to the symbol on the transparent combiner.

21. The wearable heads-up display of claim 16, further comprising:
a support structure that carries the light engine, the transparent combiner, the processor, and the non-transitory processor-readable memory, wherein the support structure positions at least a portion of the transparent combiner in the field of view of the eye of the user when the support structure is worn on the head of the user.

22. The wearable heads-up display of claim 21 wherein the support structure is sized and dimensioned to at least approximate an appearance of eyeglasses.

23. The wearable heads-up display of claim 16 wherein the light engine includes multiple light sources, each light source to generate a respective color of light, and wherein:
the processor-executable data and/or instructions that, when executed by the processor, cause the wearable heads-up display to draw a first instance of a symbol on the transparent combiner, the first instance having a first intermediate color that is different from a color of the symbol, cause a first subset of the multiple light sources to draw the first instance of the symbol in the first intermediate color on the transparent combiner; and
the processor-executable data and/or instructions that, when executed by the processor, cause the wearable heads-up display to draw a second instance of the symbol on the transparent combiner, the second instance having a second intermediate color that is different from the color of the symbol, cause a second subset of the multiple light sources to draw the second instance of the symbol in the second intermediate color on the transparent combiner, the second subset of the multiple light sources different from the first subset of the multiple light sources.

24. The wearable heads-up display of claim 23 wherein the multiple light sources include a red light source, a green light source, and a blue light source.

25. A computer program product comprising processor-executable instructions and/or data that, when the computer program product is executed by a processor of a wearable heads-up display including a transparent combiner, cause the wearable heads-up display to:
- draw a first instance of a symbol on the transparent combiner, the first instance having a first intermediate color that is different from a color of the symbol; and
- at least partially concurrently with drawing the first instance of the symbol on the transparent combiner, draw a second instance of the symbol on the transparent combiner, the second instance having a second intermediate color that is different from the color of the symbol and the second instance at least partially overlapping the first instance on the transparent combiner to visually compose the symbol on the transparent combiner, wherein the second instance is at least partially transparent and the first intermediate color and the second intermediate color combine to display the color of the symbol where the second instance overlaps the first instance on the transparent combiner.

26. The computer program product of claim 25, further comprising processor-executable instructions and/or data that, when the computer program product is executed by the processor of the wearable heads-up display, cause the wearable heads-up display to:
- draw a third instance of the symbol on the transparent combiner, the third instance having a third intermediate color that is different from the color of the symbol and the third instance at least partially overlapping both the second instance and the first instance on the transparent combiner to visually compose the symbol on the transparent combiner, wherein the third instance is at least partially transparent and the third intermediate color combines with the first intermediate color and the second intermediate color to display the color of the symbol where the third instance overlaps both the second instance and the first instance on the transparent combiner.

27. A method of removing a symbol from the transparent combiner of a wearable heads-up display, the method comprising:
- displaying the symbol in a color on the transparent combiner;
- undrawing a first instance of the symbol from the transparent combiner, the first instance having a first intermediate color that is different from the color of the symbol; and
- undrawing a second instance of the symbol from the transparent combiner, the second instance having a second intermediate color that is different from the color of the symbol and the second instance at least partially overlapping the first instance on the transparent combiner to visually compose the symbol on the transparent combiner, wherein undrawing the first instance from the transparent combiner and undrawing the second instance from the transparent combiner at least partially separates the color of the symbol into the first intermediate color and the second intermediate color and at least partially undraws the symbol from the transparent combiner, and wherein undrawing a first instance of the symbol from the transparent combiner and undrawing a second instance of the symbol from the transparent combiner are performed at least partially concurrently.

28. The method of claim 27, further comprising:
undrawing a third instance of the symbol from the transparent combiner, the third instance having a third intermediate color that is different from the color of the symbol and the third instance at least partially overlapping the first instance and the second instance on the transparent combiner to visually compose the symbol on the transparent combiner, wherein undrawing the first instance from the transparent combiner, undrawing the second instance from the transparent combiner, and undrawing the third instance from the transparent combiner separates the color of the symbol into the first intermediate color, the second intermediate color, and the third intermediate color and undraws the symbol from the transparent combiner.

\* \* \* \* \*